United States Patent
Akay

(10) Patent No.: US 12,539,505 B2
(45) Date of Patent: Feb. 3, 2026

(54) SYNTHESIS OF PLASMA GENERATING—CHEMICAL LOOPING CATALYSTS

(71) Applicant: Galip Akay, Istanbul (TR)

(72) Inventor: Galip Akay, Istanbul (TR)

( * ) Notice: Subject to any disclaimer, the term of this patent is extended or adjusted under 35 U.S.C. 154(b) by 722 days.

(21) Appl. No.: 17/792,710

(22) PCT Filed: Jan. 8, 2021

(86) PCT No.: PCT/TR2021/050011
§ 371 (c)(1),
(2) Date: Jul. 14, 2022

(87) PCT Pub. No.: WO2021/145843
PCT Pub. Date: Jul. 22, 2021

(65) Prior Publication Data
US 2023/0064758 A1  Mar. 2, 2023

(30) Foreign Application Priority Data
Jan. 17, 2020 (GB) ..................................... 2000705

(51) Int. Cl.
*B01J 23/00* (2006.01)
*B01J 21/08* (2006.01)
(Continued)

(52) U.S. Cl.
CPC ............. *B01J 23/002* (2013.01); *B01J 21/08* (2013.01); *B01J 23/02* (2013.01); *B01J 23/14* (2013.01);
(Continued)

(58) Field of Classification Search
CPC ........ B01J 23/002; B01J 21/08; B01J 23/864; B01J 23/8892; B01J 35/50; B01J 37/0221;
(Continued)

(56) References Cited

U.S. PATENT DOCUMENTS 9,416,019 B2   8/2016 Akay et al.

FOREIGN PATENT DOCUMENTS

| JP | 2008049280 A | 3/2008 |
|---|---|---|
| WO | 2010041014 A2 | 4/2010 |

(Continued)

OTHER PUBLICATIONS

Busca, G.; Trifiro, F.; Vaccari, A., Characterization and Catalytic Activity of Cobalt-Chromium Mixed Oxides, Langmuir, 1990, 6, 1440-1447 (Year: 1990).*
(Continued)

*Primary Examiner* — Coris Fung
(74) *Attorney, Agent, or Firm* — Bayramoglu Law Offices

(57) ABSTRACT

Disclosed is—the synthesis of novel supported metal catalytic materials for electromagnetic radiation absorption and chemical catalysis especially in the presence of plasma used in the conversion of nitrogen from air and hydrogen from water to useful products such as nitric acid, hydrogen, ammonia and fertilizers. These materials can also generate plasma when subjected to microwave irradiation thus form the basis of catalytic plasma reactors. They can be used in chemical looping reactions because plasma generation under microwave irradiation in air results in the reduction of catalyst oxides and oxidation of nitrogen.

10 Claims, 67 Drawing Sheets

(51) Int. Cl.

| | |
|---|---|
| B01J 23/02 | (2006.01) |
| B01J 23/14 | (2006.01) |
| B01J 23/78 | (2006.01) |
| B01J 23/86 | (2006.01) |
| B01J 23/889 | (2006.01) |
| B01J 35/30 | (2024.01) |
| B01J 35/50 | (2024.01) |
| B01J 35/70 | (2024.01) |
| B01J 35/77 | (2024.01) |
| B01J 37/02 | (2006.01) |
| B01J 37/34 | (2006.01) |
| C01B 3/06 | (2006.01) |
| C01B 21/38 | (2006.01) |
| C01C 1/04 | (2006.01) |
| C05C 11/00 | (2006.01) |

(52) U.S. Cl.
CPC .............. *B01J 23/78* (2013.01); *B01J 23/864* (2013.01); *B01J 23/8892* (2013.01); *B01J 35/393* (2024.01); *B01J 35/395* (2024.01); *B01J 35/50* (2024.01); *B01J 35/733* (2024.01); *B01J 35/77* (2024.01); *B01J 37/0221* (2013.01); *B01J 37/346* (2013.01); *B01J 37/349* (2013.01); *C01B 3/063* (2013.01); *C01B 21/38* (2013.01); *C01C 1/0405* (2013.01); *C05C 11/00* (2013.01); *B01J 2235/00* (2024.01); *B01J 2235/15* (2024.01); *B01J 2235/30* (2024.01)

(58) Field of Classification Search
CPC .... B01J 37/346; B01J 37/349; B01J 2235/15; B01J 2235/30; B01J 23/75; B01J 35/33; B01J 35/393; B01J 35/77; B01J 37/341; B01J 35/733; B01J 35/395; B01J 23/02; B01J 23/14; B01J 23/78; B01J 2235/00; C01B 3/063; C01B 21/38; C05C 11/00; C01C 1/0405
USPC ......................................................... 423/359
See application file for complete search history.

(56) References Cited

FOREIGN PATENT DOCUMENTS

| | | |
|---|---|---|
| WO | 2013108045 A2 | 7/2013 |
| WO | 2018182551 A2 | 10/2018 |
| WO | 2023137047 A1 | 7/2023 |

OTHER PUBLICATIONS

De la Fuente, J.; Kiss, A. A; Radoiu, M. T; Stefanidis, G. D. Microwave plasma emerging technologies for chemical processes, Emerging Technologies, 2017, 92, 2495-2505 (Year: 2017).*

Shoufu Shao, et al., High piezoelectric properties and domain configuration in BaTiO3 ceramics obtained through solid-state reaction route, Journal of Physics D: Applied Physics, 2009, pp. 1., vol. 42.

Faxin Li, et al., Giant actuation strain nearly 0.6% in a periodically orthogonal poled lead titanate zirconate ceramic via reversible domain switching, Journal of Applied Physics, 2017, pp. 074103-1-074103-6, vol. 122.

Galip Akay, Co-Assembled Supported Catalysts: Synthesis of Nano-Structured Supported Catalysts with Hierarchic Pores through Combined Flow and Radiation Induced Co-Assembled Nano-Reactors. Catalysts, 2016, pp. 1-47, vol. 6 No. 80.

Galip Akay, Plasma Generating-Chemical Looping Catalyst Synthesis by Microwave Plasma Shock for Nitrogen Fixation from Air and Hydrogen Production from Water for Agriculture and Energy Technologies in Global Warming Prevention, Catalysts, 2020, pp. 1-65, vol. 10 No. 152.

Galip Akay, Green Ammonia, Nitric Acid, Advanced Fertilizer and Electricity Production with In Situ $CO_2$ Capture and Utilization by Integrated Intensified Nonthermal Plasma Catalytic Processes: A Technology Transfer Review for Distributed Biorefineries, Catalysts, 2025, pp. 1-132, vol. 15 No. 105.

Galip Akay, Hydrogen, Ammonia and Symbiotic/Smart Fertilizer Production Using Renewable Feedstock and $CO_2$ Utilization through Catalytic Processes and Nonthermal Plasma with Novel Catalysts and In Situ Reactive Separation: A Roadmap for Sustainable and Innovation-Based Technology, Catalysts, 2023, pp. 1-109, vol. 13 No. 1287.

Changping Zhuang, et al., Microbubble Plasma Processing for N-Fertigation via Plasma Catalysis, ChemCatChem, 2025, pp. 1-15, vol. 17, Issue 6.

G. Akay, Sustainable Ammonia and Advanced Symbiotic Fertilizer Production Using Catalytic Multi-Reaction-Zone Reactors with Nonthermal Plasma and Simultaneous Reactive Separation, ACS Sustainable Chemistry & Engineering, 2017, pp. 11588-11606, vol. 5.

Galip Akay, et al., Process Intensification in Ammonia Synthesis Using Novel Coassembled Supported Microporous Catalysts Promoted by Nonthermal Plasma, Industrial & Engineering Chemistry Research, 2017, pp. 457-468, vol. 56.

Elijah Chiremba, et al., Direct Non-oxidative Conversion of Methane to Hydrogen and Higher Hydrocarbons by Dielectric Barrier Discharge Plasma with Plasma Catalysis Promoters, AIChE Journal, 2017, pp. 1-60.

Kui Zhang, et al., A Study on $CO_2$ Decomposition to CO and $O_2$ by the Combination of Catalysis and Dielectric-Barrier Discharges at Low Temperatures and Ambient Pressure, Industrial & Engineering Chemistry Research, 2020.

Galip Akay, et al., Catalytic Plasma Fischer-Tropsch Synthesis Using Hierarchically Connected Porous $Co/SiO_2$ Catalysts Prepared by Microwave-Induced Co-Assembly, Industrial & Engineering Chemistry Research, 2020 pp. 1-31.

Kevin H. R. Rouwenhorst, et al., Plasma-Driven Catalysis: Green Ammonia Synthesis with Intermittent Electricity, Green Chemistry, 2020, pp. 6258-6287, vol. 22.

Galip Akay, et al., Plasma Catalysis for Gas Conversion—Impact of Catalyst on the Plasma Behavior, Current Opinion in Green and Sustainable Chemistry, 2025, pp. 1-6, vol. 51 No. 100990.

Annemie Bogaerts, et al. Challenges in Unconventional Catalysis, Catalysis Today, 2023, pp. 1-27, vol. 420 No. 114180.

Frederic C. Meunier, et al., Microwave-Assisted Oxidation of $N_2$ into NOx over a La-Ce-Mn-O Perovskite Yielding Plasmas in a Quartz Flow Reactor at Atmospheric Pressure, Catalysts, 2024, pp. 1-10, vol. 14 No. 635.

* cited by examiner

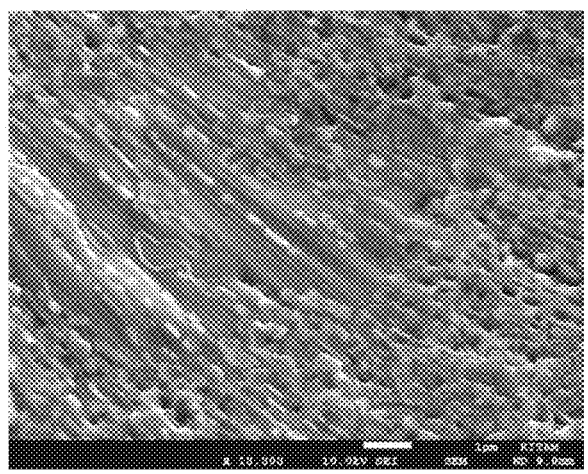 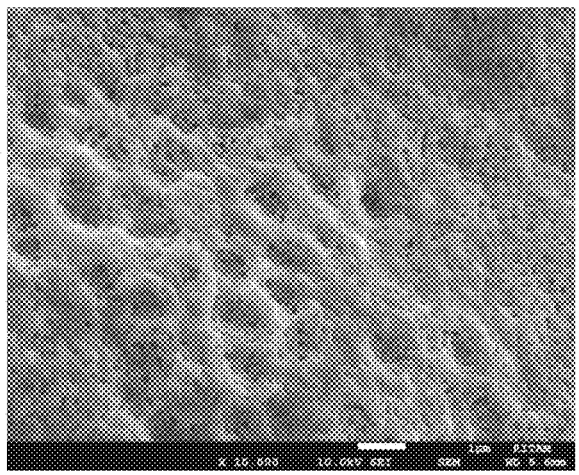
FIG. 22A                                              FIG. 22B

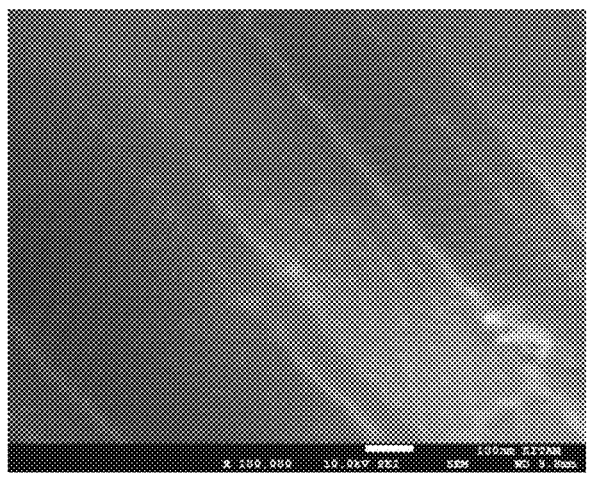 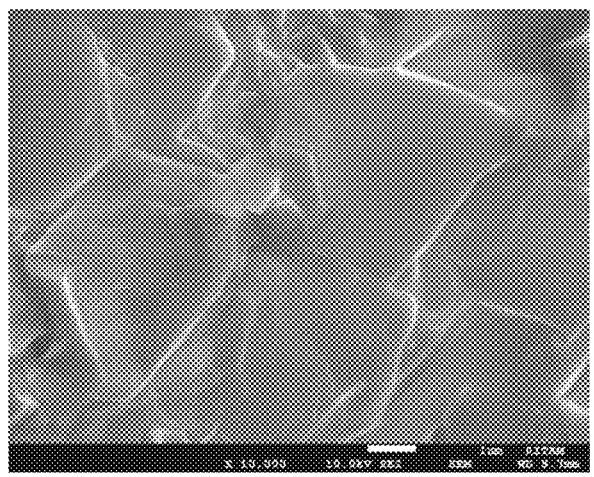
FIG. 22C                    FIG. 22D

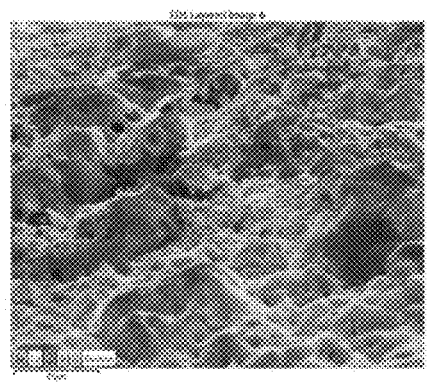
FIG. 23A
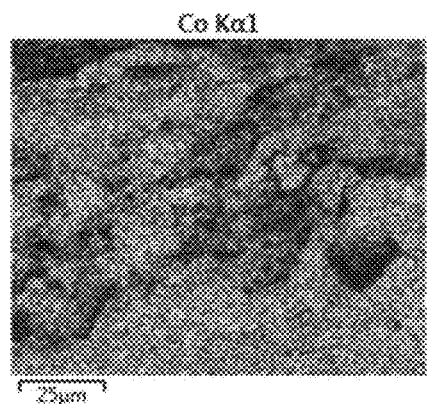 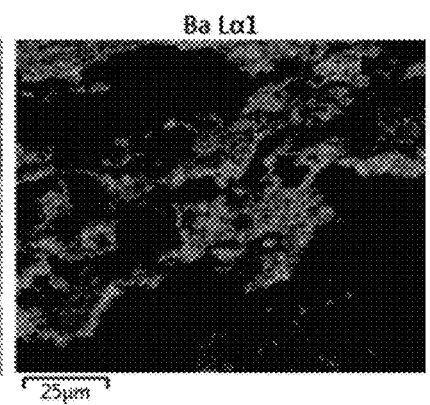
FIG. 23B        FIG. 23C

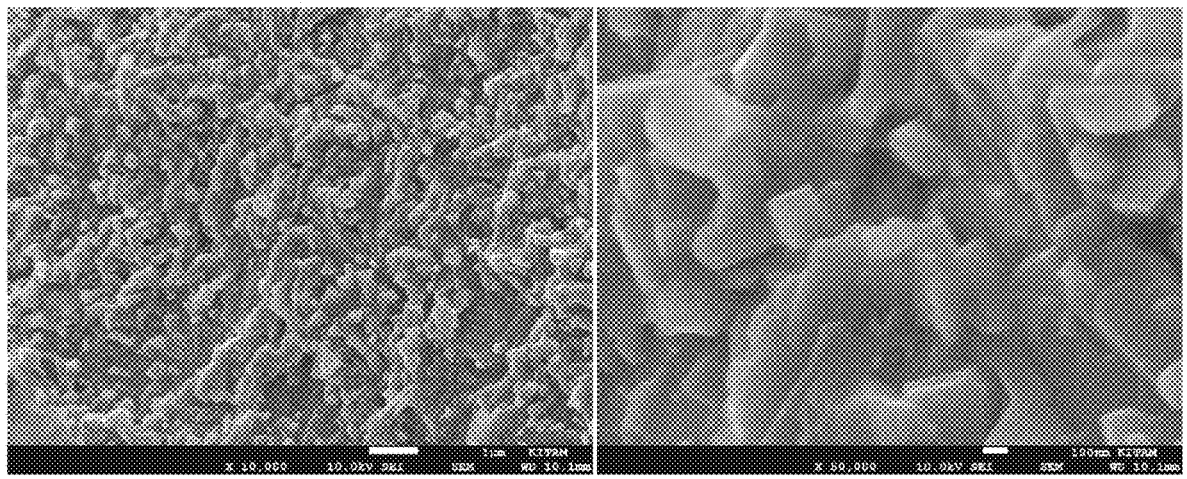
FIG. 29C                    FIG. 29D

SYNTHESIS OF PLASMA GENERATING—CHEMICAL LOOPING CATALYSTS

CROSS REFERENCE TO THE RELATED APPLICATIONS

This application is the national phase entry of International Application No. PCT/TR2021/050011, filed on Jan. 8, 2021, which is based upon and claims priority to British Patent Application No. 2000705.0, filed on Jan. 17, 2020, the entire contents of which are incorporated herein by reference.

TECHNICAL FIELD

The present invention relates to the synthesis of novel supported metal catalytic materials for electromagnetic radiation absorption and chemical catalysis especially in the presence of plasma used in the conversion of nitrogen from air and hydrogen from water to useful products such as nitric acid, hydrogen, ammonia and fertilizers. These materials can also generate plasma when subjected to microwave irradiation thus form the basis of catalytic plasma reactors. They can be used in chemical looping reactions because plasma generation under microwave irradiation in air results in the reduction of catalyst oxides and oxidation of nitrogen.

BACKGROUND

Overwhelming majority of chemical syntheses use catalysts which has been developed over a century. Supported heterogeneous catalysts are used in energy conversion processes and large volume chemicals such as ammonia and fertilizers. The active part of the catalyst system is usually deposited on a very high surface area inert support such as alumina, silica or zeolites and more recently, nano-materials such as nano-tubes, plates and rods as well as various forms of graphene to provide extensive surface area. However, the penetration of the catalyst phase into the support is limited and hence only the outer surface of these catalyst systems is useful in chemical catalysis. Catalyst support materials with a hierarchy of pores improve the accessibility of the catalysts to the reactants and removal of the products from such sites. Nano-catalyst support materials therefore perform better than the classical catalyst supports simply because of the accessibility of the catalyst sites.

More recently, plasma activation of small molecules such as $N_2$, $O_2$, $H_2$, $CO_2$, $NH_3$, $CH_4$ became important in clean energy production and carbon dioxide conversion to useful chemicals and fuels. In certain applications, the theoretical energy cost of conversions is below the thermochemical (non-plasma) reactions due to the low activation energy by plasma. The advantages of plasma reactions include low-to-atmospheric pressure processing and low temperatures which provide significant capital and operation cost reductions. It is therefore more efficient to use non-thermal plasma to achieve low temperature catalysis with its thermal, cost and catalyst performance efficiency advantages. The cost and energy efficiency of plasma reactions are further improved by using catalysts thus the Catalytic Plasma Reactors, such as described in PCT/TR2017/050457 can rely on the processing advantages of catalytic plasma reactions. The catalysts used in Catalytic Plasma Reactions are based on the best performing catalysts used in thermochemical conversions with its long history of development providing the guide for catalyst selection. However, there has not been any attempt to develop tailored catalysts for plasma catalytic reactions. It is assumed that the large surface area catalyst supports and expensive transition metals such as Ru, Rh, Pd, Pt, Au are to be preferred. In plasma applications these catalyst systems cannot operate at high catalyst loadings because they become conductive, thus, they are unsuitable for plasma generation and suffer from the inefficient catalyst and plasma performance due to energy dissipation and local electric discharges. Therefore, the use of high catalyst concentration to compensate for low catalytic activity of cheaper catalysts, such as Fe is not feasible.

Further, catalyst supports used in thermochemical catalysis have very large surface area achieved through the presence of nano-sized pores (typically 50 nm) which are sufficiently large for the transport of the gaseous reactants and products. As the main driving force for plasma induced reactions is plasma itself, the presence of plasma not only on the surface of the catalysts but also within the pores of the catalyst is necessary. The penetration of plasma into the catalysts pores requires larger (in micrometer range) and interconnected pores, but the required size is also dependent on the plasma type. It is therefore necessary to have a hierarchic pore structure.

The catalyst system disclosed by the present inventor directly addresses these shortcomings of non-plasma catalysts which are often used as catalysts in plasma reactions in the first place. It further creates plasma within the catalyst pores. There are no restrictions on the electronic properties of support materials as long as they are stable and have large surface area. The present invention also shows that for efficient plasma generation and catalytic activity, only certain types of catalyst supports should be used in catalysts under plasma.

Microwave radiation is also used in the generation of plasma and its use in chemical synthesis. In the present invention, microwave plasma is generated in the presence of these plasma generating porous catalysts with hierarchic pore structure and that these catalysts themselves generate the plasma under microwave irradiation. In the current microwave plasma generation occurs away from the catalyst zone. In the catalyst zone, there is no plasma activity. Therefore, the reactive species have to travel from the plasma generation zone to the catalyst zone. The travel of the plasma activated species to the catalyst zone causes the decay of the some of the activated species and recombination thus causing efficiency loss. This loss is prevented when the reactions take place on the catalyst surface and within pores where plasma is generated.

The present invention relates to the invention that certain supported catalyst oxides generate plasma when they are microwave irradiated. Therefore, they can be considered as preferential catalysts in plasma catalytic reactions in order to achieve high energy efficiency and selectivity. It also provides a novel processing technique combining the advantages of microwaves, plasma and fixed or fluidized bed reactors.

In thermochemical reactions, the supported catalysts need to be in ground state. Therefore, when the catalyst is first produced, they are in oxide form and hence they need to be reduced to metallic state using, normally, hydrogen. Furthermore, in thermochemical reactions, catalyst regeneration is often necessary as a result of catalyst poisoning and activity decay especially when the reactions involve oxygenated species such as $CO_2$. In plasma catalysts, this is often not necessary because the catalyst regeneration is achieved in situ. In the present invention, the catalysts for plasma reactions are designed in such a way that during plasma reactions they are also reduced from oxide state to ground state. They are therefore removed from the reactor continuously and re-oxidized using water to generate hydrogen (which is removed from the reaction medium as a product) or alternatively, carbon dioxide is used to obtain carbon monoxide fuel as a means of carbon dioxide sequestration and utilization. This process is referred to as chemical-looping. Therefore, these catalysts have the multiple functions of plasma generation, plasma catalysis and chemical-looping.

The above functions of these plasma generating-chemical looping (PGCL)-catalysts and the investigation of chemical and morphological structure indicate that they can be used as electromagnetic radiation absorption materials. These materials have a wide range of applications involving electromagnetic radiation, in the frequency range, from microwaves to X-rays. In particular, microwaves in GHz range (ca. 2-20 GHz) are used in radar detection and the absorption of radar waves are important in stealth. As the PGCL-catalysts generate plasma under microwave radiation, they can therefore be used as Radar Absorbing Materials (RAMs). Unlike the other classical RAMs, when plasma absorption is mainly through heat generation and wave scattering, the PGCL-catalysts absorb microwaves through a chemical process in which plasma is generated. The electromagnetic absorption capacity of materials can be characterized by the Absorption Coefficient. In the GHz-THz range, Absorption Coefficient of water increases with increasing frequency and reaches maximum at when the frequency is ca 100 THz. In the visible-infrared range (frequency ca. 100-1000 THz) absorption coefficient decays rapidly followed by a steep increase again as the frequency increased still further. Absorption coefficient decays to 10-2 $cm^{-1}$ (similar to that at 0.1 GHZ) with further increase in over the frequency range of 1016-1022 Hz.

In catalysis, the absorption of the reactants on the catalyst represents the first step towards the catalytic reaction which can yield higher conversions to products at lower temperatures but at higher reactions rates. After the absorption stage, the activation of the absorbed reactants require energy which can readily and selectively supplied by external energy source. Hence high absorption coefficient of the catalysts indicates more efficient catalysis.

In the present invention, we use the catalyst preparation technique invented by the author (See: G. Akay, Co-assembled supported catalyst: Synthesis of nano-structured supported catalysts with hierarchic pores through combined flow and radiation induced co-assembled nano-reactors. Catalysts, 6 (2016) 80). In this referred paper, catalysts were prepared from a precursor solution containing the catalyst precursor (usually nitrate salt of the metal catalyst) and the support precursor (silane coated silica particles). Silica ($SiO_2$) is a dielectric material with a relatively low dielectric constant ca. 30 but with a very large surface area and high chemical inertness needed in a catalyst support. By using silica supported nickel catalyst system donated as Ni/Si=X where X is the molar ratio of Ni and Si ([Ni]/[Si]=X) it was shown that the microwave energy needed increased with increasing value of X. It was also shown that at the same catalyst/silica molar ratio ([M]/[Si]=X where M is the catalyst), microwave energy requirement increased with increasing atomic weight of the metal catalyst.

What was not found in the previous study was that these catalyst characteristics were dependent on the catalyst itself and that certain types of metals did not fit in with these results and conclusions. Further, due to the limitations of the microwave power, the effect of power input to the supported catalyst precursor fluid and the subsequent catalyst precursor were not investigated to ascertain the validity of the conclusions in the original publication; Catalysts 6 (2016) 80. Furthermore, the investigation was confined to silane coated silica as the precursor for the catalyst support only because it provided low viscosity precursor fluid (catalyst and silane coated silica particles) so that during microwave irradiation, fluid film could be generated which allowed the formation of nano-reactors through co-assembly of the catalyst and support precursors. Once the nano-structures were formed in the form of foams, further microwave irradiation resulted in catalyst precursor decomposition and the formation of supported catalyst oxide.

Most, if not all of the catalyst supports are from high surface area porous materials such as $SiO_2$, $TiO_2$, $Al_2O_3$, and Carbon including various forms of graphene. In recent years, nano-tubes, rods and plates have also been used as catalyst support. However, the electronic properties of these supports have not been considered because the catalysts support does not have any significant chemical effect on catalyst performance in thermochemical reactions. However, in the case of chemical reactions in plasma with supported catalysts, this may not be the case. The electronic structure of the catalyst supports can be characterized by their dielectric properties, namely by their permittivity and permeability as well as by their ability to retain their polarization after the removal of electric field. The two major classes of dielectric materials are paraelectrics such as $SiO_2$, $TiO_2$, $Al_2O_3$ and $Ta_2O_5$ and ferroelectrics, such as perovskites, $BaTiO_3$, $SrTiO_3$, $Pb[Zr_xTi_{1-x}]O_3$, $Ba_xSr_{1-x}TiO_3$ and more complex nanoporous perovskites such as $La_{0.5}Sr_{0.5}Co_{0.5}Fe_{0.5}O_3$. The dielectric constants of the ferroelectrics are 100-1000 times greater than those of the paraelectrics. Therefore, in catalytic plasma reactions, the use of ferroelectric supports or indeed as co-catalyst can generate more efficient plasma at the same power input. Perovskites as exemplified above are also used as catalysts and hence their combination with metal catalysts serves for two purposes: catalyst support and co-catalyst.

However, the high value of the dielectric constant is not the only criteria in choosing a ferrorelectrics as co-catalyst/support because the polarization is reversed when the electric field is removed if the temperature is above so-called Curie temperature. Above the Curie temperature, ferroelectrics behave like a paraelectric materials. The dielectric constant of the ferroelectrics increases with temperature, reaching to a maximum at Curie temperature. Further increase in temperature results in the decay of the dielectric constant while the ferroelectrics behave like paraelectrics. Nevertheless, the dielectric constants of the ferroelectrics above the Curie temperature are still 2-3 orders of magnitude greater than that of the paraelectrics. Therefore, for co-catalysts or co-support material applications, perovskites with high Curie temperature must be chosen.

Plasma generation can be achieved through several means. The low temperature plasmas where the overall temperature is low, 50-300° C., can be generated by applying high electric voltage between two electrodes separated by a dielectric material, usually glass, and plasma space which can be filled by plasma catalysts or high plasma catalysis promoters or these two materials are combined as a mixture. Such plasma generators are named as Dielectric Barrier Discharges (DBDs).

An important method of plasma generation is by microwave radiation without having to use high voltages and electrodes. Microwave induced plasma is generated in the plasma space immediately adjacent to the microwave radiation zone. It is possible to place the catalysts beyond the plasma zone either as a fixed bed or fluidized bed. However, it means that the reactive species generated in the plasma zone decay to their ground state by the time they reach to the catalyst zone and thus not form the desired product.

In the current invention, catalyst itself creates plasma when placed into the microwave radiation zone. This method thus combines plasma generation with catalytic plasma reaction on the catalyst as well as within the pores of the catalyst particles, either in fixed bed or fluidized mode. This type of reactor is industrially possible because of the fact that microwave ovens, as reactors can be used at large scale. This technique also avoids the presence of very high voltages in the presence of highly reactive gases.

SUMMARY

The implication of this invention is that these catalysts preferentially absorb energy from electromagnetic radiation and generate plasma on the outermost surface and within their pores.

According to this invention, the energy absorption mechanism and subsequent plasma generation through a chemical reaction process are novel. Catalysts do absorb energy, but they do not take part in the overall reaction and generate plasma. According to this invention, these novel catalysts provide a new and highly efficient pathway for electromagnetic radiation (including microwave) absorption and chemical reaction induced by the generated plasma and the catalyst itself.

According to this invention, catalytic plasma reaction causes chemical reaction thus producing a desired product which is then abstracted from the reaction medium. The chemical modification (reduction of the catalyst oxide) of the catalyst is reversed through a separate reaction (re-oxidation) when another useful product (such as hydrogen or carbon monoxide) is obtained by using a suitable oxidizing agent, such as water or carbon dioxide.

According to this invention, the electromagnetic absorption characteristics of these catalysts show that they can be used in protection and avoidance from such radiations more efficiently that those electromagnetic radiation absorption materials (e-RAMs) which include radar absorption materials in the microwave frequency range.

According to this invention, microwave ovens can be used as catalytic plasma reactors by incorporating the said catalysts either in fixed bed or in fluidized mode.

According to this invention, presence of molecular or ionic species such as $N_2$, $O_2$, $NO_3^-$, $H^+$, $OH^-$ either absorbed on the catalyst precursor or within the reaction environment during microwave irradiation initiates the plasma generation because some of these species acquire sufficient energy to start permanent plasma generation. Once started, locally generated plasma spreads auto-catalytically to cover all of the catalyst particle surface and its pores causing local reduction and oxidation at the same time. Therefore, the catalyst and the reactive environment must possess both reduction and oxidation species on the catalyst and in the reaction zone. Multi-valence metals such as Ti, V, Cr, Mn, Co, Fe, Cu, Ce, Nb, Mo, Ru, Rh, Pd, Au are therefore preferred for plasma generating catalysts. However, the activation energy of these metals for redox cycle should be low, and clearly, they should be cheap and environmentally friendly. Therefore, d-metal transition multi-valence catalysts should be preferred for plasma generation and subsequent chemical-looping.

BRIEF DESCRIPTION OF THE FIGURES

FIG. 3A shows the EDS layered image, and FIG. 3B shows surface EDX spectrum, both with: [O]=0.611; [Ti]=0.196; [Ba]=0.193; [Ti]/[Ba]=1.02; [O]/([Ba]+[Ti])=1.57.

FIG. 4A shows the structure with Mag.=1 k; [O]=0.679; [Ti]=0.164; [Ba]=0.157; [Ti]/[Ba]=1.04; [O]/([Ti]+[Ba])=2.12. FIG. 4B shows the structure with Mag.=100 k; [O]=0.684; [Ti]=0.159; [Ba]=0.157; [Ti]/[Ba]=1.01; [O]/([Ti]+[Ba])=2.13.

FIG. 6A shows the EDS layered image; FIG. 6B shows the EDX-spectra of the area in FIG. 6A with composition: [O]=0.681; [N]=0.101; [Ba]=0.123; [Ti]=0.094. FIG. 6C shows the Ba-mapping; FIG. 6D shows the Ti-mapping; and FIG. 6E shows the O-mapping.

FIG. 7A shows the EDS layered image of an electrical tree; FIG. 7B shows the EDX-spectra of the area in FIG. 7A with composition: [O]=0.678; [N]=0.070; [Ba]=0.136; [Ti]=0.116; FIG. 7C shows the Ba-mapping; FIG. 7D shows the Ti-mapping; FIG. 7E shows the O-mapping; and FIG. 7F shows the N-mapping.

FIG. 8A shows the EDS layered image showing the superimposed regions of O-rich and N-rich regions; FIG. 8B shows the EDX-spectra of the area in FIG. 8A with: [O]=0.642; [N]=0.034; [Ba]=0.176; [Ti]=0.148. FIG. 8C shows the Ba-mapping; FIG. 8D shows the Ti-mapping; FIG. 8E shows the O-mapping; and FIG. 8F shows the N-mapping.

FIG. 10A shows the formation of porous skin on the particle surface (Scale bar=10 μm); FIG. 10B shows the pore distribution and the structure of skin (Scale bar=1 μm); FIG. 10C shows the phase separation on the surface skin (Scale bar=100 nm); FIG. 10D shows the delamination and formation of fine layer structures (Scale bar=1 μm); FIG. 10E shows the phase separation and nano-size void formation within the layered structures, (Scale bar=100 nm); FIG. 10F shows the delamination/layer separation, (Scale bar=1 μm); FIG. 10G shows the image of delamination at high magnification, (Scale bar=400 nm); FIG. 10H shows the early stage of fragmentation of the layered structures, (Scale bar=1 μm); FIG. 10I shows the fragmentation of the layered structures in progress, (Scale bar=100 nm).

FIGS. 11A and 11B show the general view of the electrical tree, Scale bar=100 μm; FIGS. 11C and 11D shows the detail of the electrical tree, (Scale bar=10 μm); FIG. 11E shows the fused structures on the electrical tree, (Scale bar=50 μm); FIG. 11F shows the surface structure of the electrical tree, (Scale bar=10 μm); FIGS. 11G and 11H show the surface structure of the electrical tree showing the delamination of the layered structures and the formation of ca. 100 nm thick plates, (Scale bar=1 μm).

FIG. 12A shows the fracture surface of a catalyst particle showing its porous structure (Scale bar=100 μm); FIG. 12B shows the surface structure of the catalyst with decorations (Scale bar=1 μm); FIG. 12C shows the pore wall structure (Scale bar=1 μm); FIG. 12D shows the EDS-image of a pore at the location of EDS-spot analysis on the wall and pore surface (Scale bar=2.5 μm) with average concentrations: [Co]=0.067; [Si]=0.233; [O]=0.700 with [Co]/[Si]=0.288; [O]/([Co]+[Si])=3.33.

FIG. 13A shows the EDS layered image; FIG. 13B shows the EDX-spectrum of the catalyst particle which yields: [Co]=0.413; [Si]=0.067; [O]=0.520; with [Co]/[Si]=6.16 and [O]/([Co]+[Si])=1.56; FIG. 13C shows the Co-mapping; FIG. 13D shows the Si-mapping; FIG. 13E shows the O-mapping. Scale bar=1 mm in all figures.

FIG. 14A shows the SEM image of the catalyst surface structure, Scale bar=10 μm;

FIG. 14B shows the EDX-image of the site where XRD-spot analyses are performed, (Scale bar=10 μm); FIG. 14C shows the spectrum of the total area with composition [Co]=0.329; [Si]=0.109; [O]=0.562; FIG. 14D shows the Co-mapping; FIG. 14E shows the Si-mapping; FIG. 14F shows the O-mapping; FIG. 14G shows the SEM of the area where cobalt concentration is the lowest as determined by the XRD-spot analysis, (Scale bar=1 μm); FIG. 14H shows the spectrum at location 12 where [Co]=0.271; [Si]=0.144; [O]=0.585; FIG. 14I shows the SEM of the area with maximum cobalt concentration (Scale bar=1 μm); FIG. 14J shows the spectrum at location 19 with [Co]=0.381; [Si]=0.068; [O]=0.551.

FIG. 15A shows the EDS-image with the sites of the spot-EDS analysis (#2-9); FIG. 15B shows the Co-mapping; FIG. 15C shows the Si-mapping; FIG. 15D shows the O-mapping;

FIG. 15E shows the spectrum of the site (#2) with the lowest cobalt with [Co]=0.496; [Si]=0.126; [O]=0.378; FIG. 15F shows the spectrum of the main location shown in FIG. 15A with [Co]=0.720; [Si]=0.068; [O]=0.212; FIG. 15G shows the spectrum of the site (#8) with the highest cobalt concentration where [Co]=0.908; [Si]=0.018; [O]=0.074; FIG. 15H shows the SEM of the site with the lowest cobalt concentration (Site #2); FIG. 15I shows the SEM image with the highest cobalt concentration (Site #8); FIG. 15J shows the SEM image of the regions with the high and low cobalt regions; (Scale bar=1 μm in FIGS. 15H-15J); FIG. 15K shows the EDS image of an area with and without surface decorations showing the volcanic activity around the holes where silica is absent but cobalt is dominant, (Scale bar=5 μm).

FIG. 16A shows the at low magnification with [Co]=0.669; [Si]=0.043; [O]=0.288 (Scale bar=100 μm); FIG. 16B shows the at high magnification with [Co]=0.506; [Si]=0.069; [O]=0.425 (Scale bar=25 μm); FIG. 16C shows the Co-mapping; FIG. 16D shows the Si-mapping; FIG. 16E shows the O-mapping of the site in FIG. 16B.

FIGS. 17A and 17D show the lowest cobalt sites with [Co]=0.248; [Si]=0.085; [O]=0.667; FIGS. 17B and 17E show the average cobalt site with [Co]=0.659; [Si]=0.043; [O]=0.298; FIGS. 17C and 17F show the highest cobalt site with [Co]=0.933; [Si]=0.007; [O]=0.060. Scale bar=1 μm in all SEMs.

FIG. 18A shows the variation of concentration of oxygen, $[O]_n$ (n=0, 1, 2) with the feed catalyst concentration $[Co]_T$ at various locations represented by n=0, 1, 2 (n=0, average molar concentration; n=1 where cobalt concentration is the lowest and n=2 where cobalt concentration is the highest); FIG. 18B shows the variation of Log (Cobalt/Silica ratio), Log $A_n$, $(A_n=[Co]_n/[Si]_n)$ with theoretical cobalt concentration, $[Co]_T$ at 3 locations represented by n=0, 1, 2; FIG. 18C shows the variation of Log (Heterogeneity indices), $H_A$ (catalyst heterogeneity index) and $H_B$ (lattice oxygen heterogeneity index) with theoretical cobalt concentration.

FIG. 19A shows the EDS image at low magnification showing the whole particle (Scale bar=1 mm); FIG. 19B shows the EDS image at high magnification showing the regions of high and low Mn concentrations (Scale bar=250 μm); FIGS. 19C, 19D, and 19E show the mapping of Mn, Si, O at low magnification; FIGS. 19F, 19G, and 19H show the mapping of Mn, Si, O at high magnification used in spot analysis to determine the regions of low- and high-Mn concentrations.

FIG. 20A shows the region of average Mn concentration, n=0 with molar composition: $[Mn]_0=0.317$; $[Si]_0=0.083$; $[O]_0=0.600$; FIG. 20B shows the region of lowest Mn concentration, n=1 with composition: $[Mn]_1=0.204$; $[Si]_1=0.118$; $[O]_1=0.678$; FIG. 20C shows the region of highest Mn concentration with composition: $[Mn]_2=0.772$; $[Si]_2=0.059$; $[O]_2=0.169$.

FIG. 21A shows the low Mn region with: [Mn]=0.201; [Si]=0.115; [O]=0.684; FIG. 21B shows the same as in FIG. 21A at higher magnification; FIG. 21C shows the average Mn region, with: [Mn]=0.317; [Si]=0.075; [O]=0.608; FIG. 21D shows the high Mn region with: [Mn]=0.772; [Si]

=0.059; [O]=0.169; FIG. 21E shows the pore surface when [Mn]=0.843; [Si]=0.023; [O]=0.134; FIG. 21F shows the same as in FIG. 21A at higher magnification. Scale bar=1 µm for FIGS. 21A, 21C, 21D, 21E; and Scale bar=100 nm FIGS. 21B and 21F.

FIGS. 22A-22F show the structure of the Mn/Si=2*catalyst surface and pore surface as a function of local chemical composition after an extra 60 second microwave irradiation with plasma generation of the fresh catalyst illustrated in FIGS. 21A-21E. FIG. 22A shows the surface structure at the average Mn but high SiO$_2$ level with composition: [Mn]=0.365; [Si]=0.075; [O]=0.560; FIG. 22B shows the surface structure at the average Mn level and low silica with composition: [Mn]=0.493; [Si]=0.027; [O]=0.480; FIG. 22C shows the surface structure at high Mn level with composition: [Mn]=0.840; [Si]=0.023; [O]=0.137; FIG. 22D shows the surface structure at high Mn level shown in FIG. 22C but at higher magnification; FIG. 22E shows the pore surface structure at high Mn level with composition: [Mn]=0.804; [Si]=0.019; [O]=0.177; FIG. 22F shows the pore surface structure shown in FIG. 22E at higher magnification. Scale bar=1 µm for FIGS. 22A, 22B, 22C, 22E and Scale bar=100 nm for FIGS. 22D, 22F.

FIGS. 23A-23F show the EDS images of two {Co/Si=2}/BT=1/4 composite catalysts showing the distribution of cobalt and barium as the markers for Co/Si=2 and BaTiO$_3$. FIG. 23A shows the EDS image of mixed catalyst with Co/Si=2 catalyst deposited on the surface of BaTiO$_3$ surface, occupying the spaces between BaTiO$_3$ grains. Molar composition of the location: [Co]=0.187; [Si]=0.101; [Ba]=0.026; [Ti]=0.028; [O]=0.658. FIG. 23B shows the cobalt mapping; FIG. 23C shows the barium mapping; FIG. 23D shows the EDS image of mixed catalyst with Co and Ba rich regions. Molar composition at this location: [Co]=0.102; [Si]=0.067; [Ba]=0.075; [Ti]=0.080; [O]=0.676. FIG. 23E shows the Co-mapping; FIG. 23F shows the Ba-mapping. Scale bar=25 µm for FIGS. 23A-23C; and Scale bar=10 µm for FIGS. 23D-23F.

FIG. 24A shows the EDS image of the composite catalyst with a large (ca. 500 µm) BaTiO$_3$ particle coated with porous Co/Si=2 supported catalyst, (Scale bar=100 µm). FIG. 24B shows the SEM image of the location FIG. 24B showing the BaTiO$_3$ rich particle surface with some Co/Si=2 deposition (Scale bar=100 nm).

FIG. 24C shows the SEM image of the location FIG. 24C shows the showing partially covered BaTiO$_3$ particle (Scale bar=1 µm). FIG. 24D shows the SEM image of the location FIG. 24D shows the with very high concentration of reduced cobalt (Scale bar=100 nm). FIG. 24E shows the SEM image of location FIG. 24E shows the above the pore where a very high level of reduced cobalt is present (Scale bar=100 nm). See Table 10 for the elemental composition at each location.

FIG. 25A shows the EDS image; FIG. 25B shows the Cu mapping; FIG. 25C shows the Si mapping; FIG. 25D shows the O mapping; FIG. 25E shows the Co mapping. Scale bar=10 µm. See Table 12 for elemental composition in various regions.

FIG. 26A shows the Cu/Si=1/4 catalyst; FIG. 26B shows the Co/Cu/Si=1/1/8 binary catalyst with Cu-rich decorations; FIG. 26C shows the Co/Cu/Si=1/1/8 binary catalyst showing the fine structure of the Cu-rich decorations; FIG. 26D shows the Co/Cu/Si=1/1/8 binary catalyst showing the presence of nano-structure of the decorations in the form of fused particles forming planes with size ca. 30 nm. Scale bar=1 µm for FIGS. 26A, 26B, 26D; and scale bar=100 nm for FIG. 26C.

FIG. 27A shows the EDS image of a catalyst particle at low magnification showing the existence of Cu-rich and Mn-rich domains with molar composition: [Mn]=0.217, [Cu]=0.181, [Si]=0.118, [O]=0.484 (Scale bar=1 mm); FIG. 27B shows the EDS image of the Cu-rich region at high magnification with molar composition: [Mn]=0.343, [Cu]=0.115, [Si]=0.123. [O]=0.419 (Scale bar=2.5 µm); FIG. 27C shows the Mn-mapping; FIG. 27D shows the Cu-mapping; FIG. 27E shows the Si-mapping; FIG. 27F shows the O-mapping; FIG. 27G shows the SEM image of the EDS mapped area in FIG. 27B (Scale bar=1 µm); FIG. 27H shows the SEM image of the ca. 35 nm thick plates forming a rectangular shaped layered structure shown in images FIGS. 27B and 27G (Scale bar=100 nm).

FIG. 28A shows the EDS image with composition [Mn]=0.217, [Cu]=0.181, [Si]=0.118, [O]=0.484; FIG. 28B shows the Mn-mapping; FIG. 28C shows the Cu-mapping; FIG. 28D shows the Si-mapping; FIG. 28E shows the O-mapping. Scale bar=500 µm.

FIGS. 29A-29F show the SEM evaluation surface structure of the Mn/Cu/Si=1/0.5/1 catalyst as a function of local composition after 60 s extra microwave irradiation at 1800 W. Images at two magnifications: 10 k; (Scale bar=1 µm); 50 k; (Scale bar=100 nm). FIGS. 29A and 29B shows the surface structure at mean Mn concentration with [Mn]=0.250, [Cu]=0.114, [Si]=0.074, [O]=0.562; FIGS. 29C and 29D shows the surface Mn-rich pore surface with [Mn]=0.806, [Cu]=0.040, [Si]=0.052, [O]=0.102; FIGS. 29E and 29F shows the surface Cu-rich pore surface with [Mn]=0.167, [Cu]=0.302, [Si]=0.044, [0]=0.487.

DETAILED DESCRIPTION OF THE EMBODIMENTS

Method of Catalyst Preparation

Materials and Catalyst Synthesis

Figure 1:
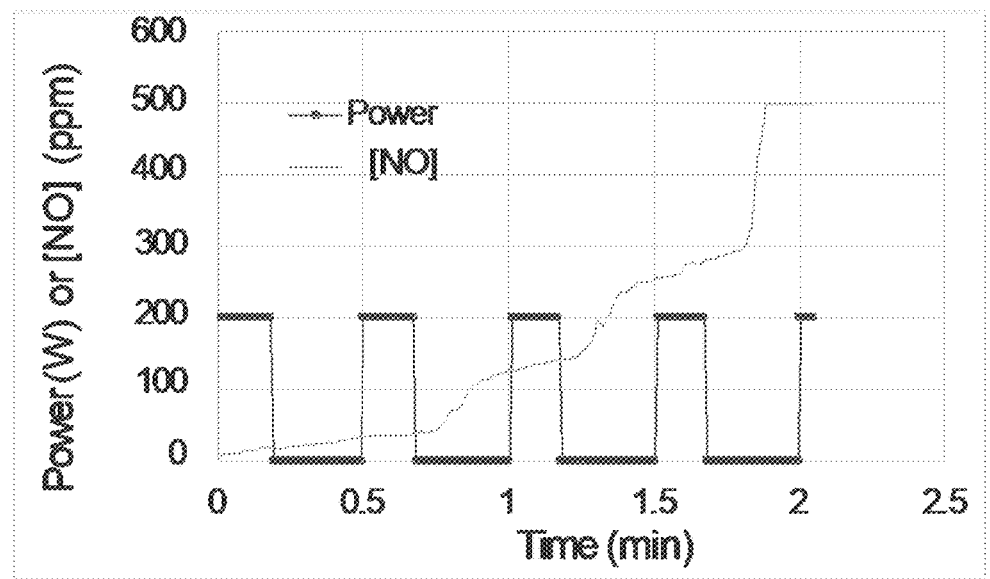
FIG. 1 shows the nitric oxide evolution during intermittent microwave irradiation in air of barium titanate spheres with peak power at 200 W for a period of 10 seconds and no irradiation for 20 seconds. Nitric oxide concentration [NO] is measured on-line with maximum detection limit of 500 ppm.

Barium titanate (BT=$BaTiO_3$) perovskite was obtained from Catal Ltd (UK) with permittivity value 1000-6000. The catalyst and co-catalyst precursors used in this study were nitrate hydrates represented by $M(NO_3)_x \cdot yH_2O$ where M=Cr, Mn, Fe, Co, Cu (Transition metals) while the catalyst promoters include, M=Mg, Al, Ca, Zn, Sr, Ba, La, Bi. Precursor nitrates were supplied by Sigma Aldrich and used as received. The catalyst support precursor was an epoxy silane (γ-Glycidoxypropyltrimethoxysilane) coated silica particle (size 7 nm) dispersion supplied by Nouryon, (formerly AkzoNobel), Finland in the form of a 30 wt % dispersion under the trade name of Levasil CC301 (formerly Bindzil CC301). Levasil CC151 grade epoxy coated silica dispersion had 5 nm silica particles at 15 wt % silica loading. The weight ratio of silane coupling agent to silica in Levasil CC301 is 0.20 while this ratio in Levasil CC151 is 0.40.

Catalyst preparation was carried out using a Panasonic NE 1853 commercial microwave oven with a stepwise variable power ranging from 340 W to 1800 W in ten steps. Analysis of nitric oxide in air was carried out using an Agilent Micro-GC Gas Analyzer.

Standard Catalyst Characterization Methods

The X-Ray Diffraction (XRD) studies were carried out using a Smartlab model Rigaku (Japan) equipment with facility to provide crystallize size at various reflection angles. BET surface area measurements were carried out using a Beckman-Coulter SA 3100 Analyzer. The scanning electron microscope used in the present work was JSM-777001F model Joel (Japan) equipment with Energy Dispersive X-ray Spectroscopy (EDS) analysis. Metal catalysts were not coated but $BaTiO_2$ and Cr/Co/Si=1/1/8 samples were coated with gold (for images at high magnifications) and with carbon when EDS analysis was used. It was discovered that despite high metal content, some of the catalysts were not conductive (Cr/Co/Si=1/1/8) and hence they were also coated with carbon. The absorption characteristics of the catalysts are measured using Tera Hertz Spectrometer in the frequency range of 0.1-2.5 THz.

Supported Catalyst Preparation

Because the catalyst precursor and catalyst support ($SiO_2$) precursor are co-assembled from a solution followed by catalyst precursor decomposition, we use molar composition in describing them. The catalyst system is denoted as M/Si=X in which the metal catalyst (M) is supported on $SiO_2$ with molar ratio of X (X=1/9; 1/5; 1/4; 1/3; 1/2; 1/1; 2/1 in this study).

A predetermined amount of catalyst precursor represented by $M(NO_3)_x \cdot yH_2O$ was dissolved in the silica support catalyst fluid (Levasil CC301 or Levasil CC151) to obtain a desired M/Si molar ratio. 10 ml of this stock fluid is placed in a ceramic bowl of 100 ml capacity. This fluid is then microwaved at various microwave power ratings. In all cases, upon microwave irradiation, a highly porous Catalyst precursor/Silica structure is obtained when water is lost from the mixture. Immediately afterwards, the catalyst precursor starts decomposing with the evolution of $NO_x$ which could be observed visually. After the completion of gas evolution, the silica supported catalyst oxide is recovered. The whole processes take ca. 1-4 min depending on the power and catalyst concentration. It was found that, subject to the type of catalyst (either binary or single) and catalyst loading, there appeared to be a critical power required in order to initiate the catalyst nitrate decomposition. Prolonged microwave irradiation does not initiate the catalyst nitrate decomposition if the microwave power is below this critical threshold. In these experiments, we determine the critical microwave power P*, as a function of catalyst concentration as well as catalyst atomic number.

Supported Binary and Composite Catalysts

We prepared supported binary and composite catalysts. Binary catalysts are represented by $M_{(1)}/M_{(2)}/Si=X/Y/Z$ where X, Y, Z are the molar concentrations of catalysts $M_{(1)}$ and $M_{(2)}$ and the support $SiO_2$ respectively. In the present studies, $M_{(1)}$=Mn or Co and $M_{(2)}$=Cu or Cr.

In the case of "Composite" catalysts, $BaTiO_3$ particles were dispersed in the M/Si=X catalyst precursor fluid and subjected to microwave irradiation. As it is necessary to form a fluid film during the water evaporation stage of the synthesis, we used $BaTiO_3$ particles with size range 10-53 μm (average size $D_{50}$=32 μm) so that these particles do not disrupt film formation and can be observed in the resulting catalyst. These $BaTiO_3$ containing samples are coded as {M/Si=2}/$BaTiO_3$=F, where F is the catalyst/$BaTiO_3$ molar ratio; i.e., F=[M]/[Ba]. 10 ml catalyst and silica support precursor fluid were added sufficient amount of fresh $BaTiO_3$ powder (crushed from 3 mm particles) so as to obtain nominal catalyst/$BaTiO_3$ molar ratio of 1/4; i.e., [M]/[Ba]=1/4.

In the EDS and XRD analysis, although the presence of $BaTiO_3$ could be observed, single or a collection of $BaTiO_3$ particles could not be observed in the resulting catalysts through SEM analysis. In order to verify this invention, we also used $BaTiO_3$ particles in the size range of 1-0.200 mm range at the same level of catalyst/$BaTiO_3$ loading; i.e., [M]/[BT]=1/4.

New Method of Catalyst Characterization for Plasma Generating Catalysts

Catalysts developed in this invention were characterized with respect to catalyst size and catalyst phase evaluation using XRD. Catalyst surface area was characterized using BET-method. In general, SEM and EDS techniques are routinely used in determining the morphology and chemical structure of the supported catalysts without any significant quantification because these structures are uniform across the catalyst. Any variation in these evaluations is well within the experimental and instrumental error. However, in the current invention, we observe that both chemical and morphological characteristics are highly variable within micron-sized domains as well as regions where the catalyst structure has well defined function due to the way how it is produced. Therefore, in order to evaluate the characteristics of these novel catalysts, a new characterization technique had to be developed.

In the EDS analysis, carbon concentration was also evaluated for each set of data. Although the catalyst samples are not coated with carbon in SEM-EDS investigations, carbon appears in the silica supported catalyst because silica is coated with epoxy silane (γ-Glycidoxypropyltrimethoxysilane) which contains 5 oxygen and 6 carbon atoms after the silanation reaction on the silica support surface. Therefore, in addition to the appearance of carbon in the EDX-spectra, oxygen content was also increased. The effect of silane on measured oxygen concentration decreases with increasing catalyst concentration. Although we have not considered the effect of the organic coating on the catalyst structure, the presence of oxygen in silane was taken into account and a correction was made.

The reason why these catalysts can generate plasma under radiation is because their structure is chemically and physically heterogeneous.

Catalysts characteristics were quantified with respect to:
c) Catalyst-Support Ratio Heterogeneity
d) Catalyst Lattice Oxygen Heterogeneity In the case of $BaTiO_3$, it was characterized by catalyst lattice oxygen only.

The spatial heterogeneity of the catalyst chemical structure is carried out by EDS-spot analysis at several locations. Four of the largest and another four of the smallest catalyst (M) concentration regions are then chosen and the compositions averaged within each group. The catalyst heterogeneity is essentially represented by the standard deviation of the concentrations across the catalyst domain. In the current study, we consider the variation of the Catalyst-Support Index ($A_n$) and Catalyst-Oxygen Index ($B_n$) which are defined as:

$$A_n = [M]_n / [Si]_n \quad (1)$$

$$B_n = [O]_n / \{[M]_n + [Si]_n\} \quad (2)$$

where M=Co or Mn in the present study. [M], [Si] and [O] represent the molar concentrations of the catalyst (M), support (Si) and oxygen (O) respectively. Here the subscript n=0, 1, 2, T represents the mean concentrations in the M/Si=X catalyst where the catalyst concentration $[M]_n$ is at average (n=0); or the lowest/minimum (n=1) or the highest/maximum (n=2). n=T represents the theoretical/stoichiometric concentrations and concentration ratios based on the feed $M(NO_3)_m$ and $SiO_2$ in the catalyst support fluid. Hence, for the supported single catalyst system M/Si=X, $A_T$=X and the theoretical catalyst concentration is given by $$[M]_T = X/(1+X) \quad (3)$$

The average, minimum and maximum values of the catalyst/support ratio ($A_n$) and lattice oxygen/catalyst+support ratio ($B_n$) are denoted by $A_0$, $A_1$, $A_2$, $B_0$, $B_1$, $B_2$ respectively. We define the catalyst heterogeneity ($H_A$) and oxygen heterogeneity ($H_B$) as:

$$H_A = (A_2 - A_1)/A_T \quad (4)$$

$$H_B = |(B_2 - B_1)|/B_T \quad (5)$$

The theoretical value of $B_T$ requires the knowledge of the chemical structure of the catalyst oxide after the processing of the catalyst and catalyst support fluid. The XRD studies indicated that the dominant structure is spinel, $M_3O_4$(M=Co, Mn) while the support is $SiO_2$. Hence the theoretical oxygen concentration $[O]_T$ and theoretical oxygen index BT in Equations (2) and (5) are calculated from:

$$[O]_T = (4X+2)/(7X+3) \quad (6)$$

$$B_T = (4X+6)/(3X+3) \quad (7)$$

The theoretical ranges of $A_T$ an $B_T$ are $0 \leq A_T \leq \infty$; and $2 \geq B_T \geq 4/3$ corresponding to $0 \leq X \leq \infty$ when the catalyst has spinel structure. Further reading can be found in the journal publication: G. Akay, Catalysts, 10 (2020) 152.

The mapping of the constituent elements of the catalyst (Co or Mn, Si and O) is carried out by EDS at small magnifications (30×-100×) to obtain the average atomic concentrations in a given location. At least 2 particles were examined. Afterwards, using the elemental mapping in the layered EDS images, several (usually 20) spot analysis were performed both at catalyst (Co or Mn)-rich and catalyst-depleted areas. In four of the regions with the highest (and the lowest) catalyst, concentrations of the catalyst, support and lattice oxygen were averaged to obtain $A_0$, $A_1$, $A_2$, $B_0$, $B_1$, $B_2$ as well as the catalyst and oxygen heterogeneity indices, $H_A$ and $H_B$ using Equations (4) and (5) were evaluated. Further details can be found in the journal publication: G. Akay, Catalysts, 10 (2020) 152.

EXAMPLES

Microwave Induced Plasma Generation with Barium Titanate

Example-1. Plasma Generation and Nitric Oxide Production During the Microwave Irradiation of Barium Titanate Particles in Air It was found that when $BaTiO_3$ (BT) spheres (which were washed with 0.1 M $HNO_3$ and then with water before use) were irradiated with microwave, they produced plasma. Prolonged irradiation with plasma generation caused structural changes which is indicative of electrical activity within the particles. When nitric acid was replaced by sulfuric acid or phosphoric acid, plasma generation was also achieved. Plasma generation in air was carried out using 100 g spherical $BaTiO_3$ particles (3 mm diameter) in a microwave reactor produced by Milestone S.R.I. (Italy). $BaTiO_3$ particles were placed in a 200 ml conical flask with air inlet and gas outlet. Outlet gases were fed into an on-line nitric oxide analyzer with a full range of 0-500 ppm. Plasma generation could be visually observed via a camera fitted to the reactor. Either continuous or programmed (10 sec on followed by 20 sec off) microwave power was applied. Temperature of the barium titanate was also recorded on-line.

FIG. 1 illustrates the generation of nitric oxide, NO, during microwave radiation of barium titanate particles in air. Here, we used a programmed microwave irradiation which provides a more energy efficient nitrogen fixation from air. If the full microwave power (at 200 W) is imposed during processing, after an induction period of ca. 30 s, nitric oxide generation reaches above 500 ppm (maximum detection limit) within 40 s.

It can be seen from FIG. 1 that nitric oxide continues to evolve even when the microwave is turned off. The rate of evolution increases with increasing time in the time scale used in the experiments. Temperature (not shown in FIG. 1) also increases in a manner similar to the evolution of NO and reaches 118° C. within 150 seconds. We can therefore assume that BT-particles are still in their paramagnetic state because the Curie temperature for BT is ca. 130° C. Programmed microwave irradiation is therefore useful to lower energy cost and reactor temperature.

Example-2. Structural Changes in Microwave Irradiated Barium Titanate Particles XRD-studies: The structural characteristics of the materials are determined by XRD, SEM and EDX-Spectroscopy. The diffraction angles (2θ) and the associated reflection planes (shown in parenthesis after 2θ) for $BaTiO_3$ shown below with the dominant phase appearing at 2θ=31.6°

$BaTiO_3$-2θ, (Reflection plane)=22.2°, (100); 31.6°, (101); 39.0°, (111); 45.1°, (002); 45.5°, (200); 50.8°, (102); 51.1°, (201); 56.1°, (112); 56.4°, (211); 65.5°, (202); 66.2°, (220).

Figure 2:
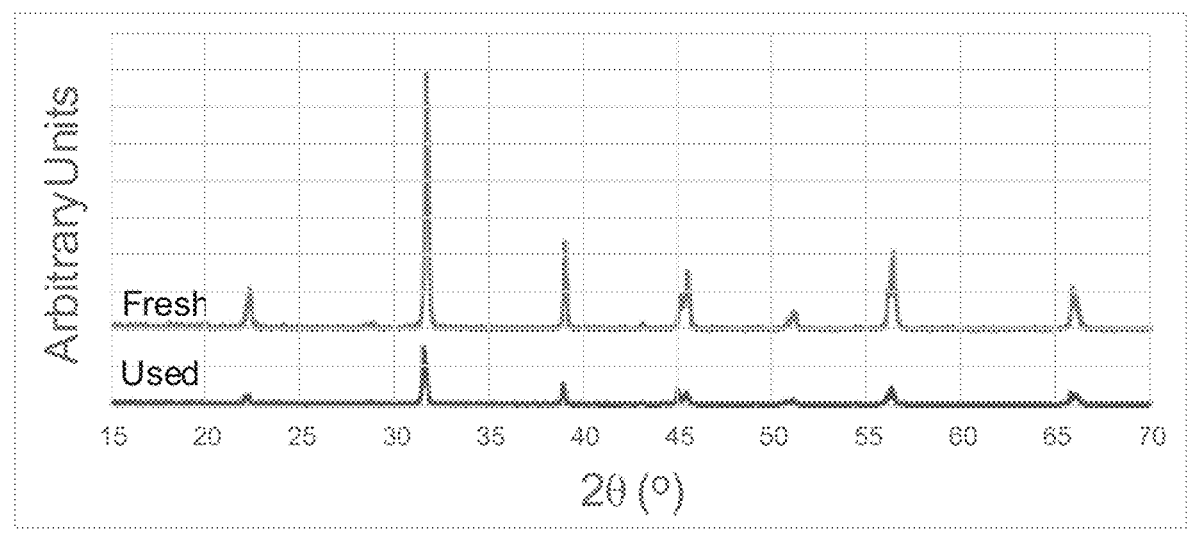
FIG. 2 shows the XRD patterns of $BaTiO_3$ samples before microwave irradiation (fresh) and after microwave irradiation (used) at 1800 W with plasma generation.

$BaTiO_3$ spheres (3 mm diameter) were irradiated for 2 minutes at 1800 W and allowed to cool to room temperature. This ensures that the paraelectric nature of $BaTiO_3$ is maintained at the start of the irradiation. The process is repeated 5 times. Fresh and microwave irradiated $BaTiO_3$ particles were then crushed and XRD measurements were taken. The results are shown in FIG. 2. Barium titanate before and after microwave irradiation does not show any significant variation in peak position or appearance of new phases as seen in FIG. 2. However, it is found that microwave radiation and plasma generation result in the reversal of the intensities associated with phases (002) and (200); (102) and (201); (112) and (211); (202) and (220). The XRD patterns in FIG. 2 indicate that the crystallographic structure of both $BaTiO_3$ samples is tetragonal at room temperature. The intensity reversal indicates that the polycrystalline ferroelectric $BaTiO_3$ had acquired piezoelectric domains through dipole alignment. This transformation is reflected when ferroelectric ceramics are poled to induce piezoelectric functionality through the application of a high electric field across the ceramic materials, such as perovskites, including $BaTiO_3$. In ceramic poling, the application of the electric field is directional, whereas in the present case of microwave irradiation $BaTiO_3$ spheres, the dipole orientation field is random which thus introduces localized piezoelectric domains which create high electric fields within the material. De-poling can be achieved through the application of high electric field of through increasing the temperature above Curie Temperature ($T_{Curie}$). For $BaTiO_3$. $T_{Curie}$—130° C. and hence, through the method used in generating plasma where the temperature was kept below 120° C., $BaTiO_3$ was not de-poled and it kept its piezoelectric properties as evident from the intensity reversal in XRD peaks.
{Shao, S.; S.; Zhang, J.; Zhang, Z.; Zheng, P.; Zhao, M.; Li, Jichao; Wang, C. *High piezoelectric properties and domain configuration in $BaTiO_3$ ceramics obtained through the solid-state reaction route.* J. Phys. D: Appl. Phys. 2008, 41, 125408;
Li, F.; Wang, Q.; Miao, H. *Giant actuation strain nearly 0.6% in a periodically orthogonal poled lead titanate zirconate ceramic via reversible domain switching.* J. Appl. Phys. 2017, 122, 074103}

The dominant phase (101) (appearing at 2θ)=31.6° is a highly orientated phase and it can be promoted through processing. However, due to sintering, crystallite size at 2θ=31.6° increases upon irradiation from 43.6 nm to 79.9 nm. The increase in crystallite size across most of the reflections is observed as shown on Table 1. The intensities of the peaks at 2θ=45.1° (Reflection (002)) and 2θ=66.2° (Reflection (220)) increase upon irradiation. The peak at 2θ=66.2° for the fresh sample is too weak to calculate the crystallite size.

EDS Studies: The purpose of the Energy Dispersive X-ray Spectroscopy (EDS) is to determine the chemical heterogeneity of the perovskites ($BaTiO_3$) plasma catalysis promoters and relate these chemical variations to the structural changes as a result of microwave induced plasma generation.

Figures 3A, 3B:
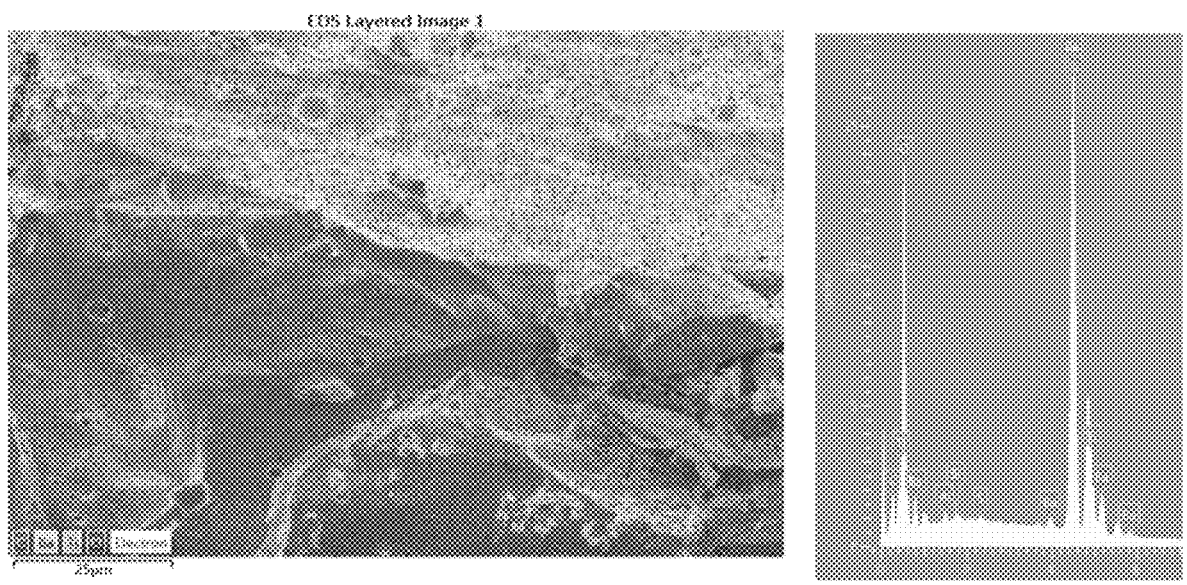
FIGS. 3A-3B show the $BaTiO_3$ (fresh) used in the experiments.

FIGS. 3A-3B illustrate the typical image of fresh $BaTiO_3$ particle and its overall EDS characteristics. It can be seen that the $BaTiO_3$ has no distinguishing features, and the chemical heterogeneity is not significant as evaluated through EDS spot-analysis at various locations. The results show that the composition is very close to its theoretical value.

Figures 4A, 4B:
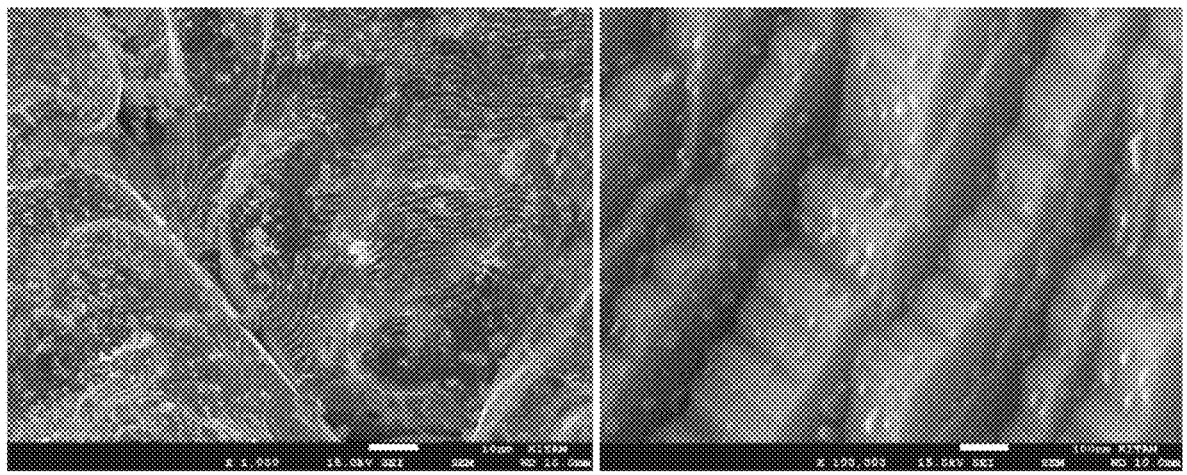
FIGS. 4A-4B show the dominant structure of DBD-plasma (100 W) treated $BaTiO_3$ particles at two magnifications with composition evaluated by EDS.

Fresh $BaTiO_3$ particles (3 mm diameter) were packed into a Dielectric Barrier Discharge (DBD) reactor described previously {U.S. Pat. No. 9,416,019, 2016} and exposed to plasma generated by the application of electric field at 100 W for 50 hours while passing dry air through the reactor bed with temperature at 100° C. FIGS. 4A-4B illustrate the fine structure of a plasma exposed $BaTiO_3$ particle surface at two magnifications (1 k and 100 k) as a reference. FIG. 4A shows the presence of large $BaTiO_3$ grains (ca. 100 μm) and the development of layered/herringbone structures which are typical of the tetragonal phase of ferroelectric material. EDX-spectra of these structures in FIGS. 4A-4B do not indicate any chemical modification such as the presence of nitrogen. Their chemical structure at different locations and magnification are very similar with [Ti]/[Ba]=1.04 and [O]/([Ba]+[Ti])=2.12 On the other hand, when $BaTiO_3$ particles are subjected to microwave irradiation with plasma generation, in addition to the presence of structures similar to those shown in FIGS. 4A-4B, additional crystal structures are observed with highly significant spatial variations reflected in changes in their chemical composition, including the presence of nitrogen.

Figure 5:
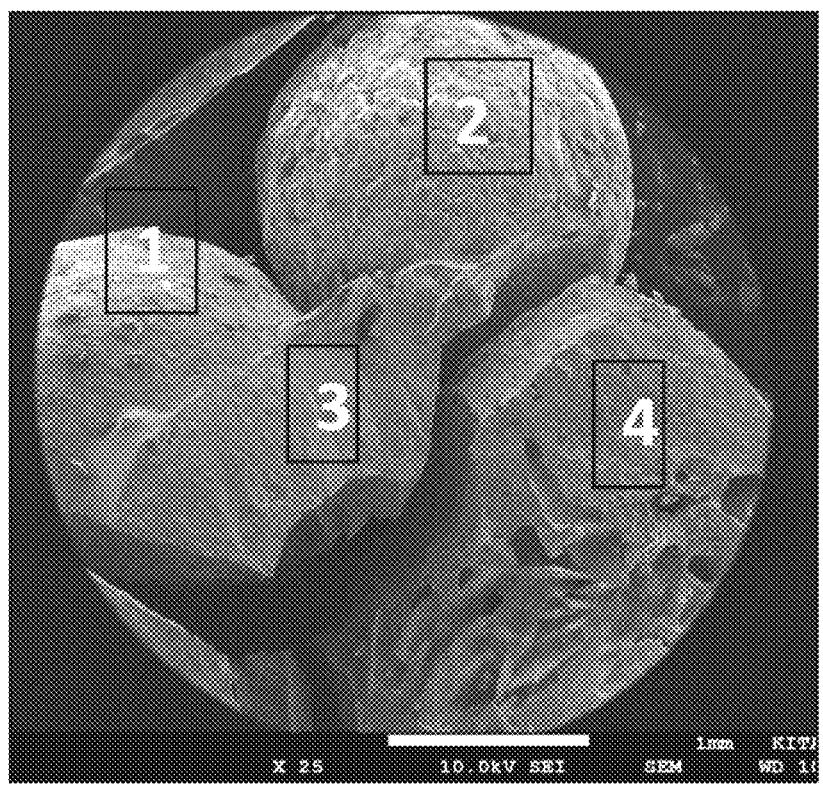
FIG. 5 shows SEM of $BaTiO_3$ particles obtained after microwave irradiation at 1800 W for 10 minutes with plasma generation in air showing microwave plasma induced sintering, particle surface and fracture surface characteristics, void formation and electrical treeing.

FIG. 5 is a SEM image of a collection of 4 $BaTiO_3$ particles (Particles 1-4) with diameter of 3 mm, following microwave irradiation in air at 1800 W for 10 min with plasma generation. These particles represent all the features seen in individual particles examined. They show the intact particle surface, fractured particle surface, sintering and the effect of microwave induced plasma generation in $BaTiO_3$ through void formation and electrical treeing (Lichtenberg phenomenon) as a result of dielectric breakdown under high electric field.

TABLE 1

$BaTiO_3$ crystallite size at various reflections before and after microwave irradiation at 1800 W

| 2θ (°) | 22.3 | 31.6 | 39.0 | 45.1 | 45.5 | 51.1 | 56.1 | 56.4 | 65.9 | 66.2 |
|---|---|---|---|---|---|---|---|---|---|---|
| Size (nm) Fresh | 32.4 | 43.6 | 72.9 | 46.6 | 39.0 | 23.9 | 65.9 | 44.3 | 63.7 | — |
| Size (nm) Irradiated | 29.3 | 79.9 | 66.7 | 90.1 | 50.7 | 33.6 | 70.2 | 57.9 | 73.8 | 63.8 |

The ferroelectric and piezoelectric characteristics of dielectric materials result in the high electrical activity and plasma sustention below Curie temperature above which they behave like paraelectric materials which show lower plasma catalytic activity. Therefore, other perovskites such as $Pb_xZr_{1-x}TiO_3$ (Lead Zirconate Titanate, PZT) with Curie temperature ca. 330° C. should be employed at high operating temperatures.

Figures 6A, 6B:
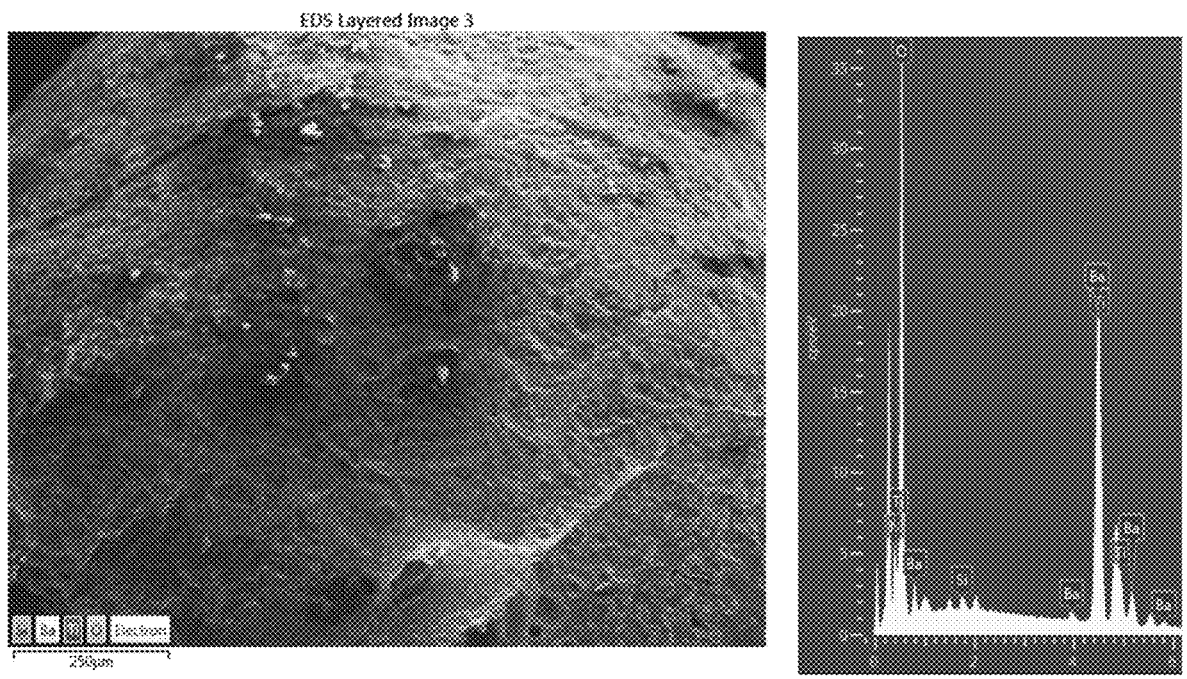
FIGS. 6A-6E show the effect of 10 minute microwave irradiation at 1800 W in air with plasma generation and the surface modification of $BaTiO_3$ particle (Particle-1 in FIG. 5).
Figures 6C, 6D, 6E:
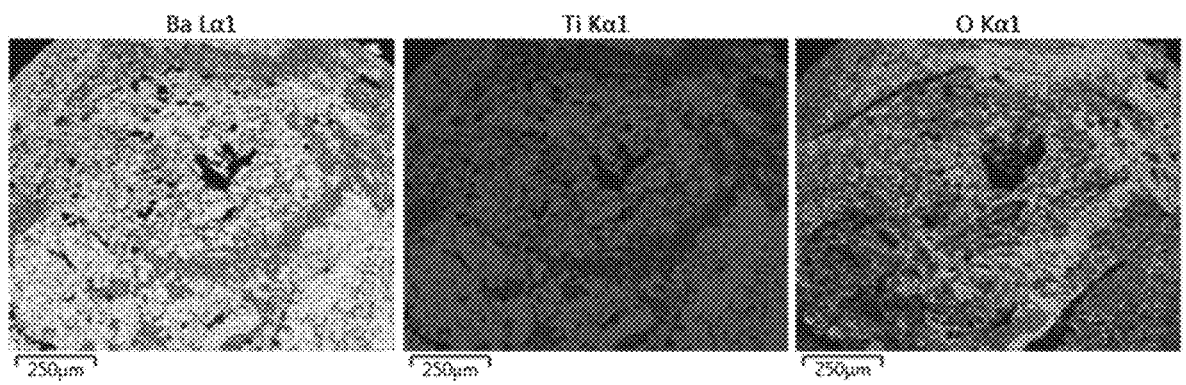

The effects of microwave irradiation with plasma generation are described in FIGS. 6A-6E and FIGS. 8A-8E. FIG. 6A is the EDS layered image of Particle-1, showing the distribution of the elements of $BaTiO_3$. It is clear from this image that there are regions where oxygen appears to be in excess compared with the theoretical composition. The presence of excess oxygen is confirmed through the EDX-spectra of the surface, such as shown in FIG. 6B as well as the elemental mapping of Ba, Ti and O. EDX-spectrum of the surface yields: [Ba]=0.123; [Ti]=0.094; [O]=0.682; [N]=0.101 with [Ba]/[Ti]=1.31 and [O]/([Ba]+[Ti])=3.14. These results indicate that the particle surface has Ba—O termination accommodating O-rich $BaO_3$ composition and a negatively charged surface. Here each Ba ion is coordinated by six O ions. It is thus possible to have bonding between N and $BaO_3$ surface structure which accounts for the presence of nitrogen. The distribution of oxygen and nitrogen on this sample as well as other samples are further investigated below (FIGS. 8A-8F) and it is shown that N-rich and O-rich regions always overlap.

This result indicates that $BaTiO_3$ surfaces can be doped with nitrogen by microwave induced plasma. Such a process increases its oxygen exchange capacity and plasma generation ability.

Figures 7A, 7B:
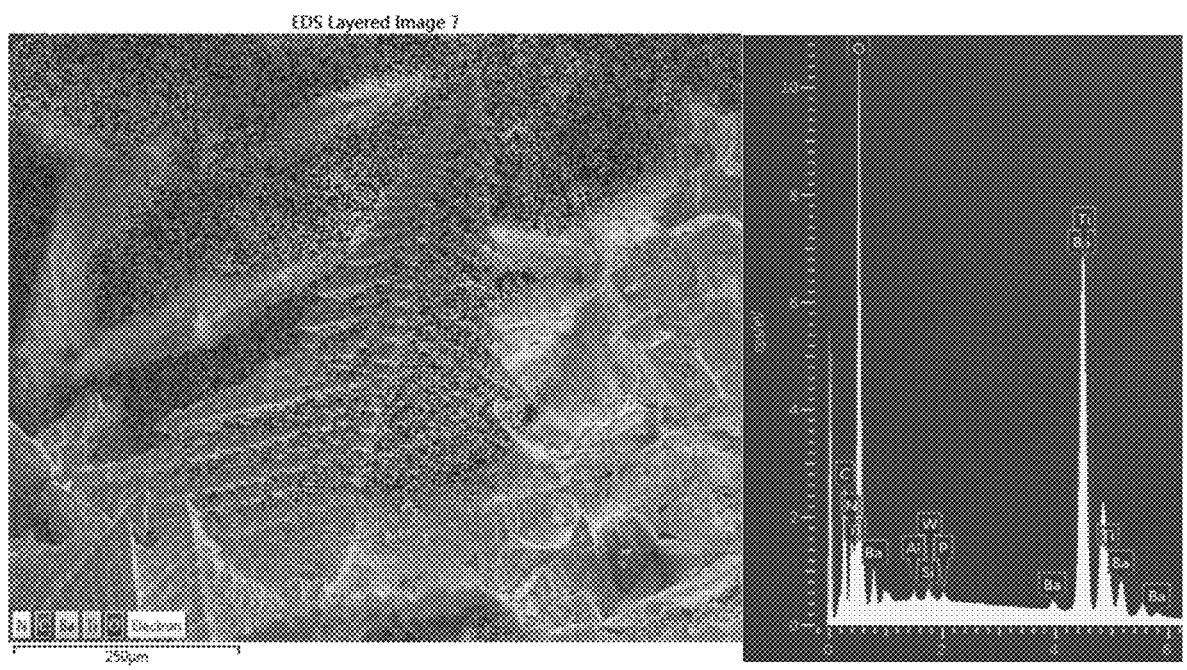
FIGS. 7A-7F show the effect of 10 minute microwave irradiation at 1800 W in air with plasma generation inside the $BaTiO_3$ particle (Particle-4 in FIG. 5).
Figure 7C:
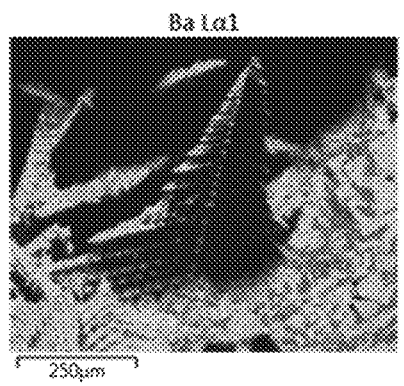
Figure 7D:
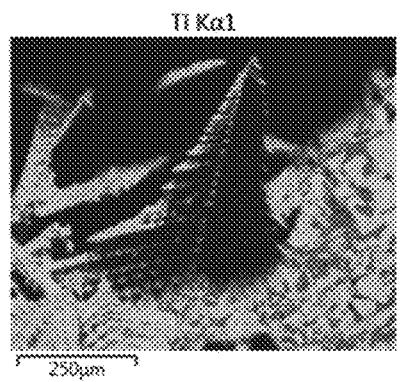
Figure 7E:
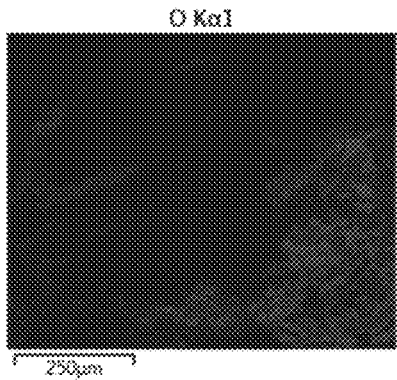
Figure 7F:
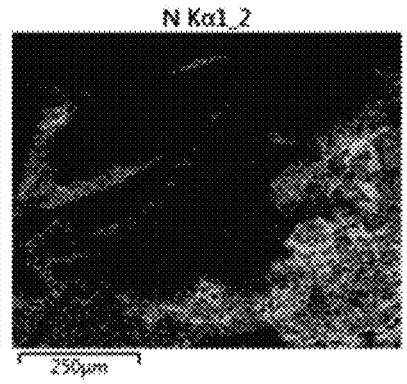

FIGS. 7A-7F and FIGS. 8A-8F show how the inner regions of $BaTiO_3$ particles are affected by plasma. FIG. 7A is the EDS-layered image of the fracture surface of Particle-4 shown in FIG. 5. It shows an electrical treeing image in which regions of O-rich and N-rich regions co-exist. EDX-spectrum yields the following molar fractions: [O]=0.660; [N]=0.096; [Ba]=0.131; [Ti]=0.112; [Ba]/[Ti]=1.17 and [O]/([Ba]+[Ti])=2.72. This data indicate that the chemical structure in this region is similar to that shown in FIGS. 6A-6E.

FIGS. 8A-8F show the summary of the EDS results for the interface region containing both surface of the Particle-1 and the fractured region of Particle-3. EDS layered image for this particle shown in FIG. 8A indicates the presence of O-rich and N-rich regions which are superimposed and scattered throughout the sample. The summed map of the EDX-spectrum of the same area shown in FIG. 8B reflects the presence of nitrogen which is further illustrated in the mapping of Ba, Ti, O, and N as shown in FIGS. 8C-8F.

Figures 8A, 8B:
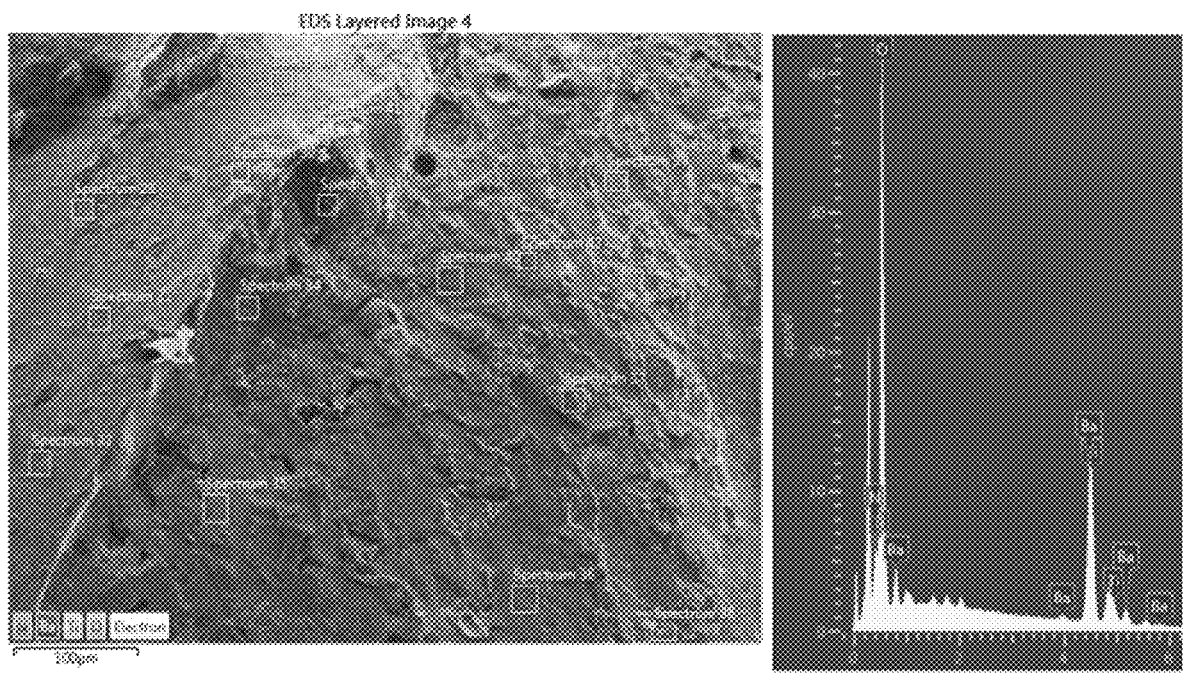
FIGS. 8A-8F show the effect of 10 minute microwave irradiation at 1800 W in air with plasma generation inside the $BaTiO_3$ particle (Interface region of Particles-3 and 4 in FIG. 5).
Figure 8C:
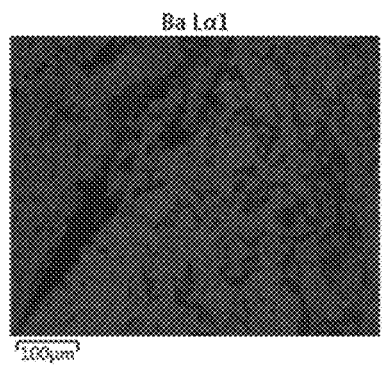
Figure 8D:
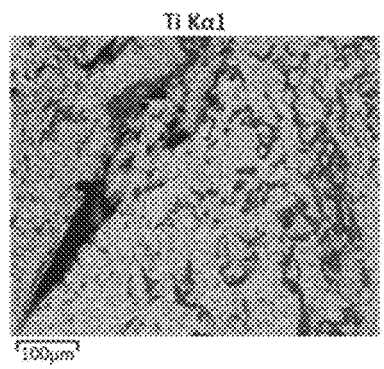
Figure 8E:
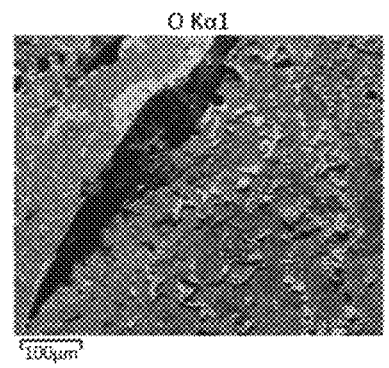
Figure 8F:
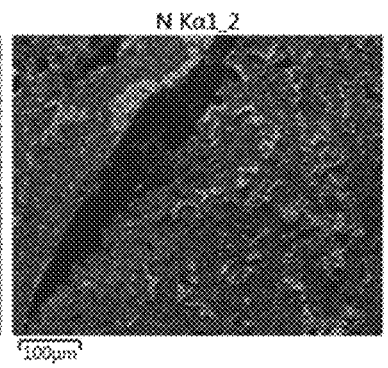

In this particle region, EDX-spectrum yields the following molar fractions: [O]-0.642; [N]=0.034; [Ba]=0.176; [Ti]=0.148; [Ba]/[Ti]=1.19; [O]/([Ba]+[Ti])=1.98 which show that the chemical structure in this region is similar to that shown in FIGS. 6A-6E and FIGS. 7A-7F. In confirmation with the mapping of oxygen and nitrogen, mappings shown in FIGS. 11E, 11F and FIGS. 8E, 8F clearly confirms that oxygen and nitrogen co-exist in the same region. As seen in FIG. 8A, several local EDX-spectra are also taken in order to examine more closely chemical compositions, in particular the presence and location of nitrogen.

Figure 9:
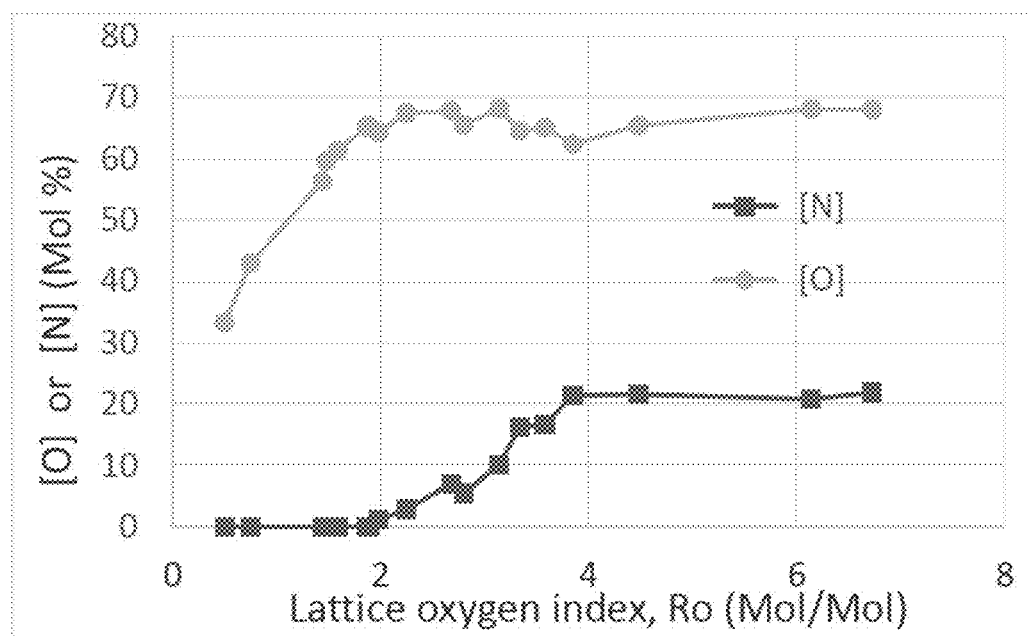
FIG. 9 shows the variation of oxygen and nitrogen concentrations as a function of lattice oxygen index, $R_o$ ($R_o$=[O]/([Ba]+[Ti])) in microwave irradiated $BaTiO_3$.

The EDS data is summarized in FIG. 9. The oxygen-rich barium terminated characteristics of $BaTiO_3$ surfaces is represented as the molar ratio of oxygen and the sum of Ba and Ti by the lattice oxygen index, $R_O$ defined as $R_O$=[O]/ ([Ba]+[Ti]). The stoichiometric value of $R_O$=1.5. At $R_O$=1.5, [O]=0.6 as expected. FIG. 9 shows that nitrogen is absent when $R_O$<2 and its concentration increases rapidly with $R_o$ reaching an asymptotic value of ≈22 mol % when $R_O$>4. Oxygen concentration increases with $R_o$ reaching an asymptotic value of ≈68 mol %. As seen in FIG. 9, when $R_O$<1.5 and [O]<0.6.

Figures 10A, 10B, 10C:
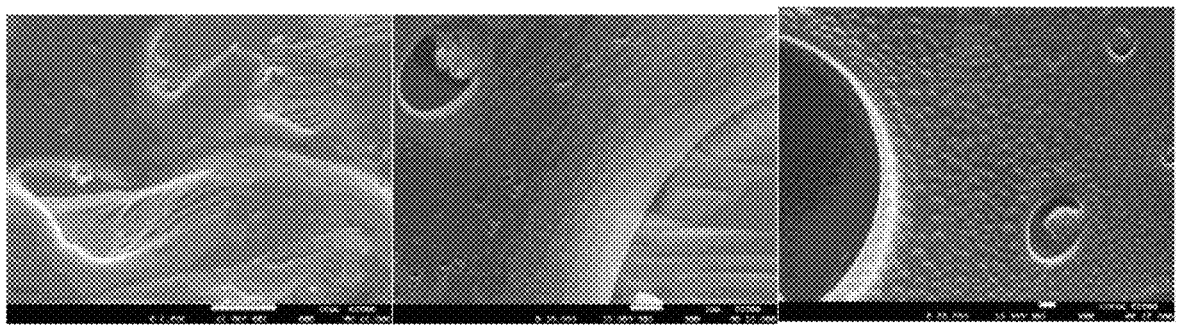
FIGS. 10A-10I show the SEM images of the $BaTiO_3$ particles after microwave irradiation and plasma generation at 1800 W for 10 minutes in a region without electrical treeing showing structural changes.
Figures 10D, 10E, 10F:
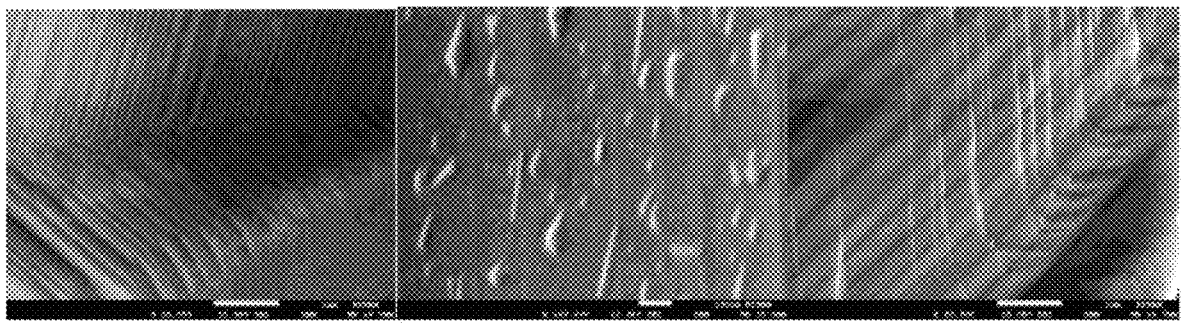
Figures 10G, 10H, 10I:
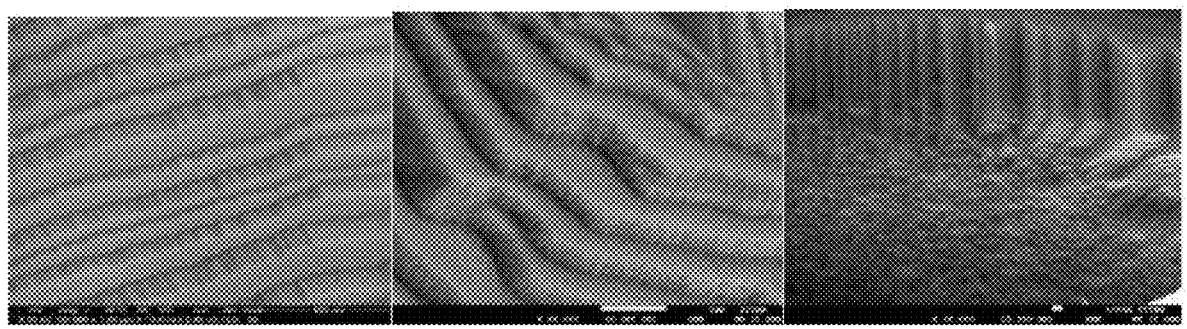

SEM Studies: The changes in the crystal morphology in $BaTiO_3$ following microwave irradiation with plasma generation are studied by Scanning Electron Microscopy (SEM). Microwave irradiation (carried out at 1800 W for 10 min) appears to result in extensive structural changes as shown in FIG. 10A-10I. These changes include the formation of porous surface skin and phase separation as seen in FIG. 10A-10C. The formation of fine layered structure in microwave irradiated samples with plasma generation is shown in FIGS. 10E-10I at various stages of morphological change. The layered structure in FIG. 10D is similar to that which was observed after prolonged plasma exposure as shown in FIG. 5B except that the layer thickness is significantly smaller at ca. 200 nm. FIG. 10E also indicates phase separation in the layered structures as well as formation of nano-sized holes. FIGS. 10F, 10G show solid state delamination which is due to internal stresses generated as a result of phase separation shown in FIG. 10E as well due to thermal gradient induced during irradiation. FIG. 10H indicates the presence of fragmentation of the layered structures which can be attributed to phase separation, FIG. 10I is another example of the fragmentation of the laminated structures which do not appear to have any grains formed by phase separation. This type of layered structure fragmentation can be attributed to the development of high internal stresses due to high temperature gradients.

These inventions are important in explaining the vast chemical heterogeneity observed in both microwave irradiated $BaTiO_3$ as well as in "composite" catalysts containing large amounts of $BaTiO_3$ which appear to delaminate/exfoliate or fragment and subsequently act as a co-support for the catalyst. Therefore, perovskites can be used as a co-support for the catalysts in order to enhance the electromagnetic radiation absorption and plasma generation.

Figure 11A:
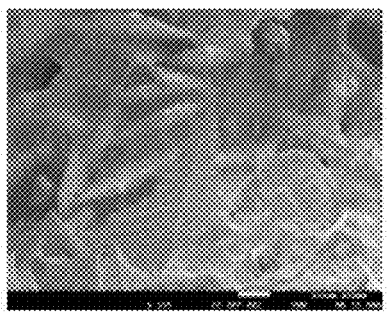
FIGS. 11A-11H show the SEM images of the electrical tree formed when $BaTiO_3$ particles were microwave irradiated with plasma generation at 1800 W for 10 minutes.
Figure 11B:
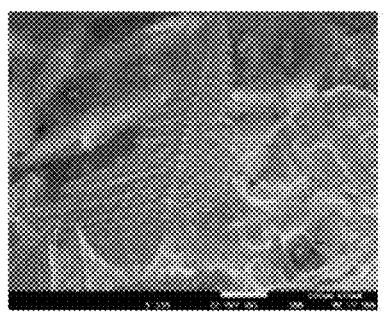
Figure 11C:
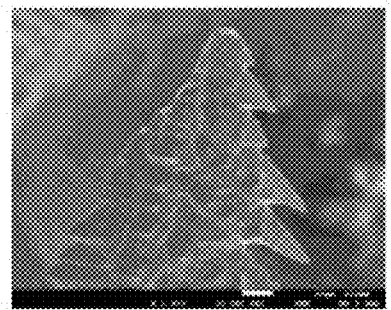
Figure 11D:
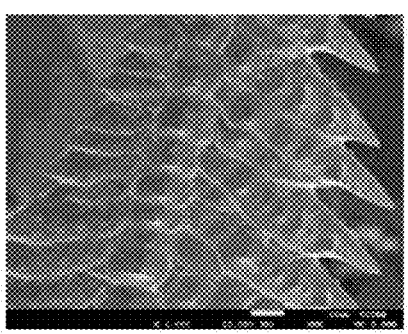
Figure 11E:
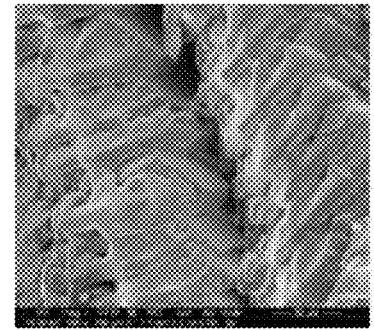
Figure 11F:
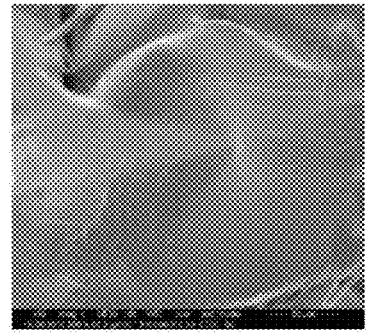
Figure 11G:
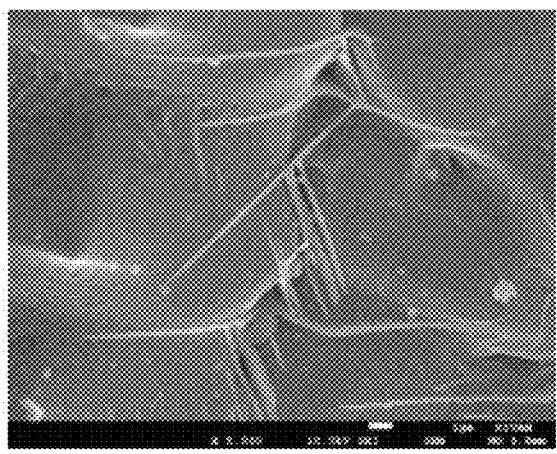
Figure 11H:
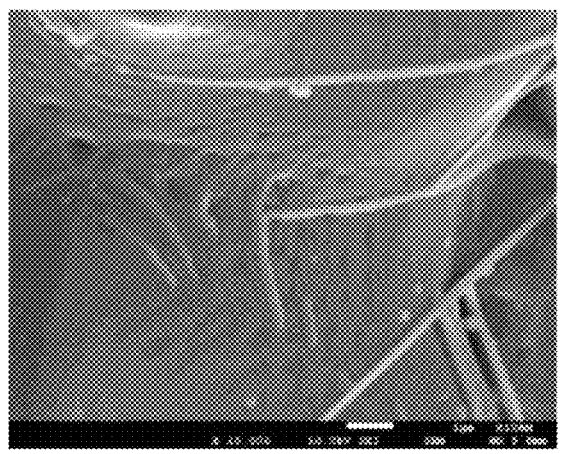

Another important structural feature is the formation of electrical trees as discussed previously. SEM images of these structures are shown in FIGS. 11A-11H. FIGS. 11A-11D represent the image of an electrical tree at various locations and magnifications. The central stalk of the electrical tree consists of closely packed vertebral particles which are also present near the electrical tree as seen in FIGS. 11A-11B. The enlarged views of these structures are shown in FIGS. 11E-11F. In all of these images, there appears to be present several needle-like growths across the entire region. The details of the needle-like structures are shown in FIGS. 11F-11H.

It can be seen from these images that the needle-like structures are in fact thin-narrow plates (ca.50 nm thick) formed through partial exfoliation of the layered structures. It is also apparent that this process results in the formation of extensive voiding measuring ca. 0.5-1 µm in length and 0.2 µm in width. The formation of pores, platelets and these rectangular voids are useful in the promotion of plasma and catalytic activity.

Start of Plasma Generation in Single Catalyst as a Function of Catalyst/Support Ratio Example 3

It was found that, subject to the type of catalyst (either binary or single) and catalyst loading, there appeared to be a critical power required in order to initiate the catalyst nitrate decomposition. Prolonged microwave irradiation does not initiate the catalyst nitrate decomposition. In these experiments, we determine the critical microwave power P*, as a function of catalyst concentration as well as catalyst atomic number.

Table 2 shows the variation of the critical power P* with atomic number of catalysts when M/Si=1/3. It can be seen that low atomic weight catalysts have P*<340 W and for catalyst with atomic number greater than 27 (Co), P* increases rapidly. For Copper, P* is greater than 1800 W. We also present the tap-density of the supported catalyst evaluated at 900 W for all samples. Average tap density is approximately constant at 0.065 $g/cm^3$.

Previously, based on the behavior of Nickel catalyst, it was speculated that P* increased with increasing catalyst concentration (G. Akay, Catalysts 5 (2016) 80). In Table 3, the variation of critical power P* is presented for three catalysts, Mn, Co, Cu. It can be seen that, indeed P* increases with increasing concentration in the case of Cu and Co while for Mn, the value of P* is <340 W (and hence it was not possible to determine P*). However, we observe that for Co, P* increases with catalyst concentration and when Co/Si>1/3, it reaches maximum. P* becomes constant at higher concentrations.

TABLE 2

Critical power (P*) for selected d-metal transition catalysts when M/Si = 1/3

| Metal | Cr | Mn | Fe | Co | Ni | Cu |
|---|---|---|---|---|---|---|
| Atomic No. | 24 | 25 | 26 | 27 | 28 | 29 |
| P* (w) | <340 | <340 | <340 | 720 | 1080 | >1800 |
| Tap density (g/cm$^3$) | 0.072 | 0.063 | 0.081 | 0.058 | 0.061 | 0.057* |

*Note:
Although Cu(NO$_3$)$_2$/SiO$_2$ does not decompose, porous structure of Cu(NO$_3$)$_2$/SiO$_2$ is still obtained.

TABLE 3

Variation of critical microwave power (P*) with Catalyst/Silica support for Co, Cu and Mn

| | | Molar Ratio M/Si = X → | | | | | |
|---|---|---|---|---|---|---|---|
| | | 1/5 | 1/4 | 1/3 | 1/2 | 1/1 | 2/1 |
| | | Mol % of Catalyst → | | | | | |
| | | 16.7 | 20.0 | 25.0 | 33.3 | 50.0 | 66.7 |
| Critical Power P* (W) | Cobalt | <340 | 450 | 720 | 540 | 450 | 450 |
| | Copper | 1260 | 1440 | >1800 | >1800 | >1800 | >1800 |
| | Manganese | <340 | <340 | <340 | <340 | <340 | <340 |

This behavior is associated with plasma generation during microwave irradiation of certain types of catalyst oxides (spinels) when the total catalyst concentration (MT) and silica molar ratio, MT/Si, is above a critical level.

It was observed that when M/Si>1/2 (M=Mn, Co), even at the critical power P*, the catalyst precursor (Mn(NO$_3$)$_2$ and Co(NO$_3$)$_2$) decomposition is accompanied by glowing (i.e., plasma generation) under microwave irradiation even before the completion of the NO$_2$ evolution due to nitrate decomposition. We note that the critical power P* for Co reaches maximum at P*=720 W when Co/Si=1/3. When Co/Si=1/2, P*=540 W which is accompanied with the start of the plasma generation. Further increases in Co/Si values results in reduction in P* and plasma generation continues.

In order to investigate the effect of plasma generation on the catalyst structure, subsequent experiments were carried out using Mn and Co at microwave power P=1800 W at various catalyst concentrations. Typically, at this power (P=1800 W) the experiments take 60 seconds. Of these 60 seconds, 20 secs are used for water evaporation, 20 secs are consumed for nitrate decomposition, towards the end of which plasma starts. Plasma is allowed to continue for another 20 seconds. Temperature of the resulting catalyst was measured using an IR-thermometer immediately after the stopping of the microwave irradiation. Typical, final temperature was ca. 270-300° C. at P=1800 W. However, the expected local temperatures within the catalyst can reach 2000° C. rapidly and therefore the catalyst preparation takes place under non-equilibrium conditions. In some experiments, the resulting catalyst was allowed to cool down to room temperature and subjected to further microwave irradiation. Once again, with Mn and Co catalysts, plasma was generated if M/Si>1/2. In all cases, when the microwave power was turned off, the plasma itself was extinguished within seconds.

In order to assess the effect of microwave induced plasma on the structure of the M/Si>1/2 catalysts, we use Scanning Electron Microscopy and quantify these structural characteristics by Energy Dispersive Spectroscopy (EDS). The data shows that these catalysts have unique structure which can be described as having a highly heterogeneous morphology required in an efficient catalyst especially for catalysts used in plasma synthesis. The reason for their high activity is that the morphological and chemical irregularities (heterogeneities) expose a large number of so called "step sites" which are far more active than so called "terrace sites". This activity is associated with low activation energy for the absorption of the reactant molecules on the catalyst surface. Furthermore, if the porosity of the catalyst is low, these active sites will not be accessible, and the catalyst will have low activity. In addition, in porous plasma catalysts, the pore size is also important because the plasma generated on the surface of the catalyst does not penetrate into the catalyst pores. The theoretical limit of pore size for plasma generation is ca. 50 nm. Another desired characteristic of plasma catalysts is that their morphology should contain sharp edges in order to enhance electron emission across the pores thus promoting plasma activity. Another desired feature of the plasma catalyst is that they should act as an oxide semiconductor nano-sheets/plates which can absorb radiation energy and cause charge separation and electron transfer which are encountered in artificial photosynthesis. Therefore, in the SEM based evaluation of the plasma catalysts produced by the current method, the presence of such characteristics is sought and identified.

Example 4. Simultaneous Plasma Generation and Synthesis of Silica Supported Spinel Type Single Catalysts Silica supported single catalysts were exemplified by using two catalyst systems; Co/Si=X and Mn/Si=X. After the synthesis of the catalysts, they were characterized by XRD, EDS and SEM in order to illustrate that their chemical and morphological structures had very large heterogeneity which result in high activity in subsequent plasma reactions.

XRD studies: The summary of the XRD studies for Co/Si=X (X=1/9; 1/3; 1/1; and 2/1) are shown in Table 4. XRD patterns with no plasma generation indicates that the synthesized catalysts have spinel structure represented as AB$_2$O$_4$. In the case of Co/Si catalysts, XRD pattern indicates Co$_3$O$_4$ spinel structure provided that Co/Si<1/2. The standard diffraction angles (2θ) and the associated reflection planes (shown in parenthesis after 2θ) for Co$_3$O$_4$ and Mn$_3$O$_4$ are shown below:

Co$_3$O$_4$—2θ, (Reflection plane)=19.0°, (111); 31.3°, (220); 36.9°, (311); 44.8°, (400); 59.4°, (511); 65.2°, (440). The dominant phase for Co$_3$O$_4$ appear at 2θ=36.9°.

Mn$_3$O$_4$—2θ, (Reflection plane)=17.8°, (101); 28.7°, (112); 32.2°, (103); 36.1°, (211); 37.8°, (004); 44.2°, (220); 50.4°, (105); 58.2°, (321); 59.6°, (224); 64.6°, (400); 73.8° (413). The dominant phase for Mn$_3$O$_4$ appear at 2θ=33.0°.

TABLE 4

Summary of XRD results for Co/Si = X (X = 1/9; 1/3; 1/1; 2/1) catalyst with crystallite size at a given diffraction angle (2θ). Microwave radiation power is 900 W. Dominant diffraction (in bold) is at 2θ = 36.9°.

| 2θ (°) | | 19.0 | 25.3 | 31.4 | 32.1 | 36.4 | 36.9 | 38.9 | 44.8 | 55.9 | 59.4 | 65.2 |
|---|---|---|---|---|---|---|---|---|---|---|---|---|
| Reflection Type | | + | NR | + | NR | NR | + | NR | + | + | + | + |
| Crystallite | Co/Si = 1/9 | – | – | – | – | – | 4.27 | – | 4.10 | 5.36 | 4.05 | – |
| Size (nm) | Co/Si = 1/3 | 10.5 | – | 10.8 | – | – | 12.9 | – | 11.4 | 11.8 | 13.0 | 15.4 |
| → | Co/Si = 1/1 | 20.1 | | 29.1 | | | 23.8 | | 26.2 | – | 3.9 | 17.2 |
| | Co/Si = 2/1 | | 29.0 | 32.8 | 57.3 | 151 | 36.7 | 110 | 36.1 | – | 7.3 | 44.2 |

*Diffraction at 2θ = 19.0° is due to Co—Si interaction (alloying) resulting in the shift of Si peak.
(+) represents standard reflections of $Co_3O_4$, (NR) represents new reflections.

In Co/Si=X catalysts, plasma generation starts when X≥1. However, there were no phase changes detected by XRD when X=1, but several new phases at 2θ=25.3°, 32.1°, 36.4° and 38.9° appear when X=2. The nature of these phases could not be determined as they were not associated with CoO or Co. The estimate of the crystallite size indicates that some of the phases have a very large size. The crystallite size associated with the dominant peak at 2θ=36.9° increases with increasing catalyst concentration. The corresponding summary of XRD results for Mn/Si=2 is shown in Table 5.

TABLE 5

Summary of XRD results for Mn/Si = X (1/3; 1/1; 2/1) catalyst showing crystallite size with diffraction angle (2θ).

| 2θ (°) | | 17.8 | 23.0 | 28.7 | 32.2 | 33.0 | 36.1 | 37.8 | 42.2 | 44.2 |
|---|---|---|---|---|---|---|---|---|---|---|
| Reflection Type | | + | NR | + | + | NR | + | + | NR | + |
| Size | Mn/Si = 1/3 | – | 1.7 | 8.8 | – | 11.7 | 8.6 | 10.6 | – | – |
| (nm) | Mn/Si = 1/1 | | 2.2 | – | – | 22.3 | – | 20.5 | – | – |
| | Mn/Si = 2/1 | | 3.9 | – | – | 40.4 | – | 21.1 | 21.2 | – |

| 2θ (°) | | 45.1 | 49.3 | 50.4 | 55.2 | 58.2 | 59.6 | 64.6 | 65.8 |
|---|---|---|---|---|---|---|---|---|---|
| Reflection Type | | NR | NR | + | NR | + | + | + | NR |
| Size | Mn/Si = 1/3 | – | – | – | 12.0 | – | – | – | – |
| (nm) | Mn/Si = 1/1 | 19.3 | 18.4 | – | 14.4 | – | – | – | 12.3 |
| → | Mn/Si = 2/1 | 38.7 | 17.9 | – | 20.5 | – | – | – | 17.8 |

(+) represents standard reflections of $Co_3O_4$; (NR) represents new reflections As seen from Table 5, diffractions associated with $Mn_3O_4$ at 2θ=17.8°, 32.2°, 44.2°, 50.4°, 58.2°, 59.6° and 64.6° are absent in all cases when Mn/Si≥1/3; partly because of a possible shift to higher diffraction angles such as from 32.2° to 33.0° for the dominant peak associated with the (103) reflection plane. As in the previous case with Co/Si, a number of new peaks also appear at 23.0°, 42.2°, 45.0°, 49.3°, 55.2° and 65.9°. These additional peaks increase with increasing Mn concentration. Peaks at 2θ=42.2° and 45.1° can be attributed to MnO and $Mn^0$ respectively, indicating that in the presence of microwave generated plasma, Mn/Si supported catalyst precursor decomposition in air results in the formation of $Mn_3O_4$ as well as MnO and $Mn^0$. Therefore, the valence of Mn is reduced progressively from +2.67 ($Mn_3O_4$) to +2 and 0 to generate heterogeneous domains. However, this conclusion is only tentative because of the presence of weak diffractions, diffraction shifts and interaction between Mn and Si. Weak diffractions also indicate that the new phases do not have significant concentration and such phases may be localized on the pore surfaces, rather than the walls of the porous catalyst. Therefore, further investigation is carried out using SEM and EDS studies which in fact confirm this conclusion.

In conclusion, the XRD studies indicate the presence of new, but weak reflections associated with reduction of the catalyst at a local level on the surface of the pores. This is a very surprising result as the reduction reaction is taking place in the presence of oxygen in the air. This results in chemical heterogeneity which should also be reflected in morphological heterogeneity as shown by EDS and SEM studies.

Figure 12A:
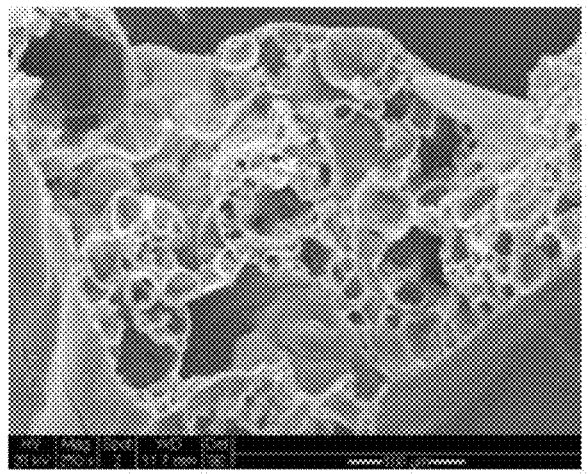
FIGS. 12A-12D show the SEM and EDS images of Co/Si=1/4 catalysts.
Figure 12B:
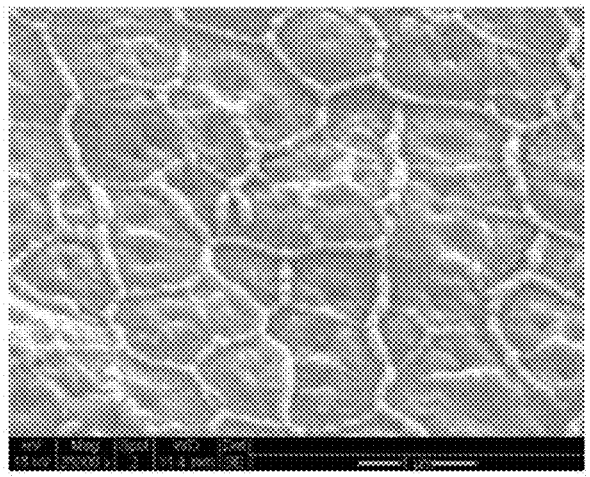
Figure 12C:
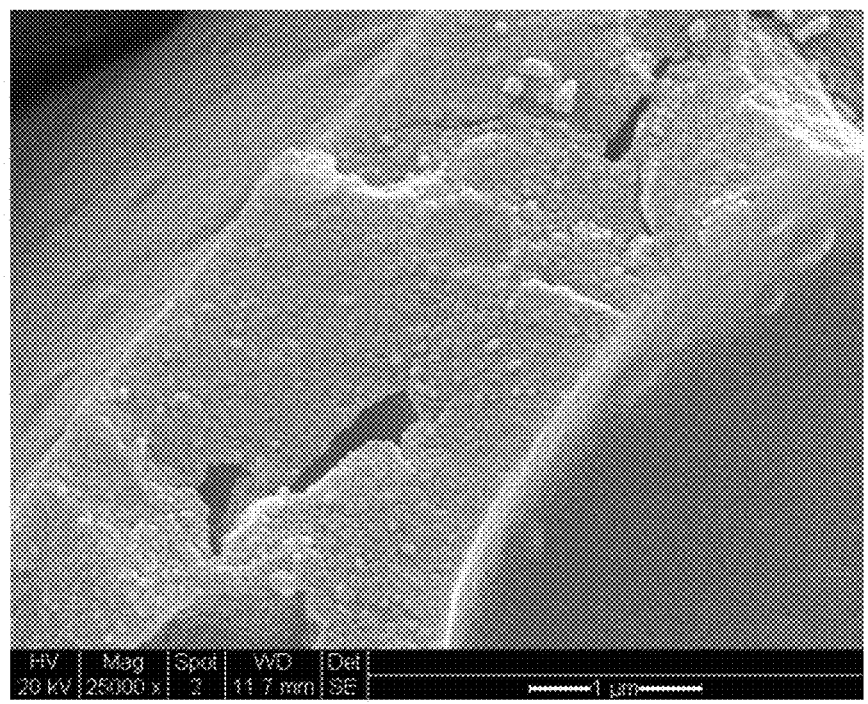
Figure 12D:
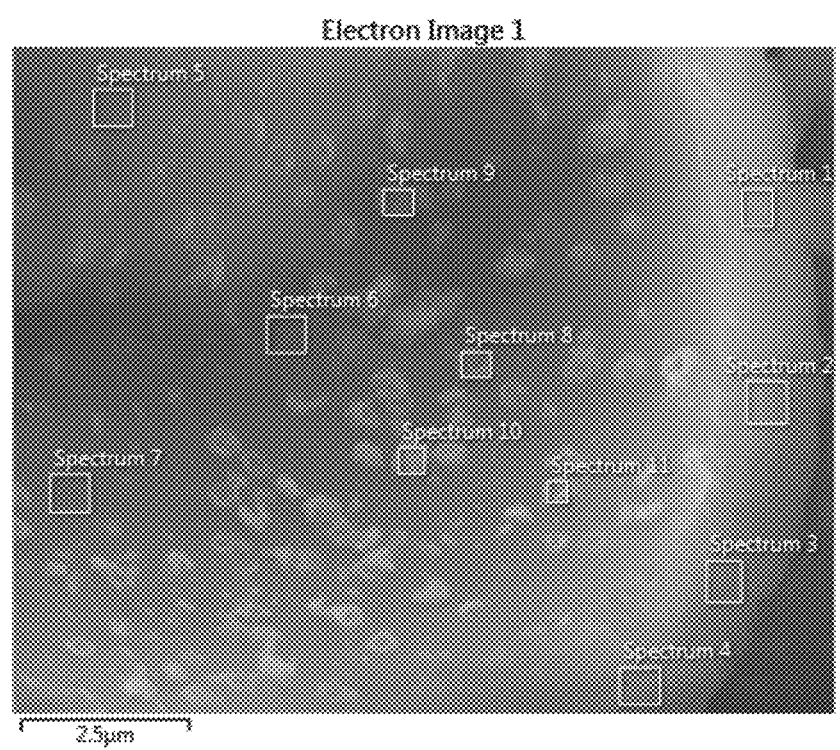

Example 5: Characteristics of Plasma Generating Co/Si=X (X=1, 2) Catalysts by EDS and SEM In the absence of any plasma generation during processing, the chemical heterogeneity results from the phase separation between metal catalyst and silica support. The phase separated regions appear as decorations on the catalyst and pore surfaces. This is illustrated in FIGS. 12A-12D for Co/Si=1/4 catalyst which does not generate any plasma. FIGS. 12B-12D show the catalyst porosity, catalyst surface decorations and the catalyst wall structure respectively. The structure shown in FIG. 12B indicates the presence of Co-rich domains in the form of decorations. These decorations cover the pore surfaces which are otherwise featureless similar to the catalyst wall. Therefore, heterogeneity is enhanced when the metal rich surface decorations are extensive and dispersed on the featureless silica rich background surface. This type of heterogeneity disappears if the catalyst is subjected to heat treatment to burn off the silica surface coating at ca. 600° C. while annealing of the cobalt rich decorations is taking place. The compositions within the pores and pore walls of the catalyst Co/Si=1/4 are evaluated using the EDS-images similar to that shown in FIG. 12D.

The heterogeneity in Co/Si=1/4 in different regions is evaluated from EDS studies and summarized in Table 6. Heterogeneity with respect to Cobalt/Silica ratio ($H_A$) and catalyst lattice oxygen ($H_B$) within the walls, on smooth surfaces and decorated surfaces are shown in Table 6.

TABLE 6

Spatial variation of catalyst-support ratios ($A_n$ n = 0, 1, 2) and catalyst lattice oxygen-supported catalyst molar ratios ($B_n$ n = 0, 1, 2) together with the corresponding heterogeneity indices $H_A$ and $H_B$ at various locations for the catalyst Co/Si = 1/4.

| Location ↓ | $A_0$ | $A_1$ | $A_2$ | $B_0$ | $B_1$ | $B_2$ | $H_A$ | $H_B$ |
|---|---|---|---|---|---|---|---|---|
| Walls | 0.281 | 0.206 | 0.408 | 2.23 | 2.34 | 1.23 | 0.808 | 0.648 |
| Smooth Surface | 0.220 | 0.202 | 0.427 | 2.00 | 2.73 | 2.19 | 0.901 | 0.315 |
| Decorative Surface | 0.288 | 0.240 | 0.382 | 2.33 | 2.84 | 2.31 | 0.432 | 0.309 |
| Total Surface | 0.272 | 0.181 | 0.414 | 2.19 | 2.41 | 1.42 | 0.932 | 0.578 |

*See Equations (1)-(5) for the definitions of the variables An, $B_n$ (n = 0, 1, 2) and $H_A$ and $H_B$ The heterogeneity index, $H_A$=0.808 for the walls is similar to the smooth surfaces $H_A$=0.901 while for the decorated surfaces $H_A$=0.432. However, if the whole surface is treated as a single entity, $H_A$=0.932, a value similar to the wall and smooth surface heterogeneity. Heterogeneity in the lattice oxygen ($H_B$) is smaller and the highest heterogeneity $H_B$ is observed in the walls and the lowest in the decorated surfaces. Nevertheless, the chemical heterogeneity in the absence of plasma is not significant compared with the case when Co/Si≥1 which is accompanied by plasma generation during processing with microwave irradiation. Therefore, in the subsequent sections, when evaluating the heterogeneity indices, we will only consider the surface rather than the walls which do not contribute significantly to the catalysis compared with the catalyst surfaces.

The characteristics of the catalysts Co/Si=1 and Co/Si=2 which are produced when plasma is generated during microwave irradiation are shown in FIGS. 13-17. FIGS. 13A-13E illustrate the elemental mapping on the surface of a Co/Si=1 catalyst particle. It can be seen from FIG. 13A and FIGS. 13C-13E that the catalyst surface is highly inhomogeneous and that although cobalt is present across the whole catalyst domain (FIG. 13C) its concentration is highly variable. Silica (FIG. 13D) and oxygen (FIG. 13E) rich-domains are closely associated indicating that the oxygen within the catalyst is mainly associated with silica, rather than with cobalt in the form of $Co_3O_4$. The average molar concentrations for this particle shown in FIG. 13A are: [Co]=0.413; [Si]=0.067 and [O]=0.520 as reflected by the EDX-spectrum shown in FIG. 13B. The comparison of the EDX-spectra for Co/Si=1/4 (FIG. 12E) and Co/Si=1 (FIG. 13B) show a large enhancement of the Co peaks due to Co concentration increase as well as cobalt distribution across the catalyst surface.

Figures 13A, 13B:
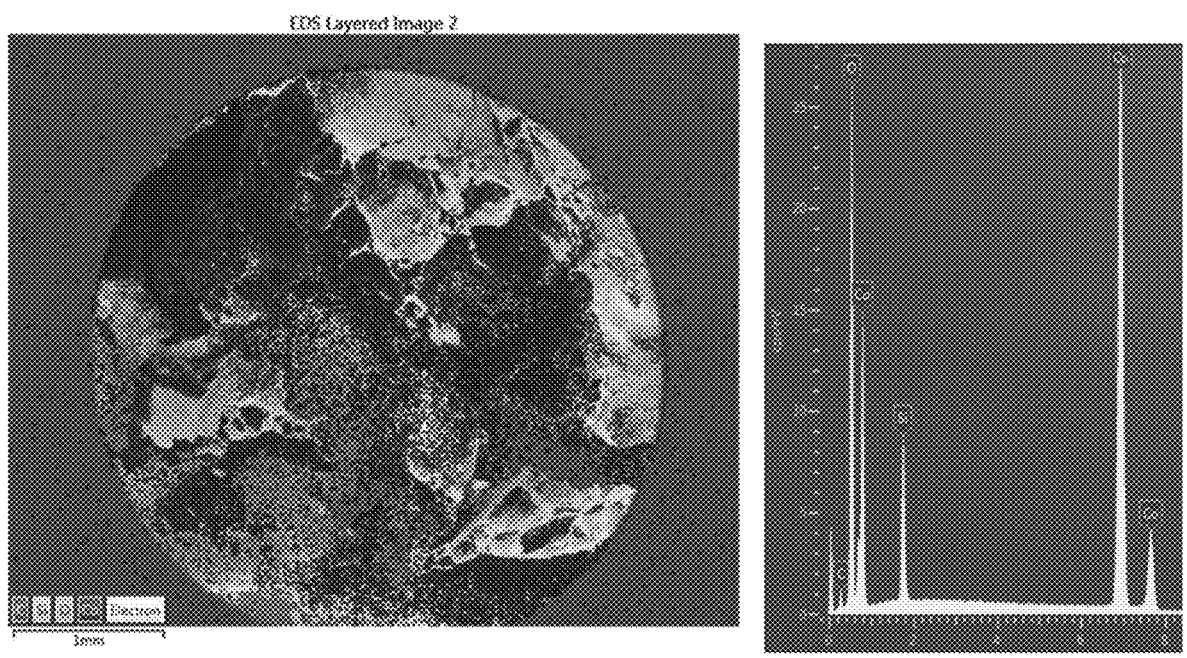
FIGS. 13A-13E show the elemental mapping and EDX-spectrum of a Co/Si=1/1 catalyst particle.
Figures 13C, 13D, 13E:
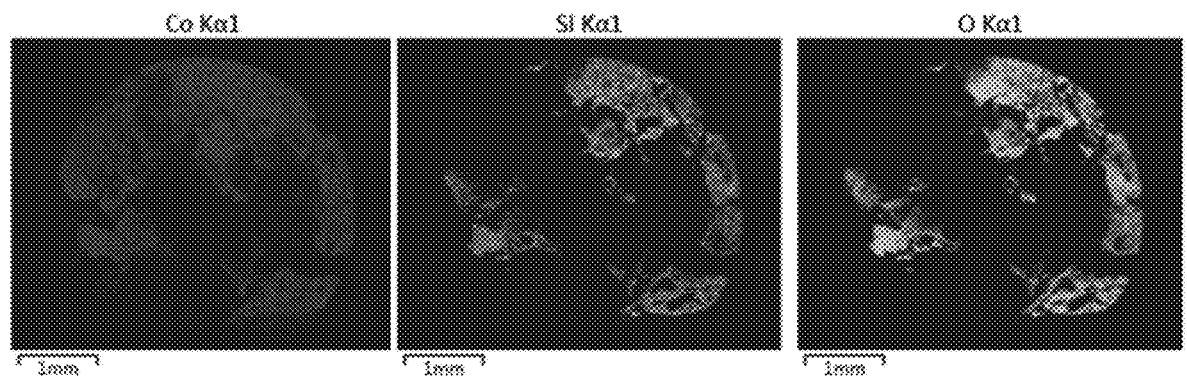
Figure 14A:
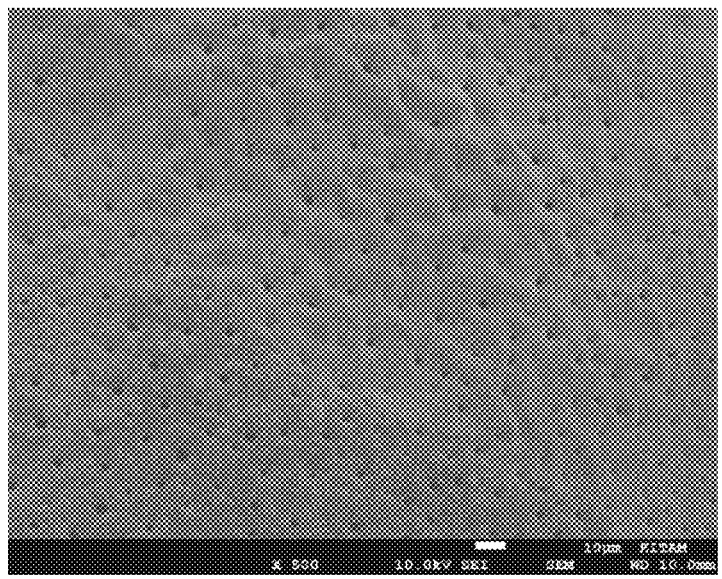
FIGS. 14A-14J show the analysis of the Co/Si=1 catalyst region where the cobalt concentration is below that of the catalyst particle illustrated in FIGS. 13A-13C. EDS and SEM images of the Co/Si=1 catalyst surface with lower-than-average cobalt concentration are presented.
Figures 14B, 14C:
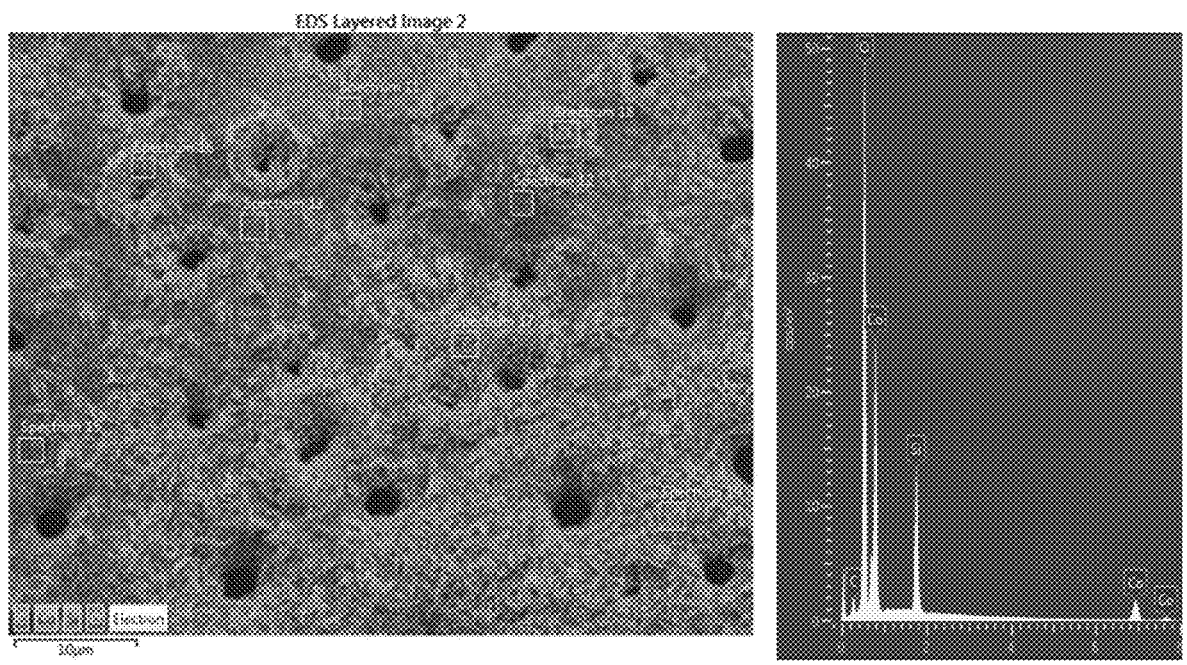
Figures 14D, 14E, 14F:
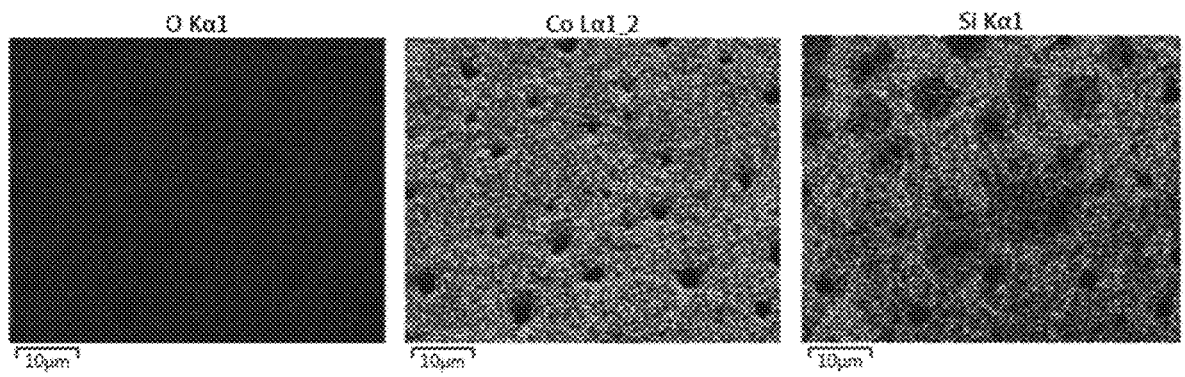

FIGS. 14A-14I illustrate the region where the cobalt concentration is below that shown for the whole particle illustrated in FIG. 13A for Co/Si=1. This is determined from the EDS layered image (FIG. 14B) and confirmed by the spectrum of the whole area as shown in FIG. 14C. The mapping of Co, Si and O shown in FIGS. 14D-14F indicates the existence of some heterogeneity in chemical composition.

Figures 14G, 14H:
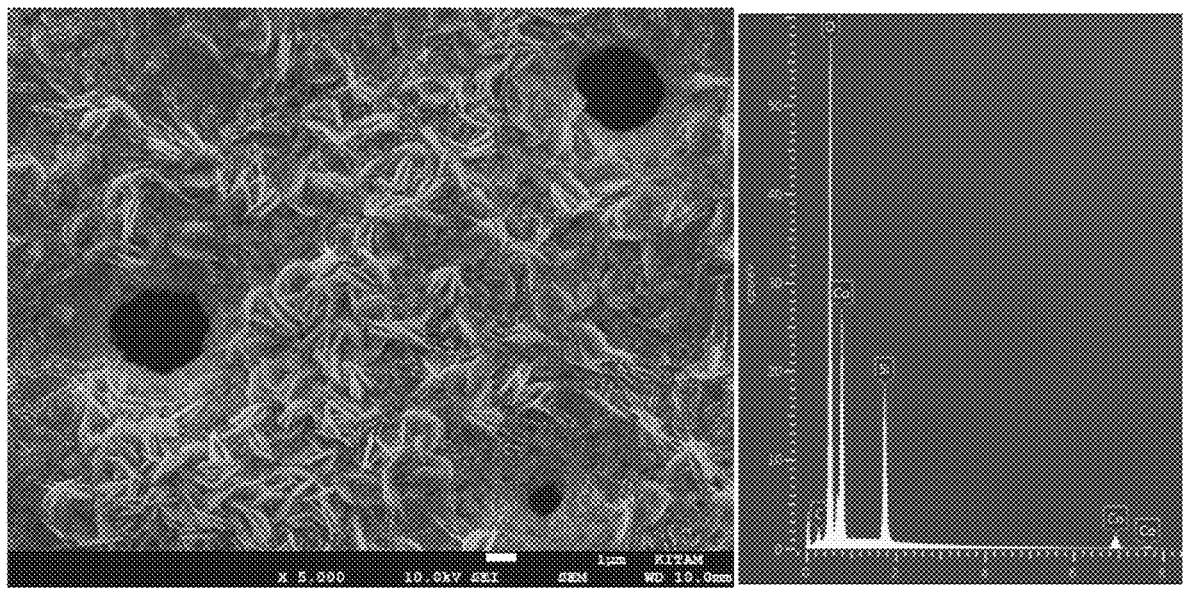
Figures 14I, 14J:
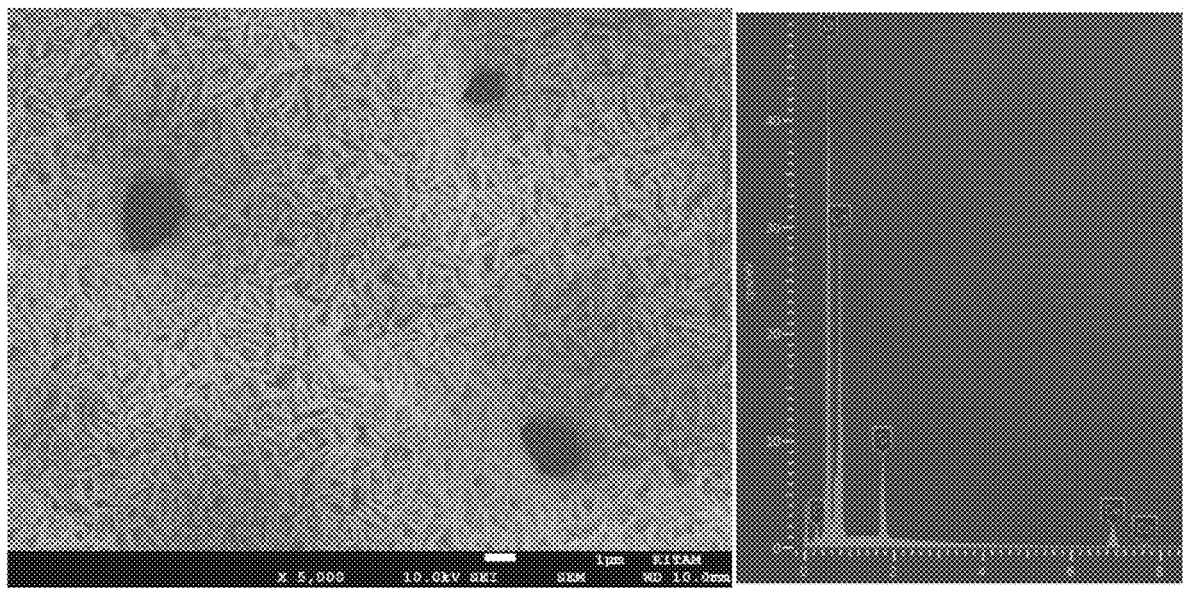

The SEM image of the Co/Si=1 catalyst surface shown in FIG. 14A illustrates the surface structure for this catalyst. It shows two regions which are similar to that shown in FIGS. 12B-12C for Co/Si=1/4 except that the surface decorations are now extensive. These two structures are further magnified in FIGS. 14G and 14I respectively. It has craters surrounded by loosely formed small platelets resulting from the aggregation of platelets with size ca. 50 nm. As shown below, these two distinct structures present in FIGS. 14G and 14I are associated with low and high cobalt concentrations respectively. These craters are formed when phase separation takes place within the walls and nano-sized platelets are ejected from the walls.

FIG. 14B is also the site of the spot analysis. At this site, based on the spectrum in FIG. 14C, the overall composition is [Co]=0.329, [Si]=0.109, [O]=0.562 indicating that [Co] is below the overall composition for the whole catalyst particle shown in FIG. 13A. The highest and lowest cobalt compositions are tabulated in Table 7 and compared with the average for this site. Table 7 also includes the concentration data for the whole particle as evaluated from FIGS. 13A-13E. Table 7 indicates that, as the scale of the scrutiny becomes finer, the concentration heterogeneity for the catalyst increases. At high Co concentrations, Si concentration decreases and as a result the catalyst/silica ratio increases. On the other hand, [O]/([Co]+[Si]) remains constant at 1.73. The surface structure at the lowest cobalt concentration is shown in FIG. 14G and that with the highest cobalt composition is shown in FIG. 14I.

TABLE 7

Summary of the data from FIGS. 13A-13E and FIGS. 14A-14F illustrating the heterogeneity in Co/Si = 1 catalyst as evaluated from FIGS. 13A-13E and FIGS. 14A-14F. Spot analysis location in FIG. 14B are #12 and #19.

| Location → Variable ↓ | Particle in FIG. 13 A | Total Area FIG. 14A | Low Cobalt Location #12 | High Cobalt Location #19 |
|---|---|---|---|---|
| | Molar fraction or molar ratio (–) | | | |
| [Co] | 0.413 | 0.329 | 0.271 | 0.381 |
| [Si] | 0.067 | 0.109 | 0.144 | 0.068 |
| [O] | 0.582 | 0.562 | 0.585 | 0.520 |
| [Co]/[Si] | 6.16 | 3.02 | 1.88 | 5.60 |
| [O]/([Co] + [Si]) | 1.69 | 1.72 | 1.82 | 1.70 |

Figure 15A:
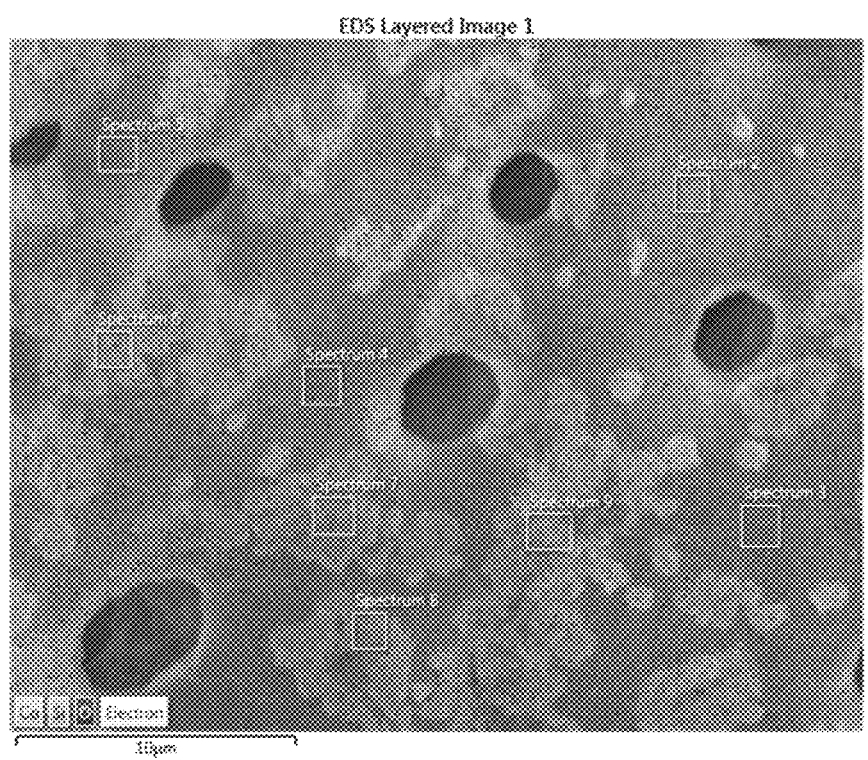
FIGS. 15A-15K show the analysis of the Co/Si=1 catalyst region where the cobalt concentration is above that of the catalyst particle illustrated in FIGS. 13A-13C. EDS and SEM images of the Co/Si=1 catalyst surface with higher-than-average cobalt concentration are presented.
Figures 15B, 15C, 15D:
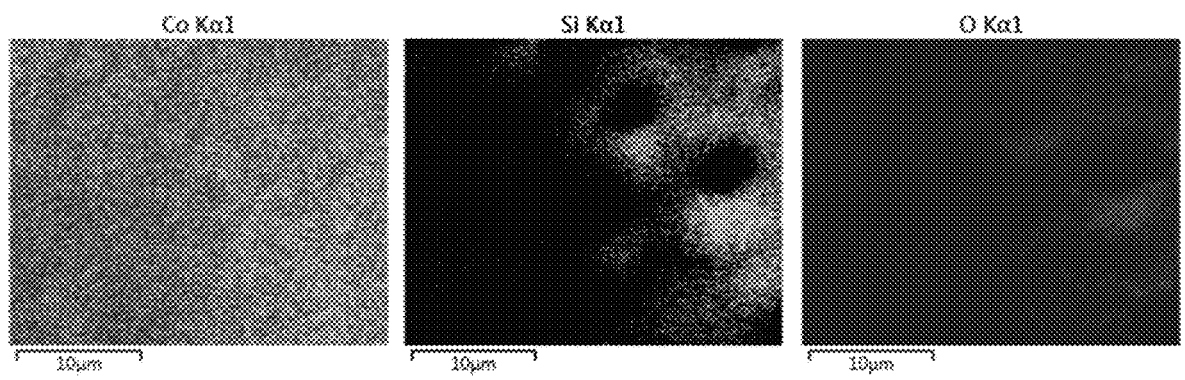

The heterogeneity analysis for Co/Si=1 catalyst is also carried out in regions where the cobalt concentration is higher or lower than the average cobalt concentration of the catalyst particle as exemplified in FIGS. 15A-15I. The EDS image of such a location is shown in FIG. 16A while the mapping of Co, Si and O are illustrated in FIGS. 15B-15D.

Figure 15E:
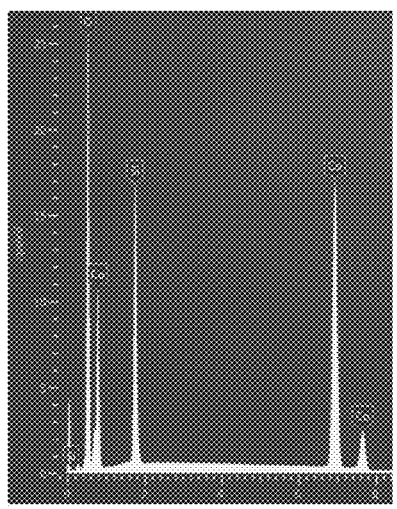
Figure 15F:
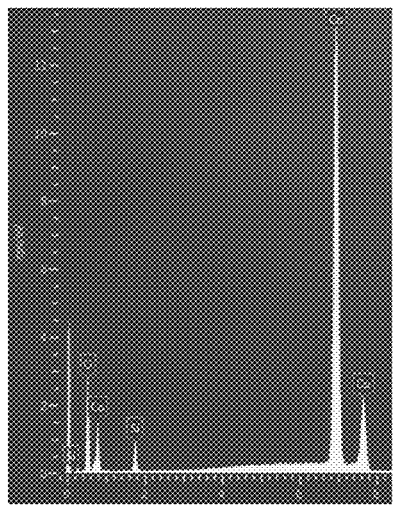
Figure 15G:
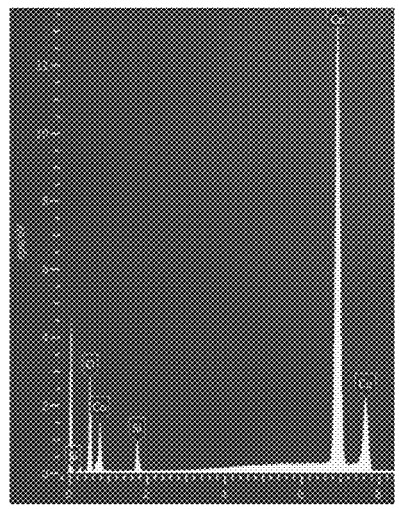
Figure 15H:
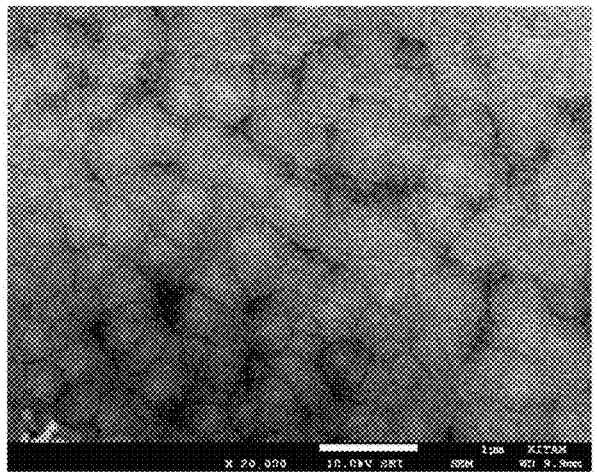
Figure 15I:
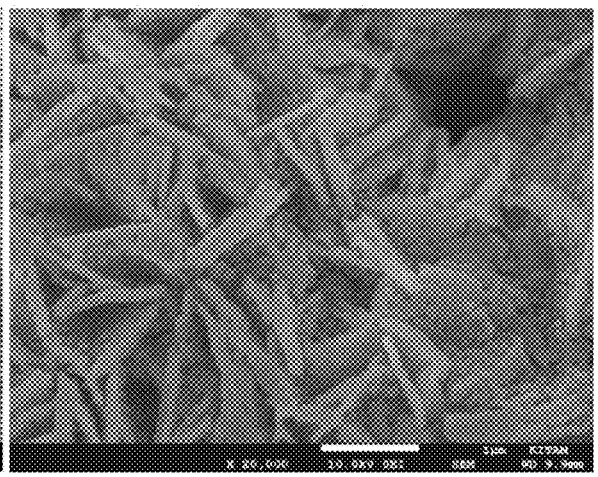
Figure 15J:
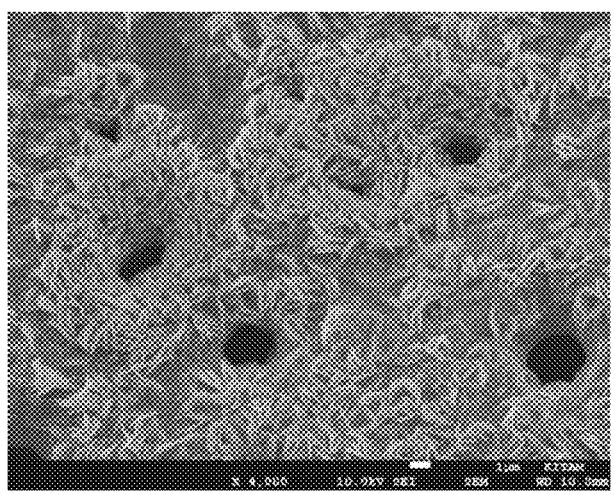
Figure 15K:
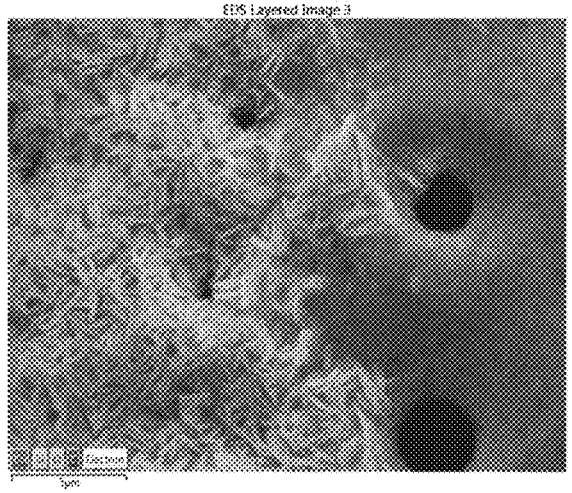
Figure 16:
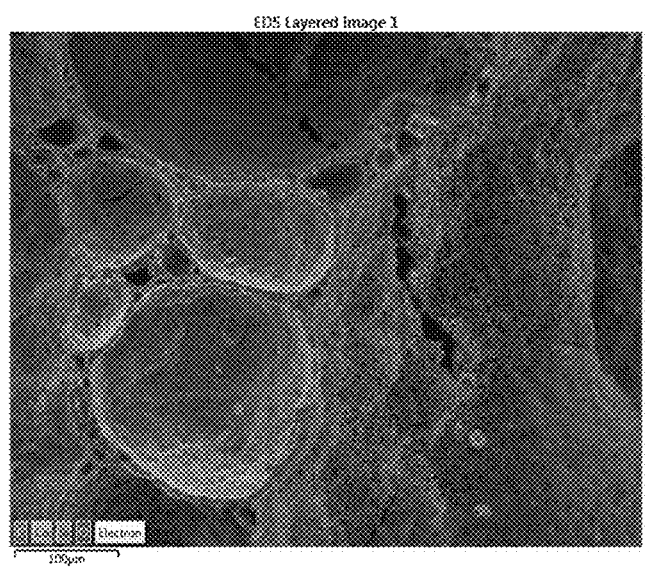
FIGS. 16A-16E show the EDS images and elemental mapping of the Co/Si=2 catalyst.
Figure 16:
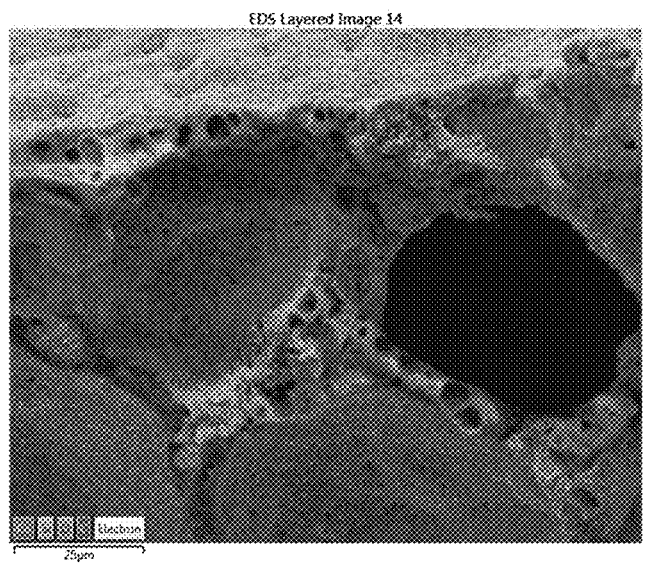
Figures 16, 16D, 16E:
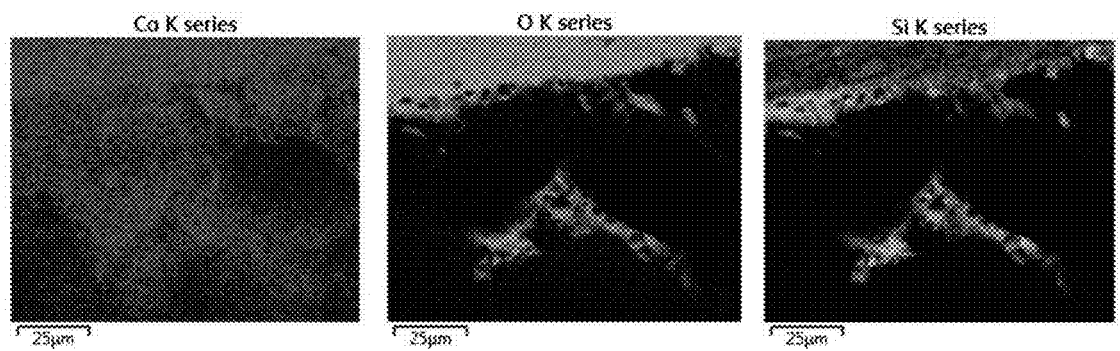

FIGS. 15E-15G are the EDX-spectra of the locations where cobalt concentration is minimum FIG. 15E; average FIG. 15F or maximum FIG. 15G. The EDX-spectrum and the SEM image of the location with the lowest cobalt concentration is shown in FIGS. 15E and 15H where the composition is: [Co]=0.496; [Si]=0.126; [O]=0.378. The EDX-spectrum and SEM image of the region, where cobalt concentration is average as evaluated from the EDS layered image, are shown in FIGS. 15A and 15F where the composition is: [Co]=0.720; [Si]=0.068; [O]=0.212. FIGS. 15G and 15I show the EDX-spectrum and SEM of the location where cobalt concentration is maximum with composition: [Co]=0.908; [Si]=0.018; [O]=0.074. The proximity of the locations with the lowest and highest cobalt locations are shown in SEM and EDS images of FIGS. 15J and 15K where the decorative regions as well as the tips of the craters are rich in cobalt. These cobalt rich regions have nearly 90 mol % phase separated reduced metallic cobalt with a distinct platelet morphology whereas the region with the lowest cobalt consists of fused grains with primary particle size of ca. 50 nm with cobalt still in an oxidized state.

A summary of these results is shown in Table 8 where the variation of the catalyst/support and lattice oxygen heterogeneity indices $H_A$ and $H_B$ are tabulated as a function of catalyst concentration. It shows that $H_A$ increases rapidly from $H_A$=0.425 when Co/Si=1/5 to $H_A$=41 when Co/Si=1 which is accompanied by plasma generation. Further increase in the catalyst concentration with plasma generation results in reduction in $H_A$. By definition, under thermodynamic equilibrium conditions, in the limiting cases $H_A \to 0$ and $H_B \to 0$ when [Co]$\to$0 or 1. However, in practice, equilibrium may take a long time to reach as it requires high heat and mass transfer rates throughout the catalyst. Nevertheless, the current form of the supported catalyst, with its very high porosity and connectivity, allows enhanced heat and mass transfer rates and reaches equilibrium faster compared with non-porous catalysts.

Figure 17A:
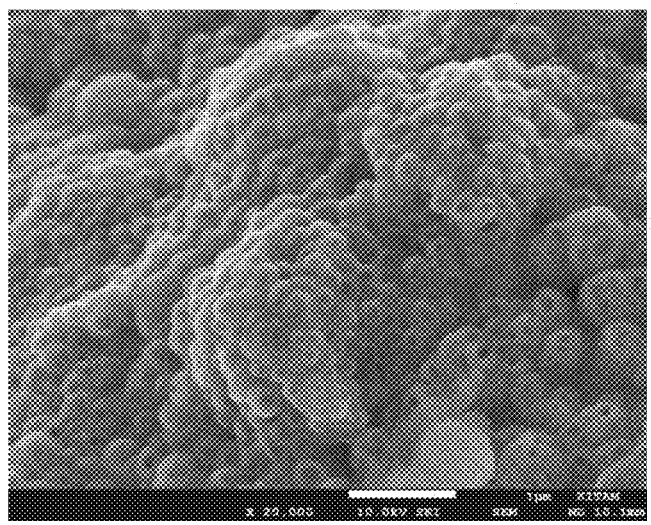
FIGS. 17A-17F show the EDX-spectra and the corresponding SEM images of the Co/Si=2 catalyst at various sites.

After identifying regions of below-average and above-average cobalt concentrations, EDS spot analysis was used to determine the sites with the highest and the lowest cobalt concentrations where SEM images were also acquired. These SEM images and the corresponding spectra are shown in FIGS. 17A-17F. These figures represent the EDX-spectra of the sites with the lowest, average and the highest cobalt concentration respectively. FIGS. 17A-17C are the SEM images corresponding to the lowest, average and the highest cobalt concentrations respectively.

Figure 17D:
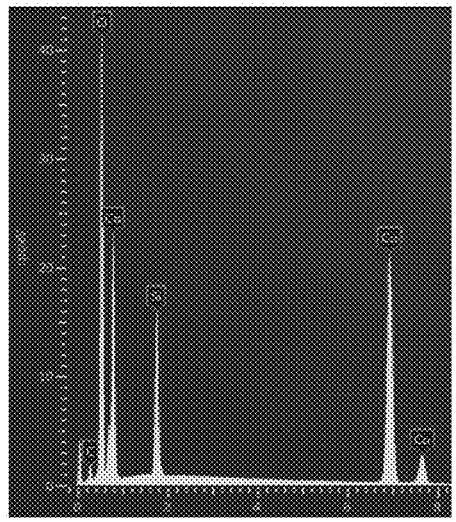
Figure 17B:
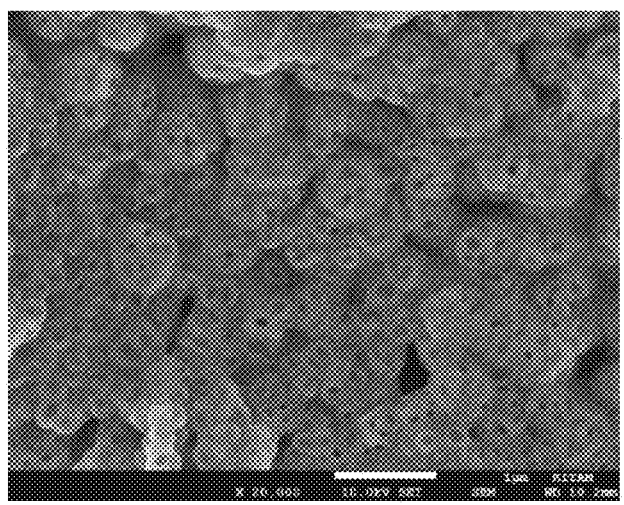
Figure 17E:
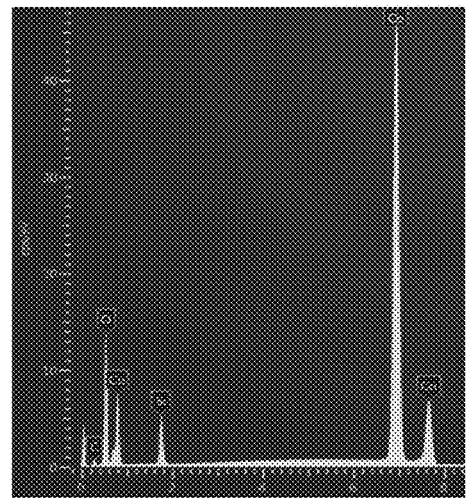
Figure 17C:
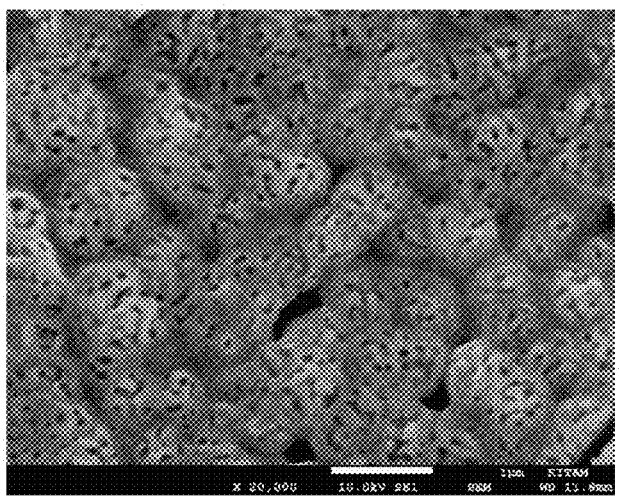
Figure 17F:
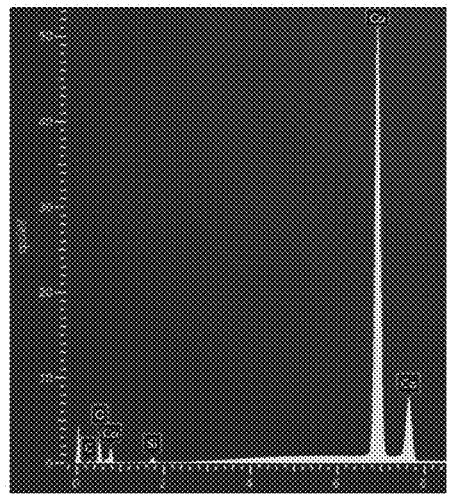

These SEM images indicate that the surface is covered by particles with one or two holes per particle at low cobalt concentration [Co]1=0.248 (FIGS. 17A and 17D). As cobalt concentration increased, particle agglomeration takes place resulting in approximate doubling of the size and the corresponding increase in the number of holes per particle (FIGS. 17B and 17E). At the highest cobalt concentration [Co]2=0.933 (97.9 wt %) a large scale particle fusing appears to take place with further modification in particle pore structure (FIGS. 17C and 17F). In this high cobalt region, the corresponding Si- and O-concentrations are very low [Si]=0.007 (0.4 wt %) and [O]=0.060 (1.7 wt %). It is therefore clear that Co exists mainly as Co$^0$ and the available oxygen is mainly from SiO$_2$. At this location where Co concentration is very high, [Co]/[Si]=131 (theoretical value=2) and [O]/([Co]+[Si])=0.064 indicating that partial phase separation between Co and Si is present and oxygen depletion is due to Co reduction and subsequent NO$_x$ formation. It is interesting to observe that the agglomeration of the single-hole particles in FIG. 17A results in multiple-hole agglomerates covering the surface of the pores with holes taking the shape of slits (FIG. 17C).

Figure 18A:
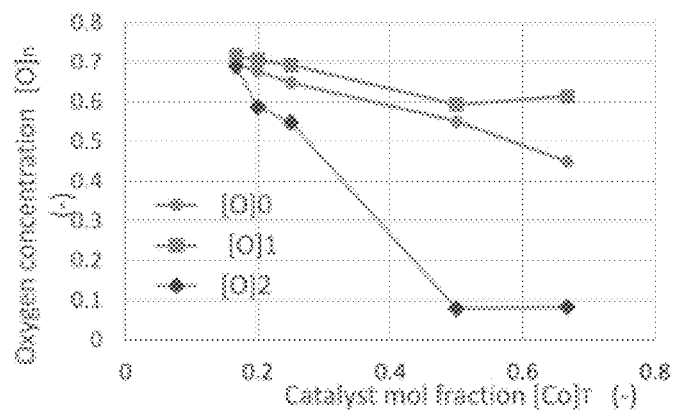
FIGS. 18A-18C show the summary of the characteristics of Co/Si=X catalyst surface as a function of theoretical (feed) catalyst concentration, $[Co]_T=X/(1+X)$.
Figure 18B:
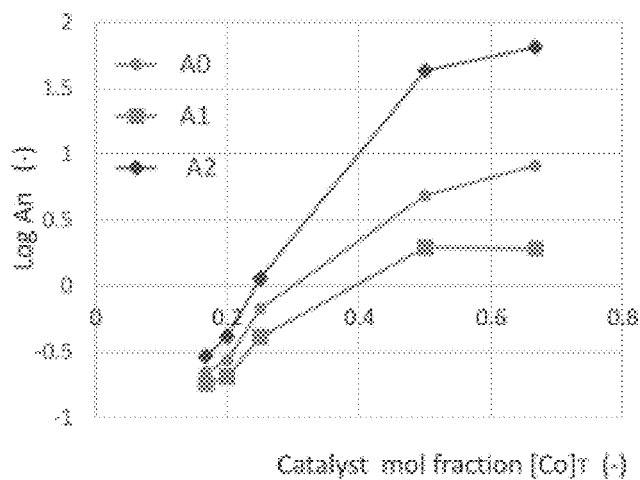
Figure 18C:
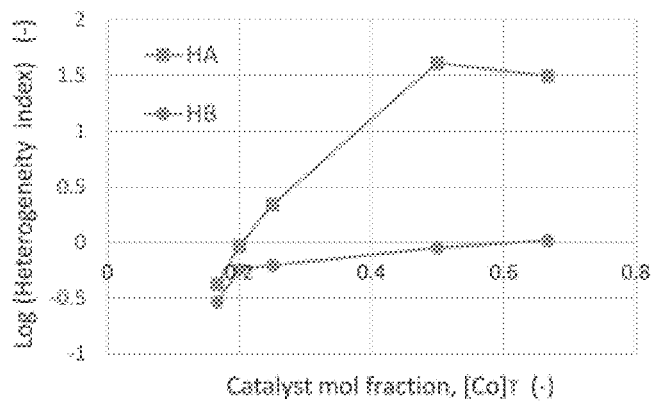

FIGS. 18A-18C illustrate the characteristics of Co/Si=X catalysts as a function of catalyst concentration [Co]T. The variation of average oxygen concentration [O]$_0$, oxygen concentrations in the regions with the lowest cobalt, [O]$_1$ and the highest cobalt, [O]$_2$ are shown in FIG. 18A. It can

TABLE 8

Variation of Cobalt/Silica- and Oxygen-Heterogeneity indices, $H_A$ and $H_B$ with catalyst concentration for Co/Si = X catalyst in the absence or presence of plasma generation.

| Plasma Status → | Plasma Absent | | | Plasma Generated | |
|---|---|---|---|---|---|
| Catalyst concentration, Mol % → | 16.7 | 20 | 25 | 50 | 66.7 |
| Cobalt/Silica Molar Ratio (X) → | (1/5) | (1/4) | (1/3) | (1/1) | (2/1) |
| Catalyst Heterogeneity Index, $H_A$ (-) | 0.425 | 0.932 | 2.19 | 41.0 | 31.3 |
| Oxygen Heterogeneity Index, $H_B$ (-) | 0.291 | 0.578 | 0.623 | 0.896 | 1.047 |

As seen from Table 8, the lattice oxygen heterogeneity index ($H_B$) increases gradually with increasing catalyst concentration, even when plasma is generated. However, this does not mean that the lattice oxygen remains stable. It indicates that the catalyst oxide reduces to metal or low valence oxides with an overall reduction of oxygen concentration across the catalyst surface. The remaining oxygen in the supported catalyst is due to the silica support.

In FIGS. 16A-16E the results for the catalyst Co/Si=2 are summarized. The EDS layered image at two magnifications clearly show that the catalyst surface predominantly consists of cobalt whereas silica is mainly confined to the pore walls as seen in FIGS. 16A-16B. Elemental mapping of Co, Si and O shown in FIGS. 16C-16E confirm the above conclusions. EDS image at low magnification in FIG. 16A is used for the evaluation of the average surface cobalt concentration for this catalyst particle whereas the EDS image in FIG. 16B has regions of high and low cobalt concentration, suitable for the evaluation of $H_A$ and HB.

be seen that the oxygen levels decrease with increasing catalyst concentration in all regions. When [Co]$_T$>1 which is associated with plasma generation, there is a sharp decay in oxygen concentration in the regions where Co concentration is the highest. In these regions, catalyst oxygen concentration is mainly due to catalyst support and the catalyst is mainly present as Co$^0$.

In FIG. 18A, the oxygen concentrations [O]$_0$ and [O]1 are higher than the theoretical concentration [O]$_T$. Freshly synthesized silica supported catalyst is in the form of M$_3$O$_4$/SiO$_2$ and hence the range of [O]$_T$ is 0.667>[O]$_T$>0.571 corresponding to 0<[Co]$_T$<1. This indicates that silica supported catalyst has anionic silica clusters in the form of Si$_p$O$_q^-$ where p=3-8 and (2p−1)<q< (2p+2). Such clusters can react with water to form SiO$_3$(OH). Therefore, the presence of localized excess oxygen in the region with low cobalt and high oxygen regions ([Co]$_1$ and [O]$_1$), excess oxygen is ca. 10% above its theoretical value of 60% for Co/Si=1/5, which can be explained by $SiO_2$ cluster formation. For further details see: G. Akay, Catalysts 10 (2020) 152.

FIG. 18B represents the variation of catalyst/support ratio ($A_n=[Co]_n/[Si]_n$) as a function of catalyst concentration $[Co]_T$ at three locations corresponding to n=0, 1, 2. Due to the spread of the data, the results are shown on a logarithmic scale for $A_n$. It can be seen that the cobalt/silica concentration ratio increases rapidly and plasma is generated when $[Co]_T>1$. It can be concluded that when the catalyst is reduced to $Co^0$, the catalyst surface also becomes significantly richer in $Co^0$ and the heterogeneity becomes more significant.

FIG. 18C shows the variation (in logarithmic scale), of the catalyst and oxygen heterogeneity indices, Log ($H_A$) and Log ($H_B$) as a function of feed cobalt concentration $[Co]_T$. Within the experimental range of $[Co]_T$ oxygen heterogeneity index ($H_B$) increases modestly compared with the cobalt heterogeneity index which increases by nearly 100 fold when $[Co]_T$ is increased from $[Co]_T=0.167$ to $[Co]_T=0.5$, followed by a decrease with further increase in catalyst concentration. Catalyst heterogeneity index $H_A$ for Co/Si=X increases by 100 to 50 times when plasma is generated.

Example 6. Characteristics of Plasma Generating Mn/Si=2 Catalysts by EDS and SEM Valence of cobalt are $Co^{+2}$ and $Co^{+3}$. In this example, we use manganese which has several stable valence states, including $Mn^{+2}$, $Mn^{+3}$, $Mn^{+4}$, $Mn^{+7}$. Such high number of valence states make them highly useful in catalysis as catalysts and catalyst promoters. The SEM and EDS analysis carried out for Co/Si=X (X=1, 2) is replicated for Mn/Si=X (X=1, 2) catalyst. For Mn/Si=1 catalyst it is found that the structural and chemical heterogeneity of this catalyst, is relatively low compared with Co/Si=1 catalyst. This behavior can be attributed to the fact that several $MnO_x$ compounds can be generated during the redox reactions, and this results in a more gradual chemical change across the catalysts.

Figure 19A:
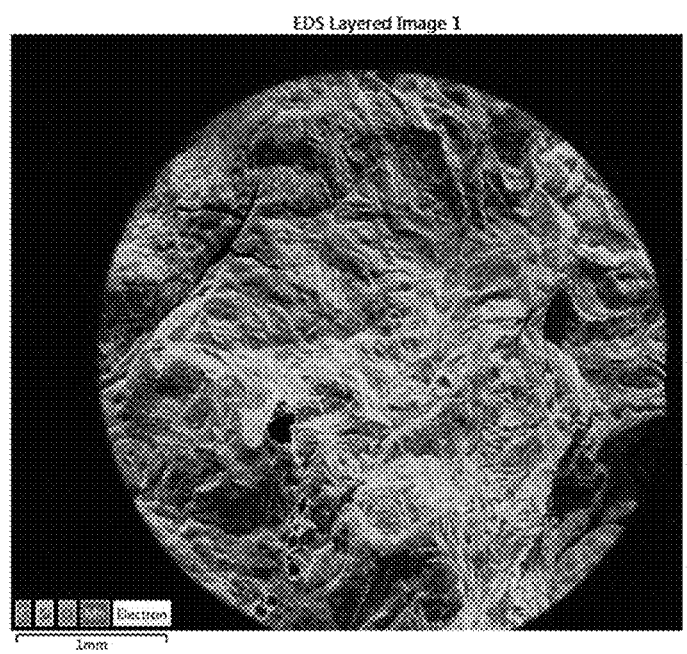
FIGS. 19A-19H show the EDS images and elemental mapping of Mn/Si=2 catalyst at two different magnifications.
Figure 19B:
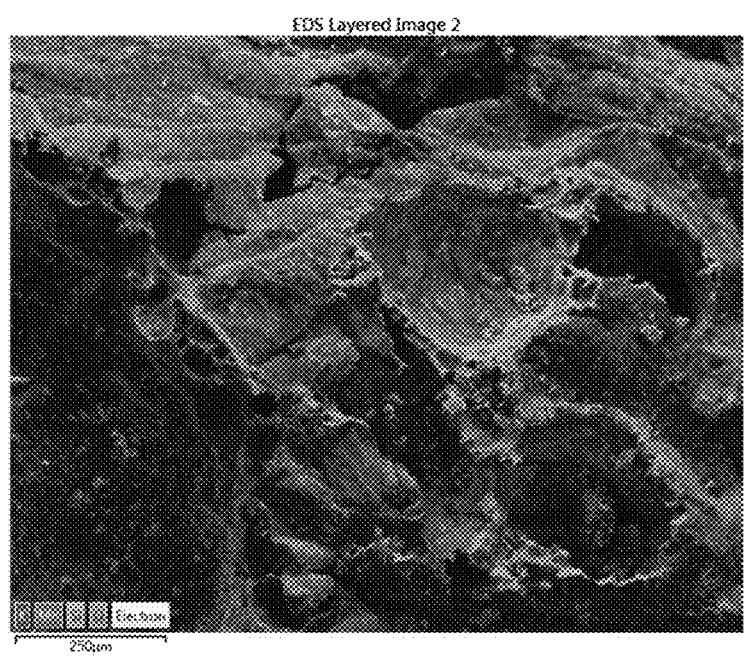
Figure 19C:
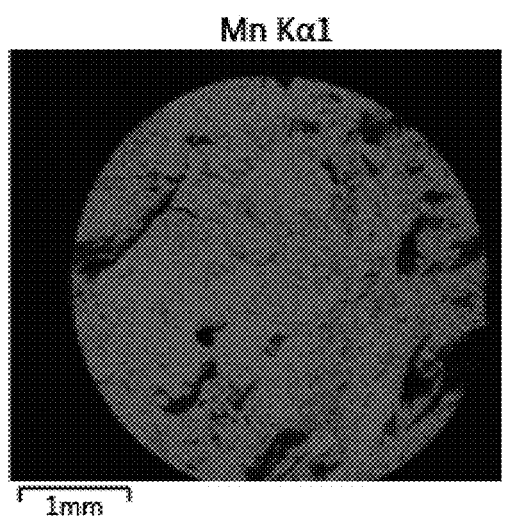
Figure 19D:
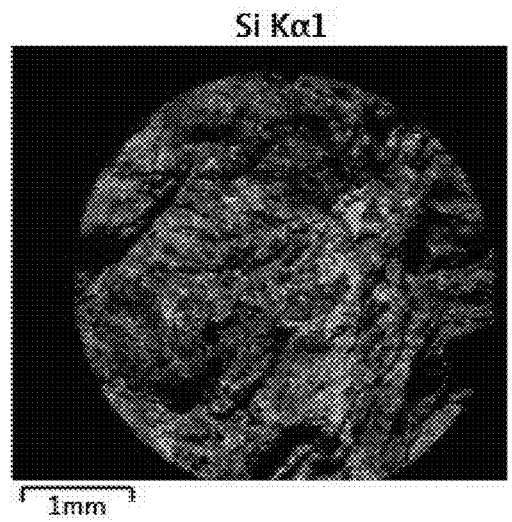
Figure 19E:
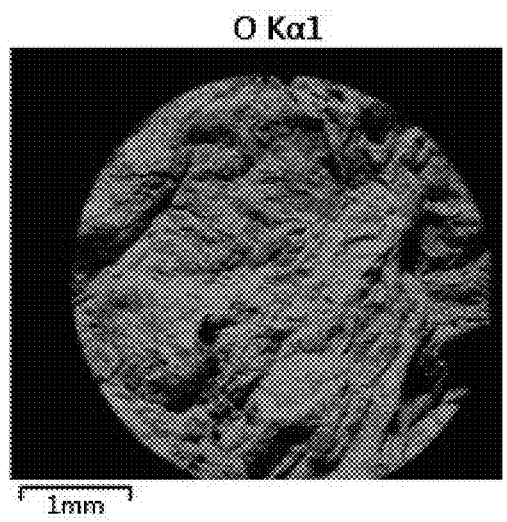
Figure 19F:
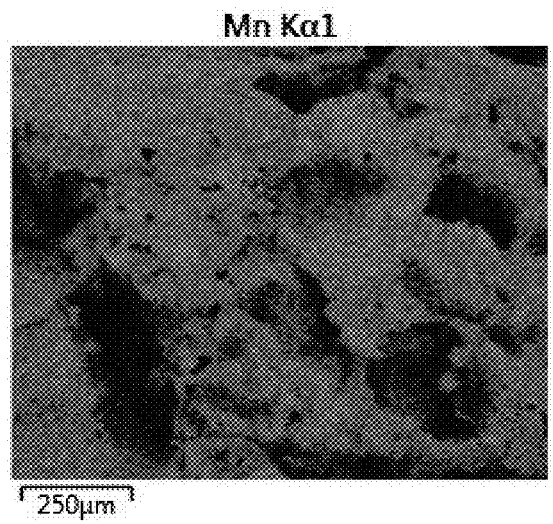
Figure 19G:
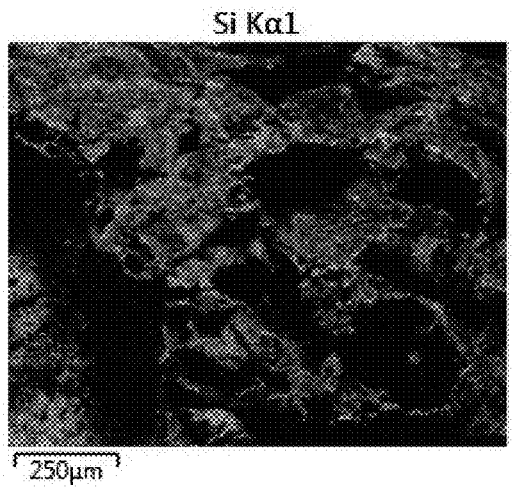
Figure 19H:
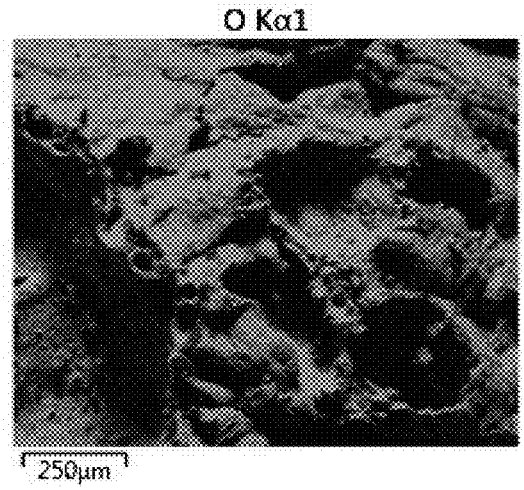

On the other hand, the physical and chemical heterogeneity in Mn/Si=2 catalyst is highly significant as shown in FIGS. 19A-19H. FIG. 19A-19B illustrates the electron image of two sites at two different magnifications. FIG. 19A shows the presence of chemical heterogeneity on the particle surface while FIG. 19B illustrates the local heterogeneity in the inner pore walls and surfaces. The elemental mapping of Mn, Si, O corresponding to the electron images are shown in FIG. 19C-19E and FIG. 19F-19H respectively. These figures show that Mn is present throughout the sample while Si and O are localized especially within the pore walls. FIG. 19A is used to determine the average concentrations while FIG. 19B is used to determine the locations of the below- and above-average Mn concentrations in evaluating the heterogeneity indices, $H_A$ and $H_B$ as well as in evaluating the catalyst morphology as a function of Mn concentration.

Figure 20A:
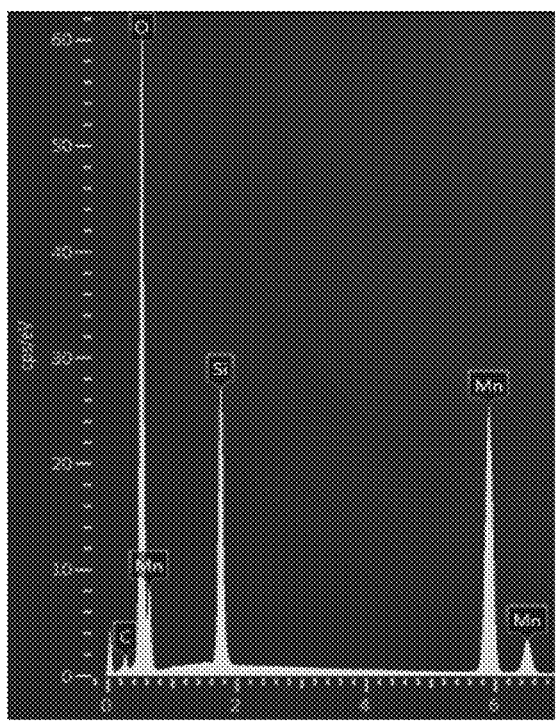
FIGS. 20A-20C show the EDS-spectra of Mn/Si=2 catalyst at various locations.
Figure 20B:
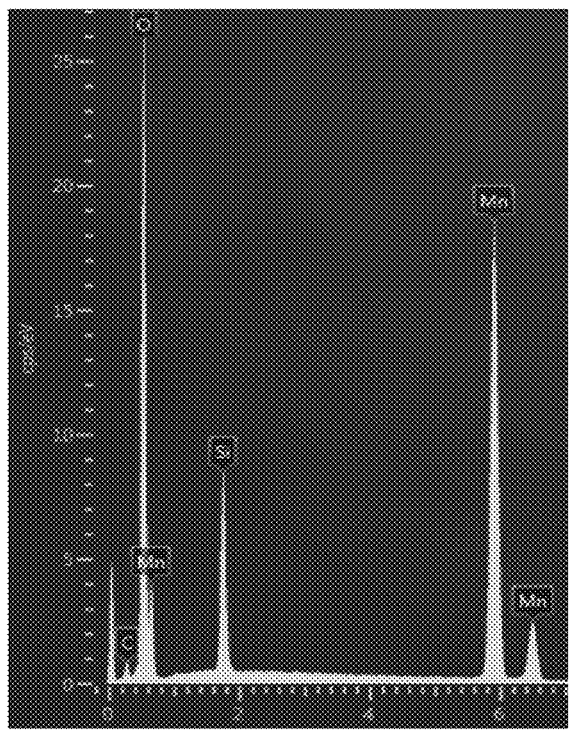
Figure 20C:
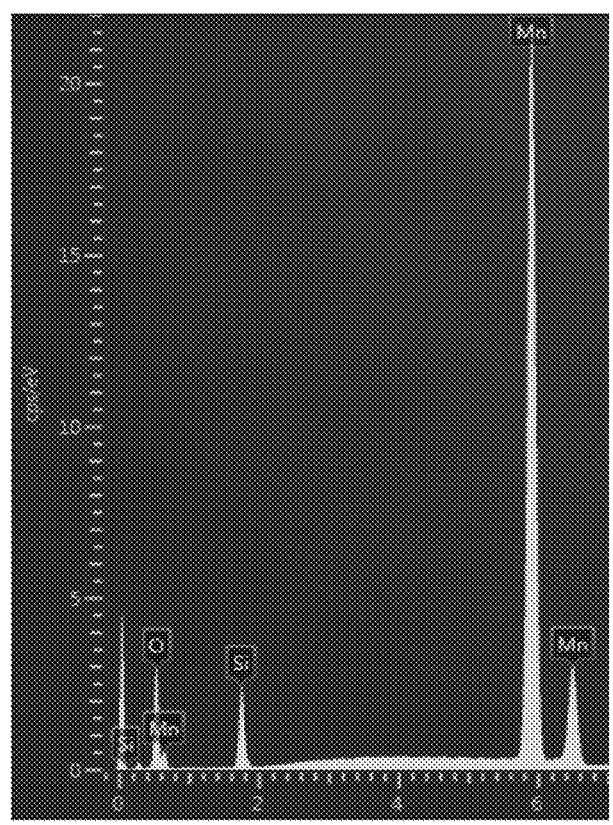

FIGS. 20A-20C show the EDS-spectra at three locations representing: FIG. 20A the average, n=0; FIG. 20B the lowest, n=1; and FIG. 20C the highest, n=2, Mn concentration for Mn/Si=2 catalyst. Similar to Co/Si=X it was observed that carbon was not present in the regions with the highest Mn concentration. Also shown are the corresponding results when the fresh catalyst was further subjected to microwave irradiation for 1 extra minute at a power rating of 1800 W.

Molar concentrations of $[Mn]_n$, $[Si]_n$, and $[O]_n$ as well as catalyst/support ratio, $A_n$, catalyst oxygen capacity $B_n$ together with the corresponding heterogeneity indices $H_A$ and $H_B$ are tabulated in Table 9. It can be seen from Table 9 that the highest Mn concentration ($[Mn]_2=0.732$) is not as high as that observed for Co ($[Co]_2=0.903$) for Co/Si=2 catalyst even after an extra microwave irradiation when $[Mn]_2=0.815$. As a result, the catalyst/support heterogeneity index $H_A$ for Mn/Si=2 is significantly lower than those observed for Co/Si=2. Lattice oxygen heterogeneity index $H_A$ for Mn/Si=2 is slightly higher for Mn compared with Co. This can be attributed to the fact that Mn has several more oxidation states than Co.

TABLE 9

Characteristics of silica supported fresh manganese catalyst after synthesis with plasma generation (Mn/Si = 2) and following further microwave irradiation at 1800 W (Mn/Si = 2*) together with the results for Co/Si = 2 catalysts for comparison.

| | Catalyst → | | | | | | | | |
|---|---|---|---|---|---|---|---|---|---|
| | Mn/Si = 2 (M = Mn) | | | Mn/Si = 2* (M = Mn) | | | Co/Si = 2 (M = Co) | | |
| | Location n → | | | | | | | | |
| Variable ↓ | 0 (Mean) | 1 (Low Mn) | 2 (High Mn) | 0 (Mean) | 1 (Low Mn) | 2 (High Mn) | 0 (Mean) | 1 (Low Co) | 2 (High Co) |
| $[M]_n$ | 0.395 | 0.210 | 0.732 | 0.401 | 0.285 | 0.815 | 0.491 | 0.254 | 0.903 |
| $[Si]_n$ | 0.093 | 0.116 | 0.055 | 0.092 | 0.097 | 0.021 | 0.060 | 0.132 | 0.014 |
| $[O]_n$ | 0.512 | 0.674 | 0.213 | 0.507 | 0.618 | 0.164 | 0.449 | 0.614 | 0.083 |
| $A_n$ | 4.25 | 1.81 | 13.3 | 4.36 | 2.94 | 38.8 | 8.18 | 1.92 | 64.5 |
| $B_n$ | 1.05 | 2.07 | 0.271 | 1.03 | 1.62 | 0.192 | 2.08 | 1.59 | 0.091 |
| $H_A$ | | 5.75 | | | 17.9 | | | 31.3 | |
| $H_B$ | | 1.35 | | | 1.07 | | | 0.962 | |

The morphological variations in catalyst (Mn/Si=2) structure as a function of Mn, Si, O concentrations are shown in FIGS. 21A-21F. Mn/Si=X catalyst particles are porous with a large surface area exposed to air during processing. Below this surface skin, pores are present, with pore wall thickness of ca. 1 µm. Both the catalyst skin and the pore surfaces have morphologically distinct structures depending on the plasma exposure (time span and intensity) during processing while the pore walls have proto-structures but mainly consist of nano-sized porous spheres.

Figure 21A:
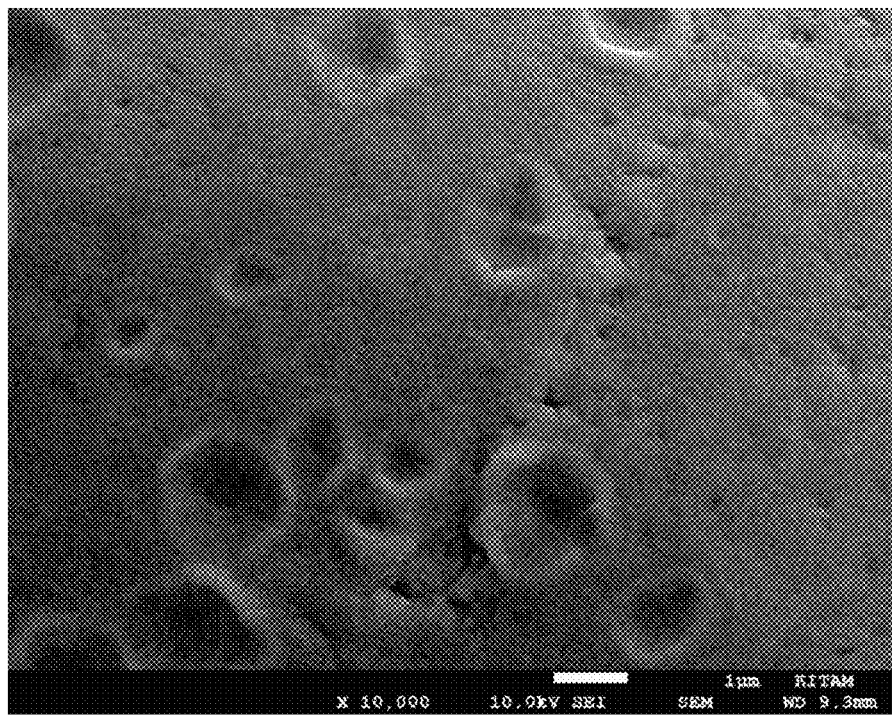
FIGS. 21A-21F show the surface morphology evaluation by SEM as a function of composition for Mn/Si=2 catalyst synthesized at 1800 W for 60 s with plasma generation.
Figure 21B:
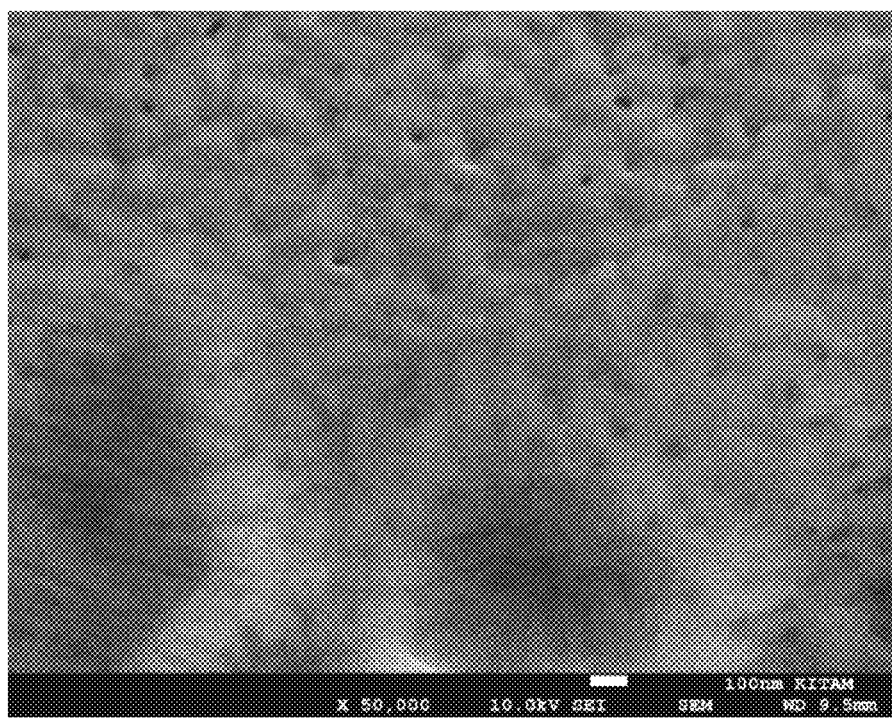

FIGS. 21A-21D, and 21F show the surface skin structure as a function of local catalyst concentration. It can be seen that as Mn concentration increases (with corresponding decrease in Si and O), surface structures (decorations) appear with increasing dominance. FIGS. 21A-21B show the background silica rich surface layer (with composition [Mn]=0.201; [Si]=0.115; [O]=0.684) which is porous and has nano-sized (ca. 10-20 nm) structures especially within the surface pores.

Figure 21C:
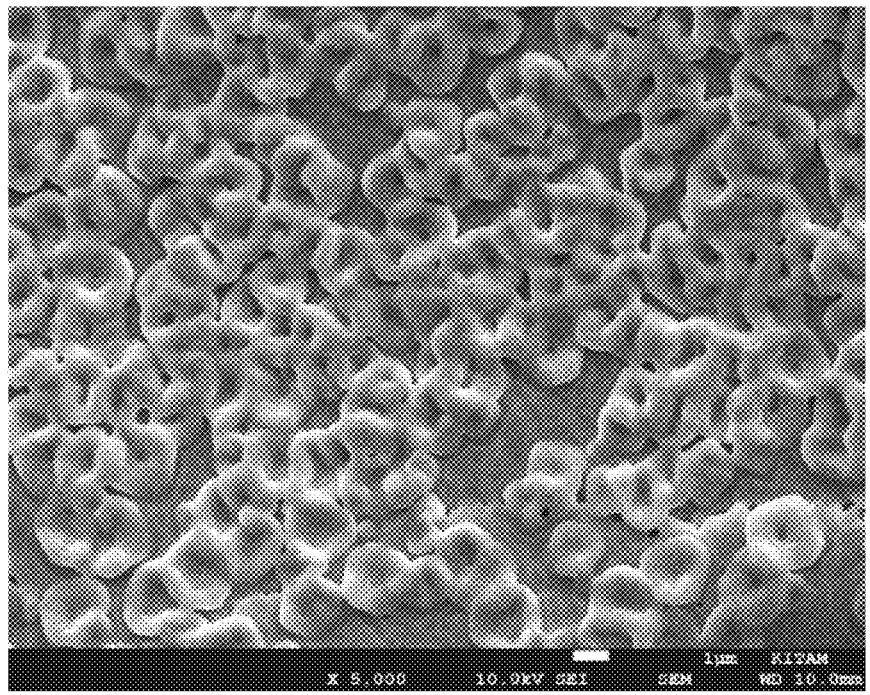
Figure 21D:
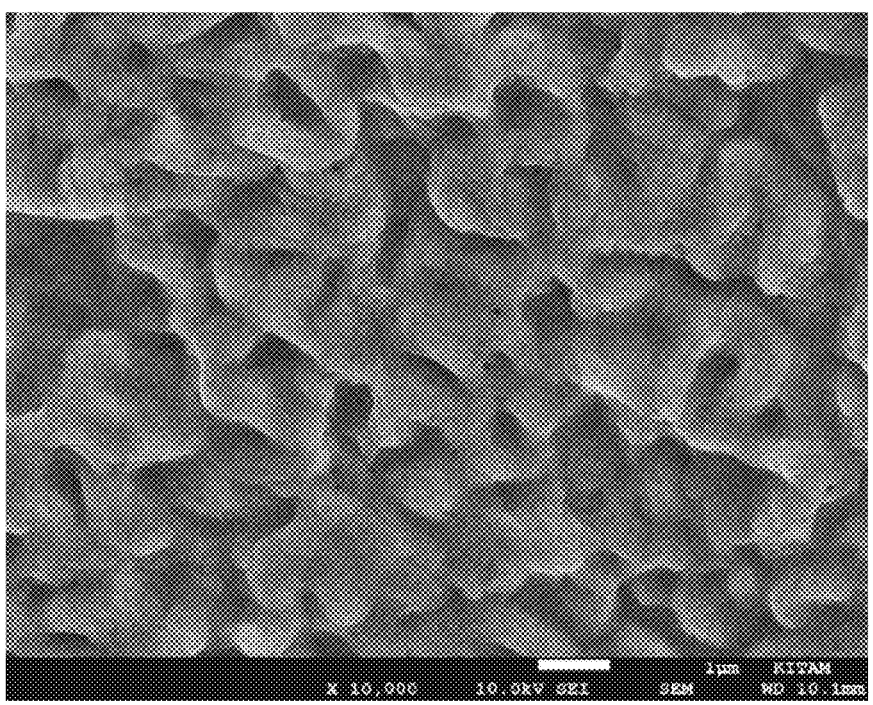
Figure 21E:
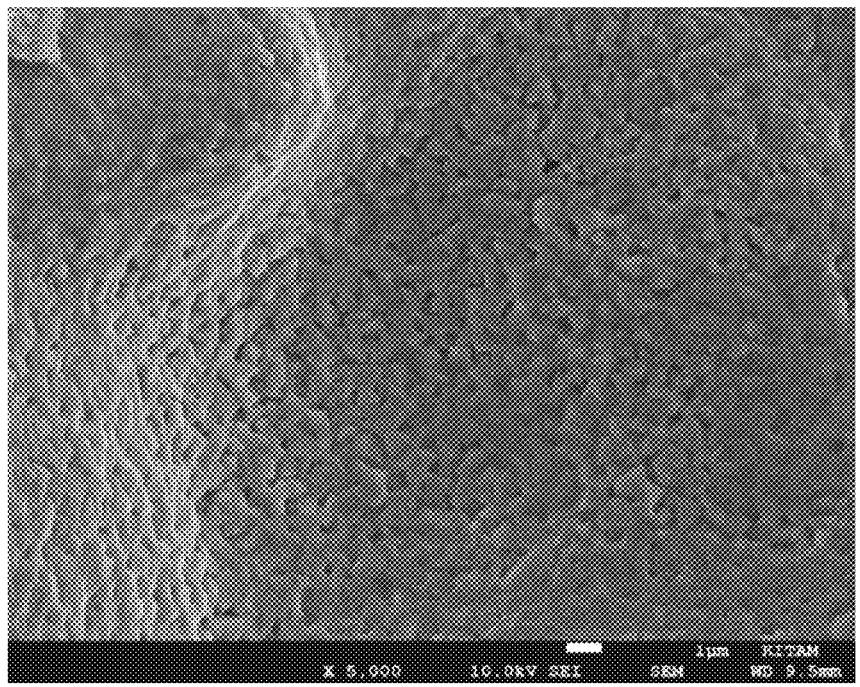
Figure 21F:
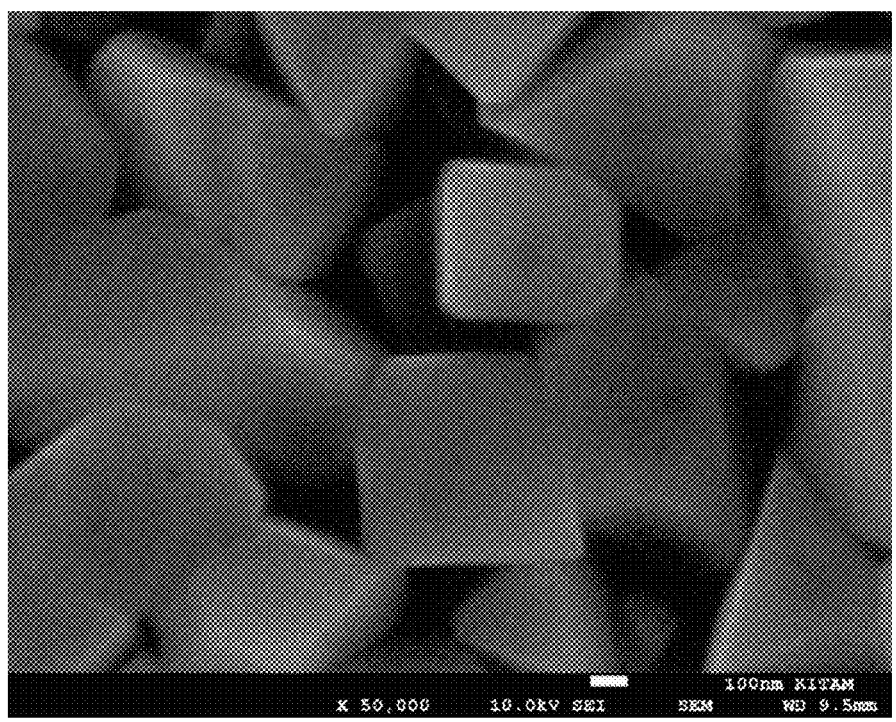

The observed surface decorations are associated with higher Mn concentrations as seen in FIG. 21C where [Mn] =0.317; [Si]=0.075 and [O]=0.606. As a result of stronger plasma generation, surface shown in FIG. 21D consists of sintered particles with very large Mn and smaller oxygen concentration with composition [Mn]=0.772; [Si]=0.059; [O]=0.169. As seen in FIG. 21E and FIG. 21F, the dominant structure on the surface of the inner pores of Mn/Si=2 catalyst, the surface is covered ca. 500 nm crystals with partial sintering and enhanced Mn concentration with composition: [Mn]=0.843, [Si]=0.023 and [O]=0.134.

Figure 22E:
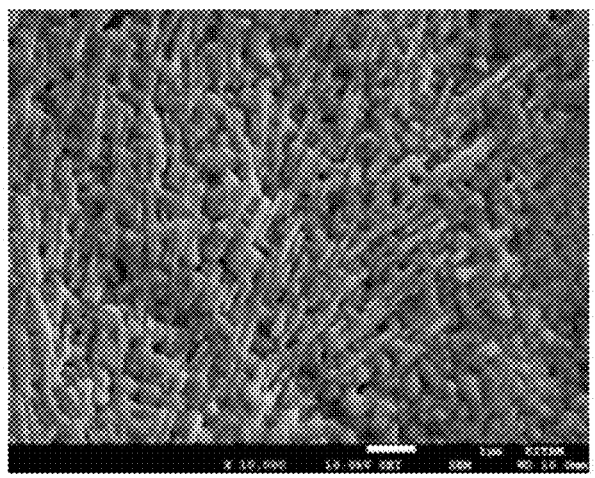
Figure 22F:
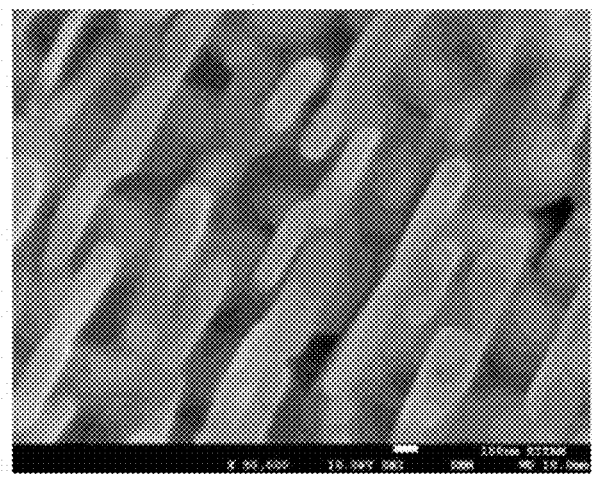

The effect of further microwave irradiation and plasma generation is illustrated in FIGS. 22A-22F. Here, the fresh Mn/Si=2 catalyst was microwave irradiated for another 60 seconds at 1800 W with plasma generation to obtain Mn/Si=2*catalyst. The surface structures change significantly while Mn concentration increases as seen in FIGS. 22A-22D. The concentration of Mn rich decorations across the surface increases with further microwave radiation. Sintering and porosity of the surface decorations increases with pore size ca. 100-200 nm as seen in FIGS. 21A-21D. At the highest Mn concentration (when [Mn]=0.840; [Si] =0.023; [O]=0.137) the nano-structure of the material has a layered configuration shown in FIG. 22D. In fact, the fine structure of these crystals is similar to that of microwave irradiated $BaTiO_3$ structure (see FIGS. 10A-10I and FIGS. 11A-11H) except that in Mn/Si=2 catalyst, the grains are smaller (ca. 10 μm) and the layers are thinner (ca. 10 nm) compared with $BaTiO_3$ grain layers of ca. 100 nm. Some of the cuboidal nano-crystals observed (see FIGS. 21E and 21F) on the pores of the fresh Mn/Si=2 catalyst appear to be partially transformed into ca. 100 nm diameter and ca. 500 nm long rods (with composition: [Mn]=0.804; [Si]=0.019; [O]=0.177) as seen in FIGS. 22E and 22F. These results indicate that it is possible to obtain several different catalyst morphologies through microwave induced plasma. These structures are likely to be catalytically more active under plasma.

Example 7. Catalyst Reduction, Surface Transition from Spinel to Silicate Perovskite ($MSiO_3$) Structure and Formation of Olivines ($M_2SiO_4$) by Microwave Induced Plasma As shown previously, in M/Si=X (M=Co, Mn) at high catalyst loadings when X≥1, extra reflections appear in the XRD spectra (see Tables 4 and 5). These extra reflections can be explained by the transfer of catalyst spinel structure, $M_3O_4$ (M=Co, Mn in the present case) to silicate perovskite structure $MSiO_3$ and/or olivine structure $M_2SiO_4$ at high catalyst concentration synthesized by using high microwave power with plasma generation. The XRD studies summarized in Tables 4 and 5 show that several of the emergent reflections in M/Si=X (X≥1 and M=Co, Mn) catalysts are also present in $MSiO_3$ and $M_2SiO_4$ compounds.

$MSiO_3$ and $M_2SiO_4$ compounds provide an alternative and more efficient anode for lithium ion batteries which represent the most common electrical energy storage technology. Currently, anode of these batteries is made from intercalating graphite. In order to enhance anode energy density capacity, metal silicates such as $M_2SiO_4$ (M=Co, Fe, Mn) are preferred.

Example 8: Synthesis of Plasma Generating Co/Si=2 and $BaTiO_3$ Composite Catalysts This example illustrates the combination of perovskite and spinel catalysts at microscopic level so that perovskite component (exemplified by $BaTiO_3$) promotes plasma and spinel component (exemplified by $Co_3O_4$ supported with $SiO_2$; i.e., Co/Si=X catalyst) which promotes chemical catalysis. In these studies, we used powdered $BaTiO_3$ particles in the size range of 10-53 μm with an average particle size of $D_{50}$=32 μm obtained by crushing 3 mm diameter barium titanate spheres and fractionating them afterwards. These particles (15 g) were added to 10 mL of the catalyst and silica support precursor fluid which would yield Co/Si=2 catalyst as studied previously. This mixture was subsequently microwaved at 1.8 kW in a round bottom bowl. The resulting catalyst system yields a nominal Co/Ba ratio of 1/4 and it is denoted as {M/Si=X}/BT=F where M=Co; X=2 and F=1/4.

The mechanism of supported catalyst formation through microwave irradiation of the catalyst-support precursor fluid is through a repeated thin film formation and collapse during microwave irradiation when water is evaporated and a porous catalyst-support precursor solid is obtained in which the catalyst precursor subsequently undergoes decomposition to form catalyst oxide. As the catalyst-support precursor fluid film has low viscosity (both simple shear and extensional viscosities), the flotation of $BaTiO_3$ particles cannot be expected to take place within the films formed during evaporation. However, this situation changes as water is evaporated from the precursor fluid and silica network is formed in the films. Furthermore, small particles can be trapped between the collapsing films thus providing local defects in the final catalyst. It was expected that, this process resulted in the formation of highly porous silica and catalyst precursor structure with $BaTiO_3$ particles dispersed within the resulting material. After water evaporation, catalyst precursor decomposition takes place with the evolution of $NO_x$ which is followed by plasma glowing.

Surprisingly, despite its very high loading and relatively large size, we found that the original $BaTiO_3$ particles (size 10-53 μm) could not be observed even at very high magnifications by SEM. The presence of $BaTiO_3$ could only be detected by EDX-spectroscopy through the mapping of Ba and Ti atoms. In order to understand the interactions between $BaTiO_3$ particles and the catalyst precursor fluid during microwave irradiation, we also carried out synthesis using 1 mm $BaTiO_3$ particles. In this case most particles were not fragmented and could be recovered with Co/Si=2 catalyst around them.

FIGS. 23A-23C show the surface EDS image as well as Co and Ba distributions of a large $BaTiO_3$ particles (diameter 1 mm). These figures indicate that Ba distribution is not in discrete form occupying large domains but in a fragmented state. FIGS. 23A-23C show the deposition of Co/Si=2 catalyst on the surface of a 1 mm $BaTiO_3$ particle. The EDS analysis of this region yielded the following molar composition: [Co]=0.187; [Si]=0.101; [Ba]=0.026; [Ti]=0.028; [O]=0.658. The data show that, at this location, [Co]/[Si]=1.85; [Ba]/[Ti]=0.929 and [Co]/[Ba]=7.19 indicating that the $BaTiO_3$ surface is well covered with Co/Si catalyst, while the oxygen concentration at [O]=0.658 is slightly above the theoretical value of 0.590 due to enhanced oxygen in irradiated $BaTiO_3$.

Figure 23D:
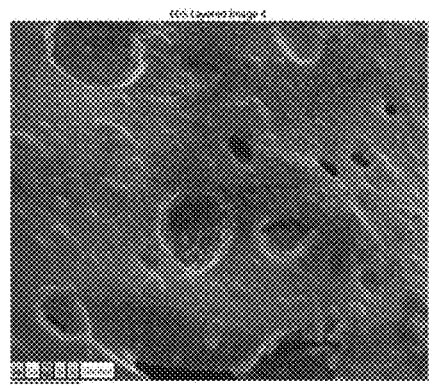
Figures 23E, 23F:
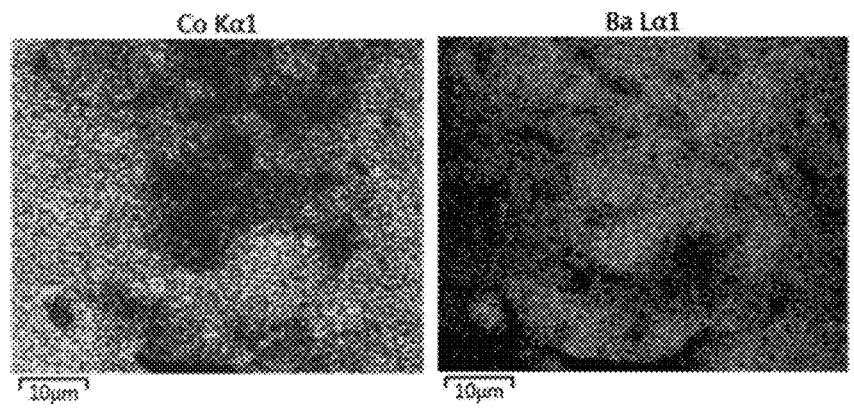

The corresponding EDS image and Co and Ba distributions in the bulk of the {Co/Si=2}/BT=1/4 composite catalyst (with initial $BaTiO_3$ particle size range of 10-53 μm) are shown in FIGS. 23D-23F. Large discrete particles of $BaTiO_3$ were not observed in these composite catalysts. It is most likely that during the evaporation of water, high intensity microwave energy causes very rapid temperature rise, creating a large temperature gradient across $BaTiO_3$ particles which in turn results in internal stresses, leading to delamination, fracture and fragmentation of $BaTiO_3$ particles. Earlier studies on $BaTiO_3$ microwave irradiation with plasma generation showed the presence of delamination and fragmentation (see FIGS. 10A-10I). It appears that if the $BaTiO_3$ particles are too large (>1 mm in the current study) fragmentation takes place on the surface of the particles which remain intact otherwise.

FIGS. 23D-23F illustrate surface of the composite catalyst with small initial $BaTiO_3$ particles (10-53 μm). In this case, [Co]/[Si]=1.52; [Ba]/[Ti]=0.938; [Co]/[Ba]=1.36. [O]=0.676 which is similar to the previous case above. FIGS. 23D-23F-indicate that $BaTiO_3$ is not distributed as a particulate with size>10 μm but as sub-micron to nano-sized particles.

Figure 24B:
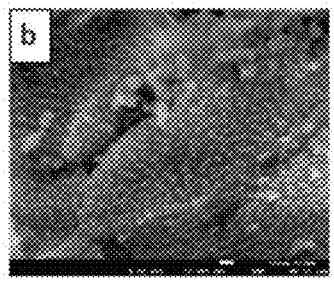
FIGS. 24A-24E show the morphology of {Co/Si=2}/BT=1/4 composite catalyst as a function of composition at various locations.
Figure 24C:
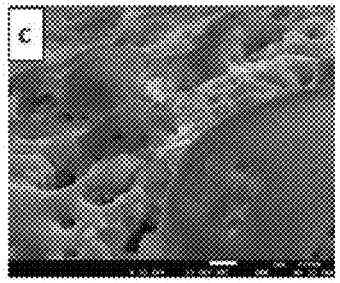
Figure 24A:
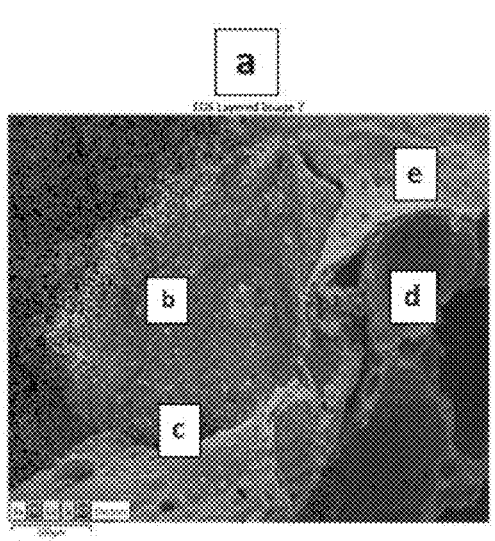

In order to understand the interactions between $BaTiO_3$ particles and the supported catalyst, Co/Si=2, further examination of a large particle was carried out. This particle appears to be fractured from an initial diameter of 1 mm. These 1 mm $BaTiO_3$ particles were placed in the catalyst/support precursor fluid in order to detect their presence after processing. FIGS. 24A-24E are the EDS images of a large fractured $BaTiO_3$ particle (ca. 0.5 mm) dispersed into Co/Si=2 catalyst. It can be seen that adhesion between $BaTiO_3$ and Co/Si=2 catalyst phases is present. After obtaining the EDS-spectrum of the area shown in FIG. 24A, several spot analyses were performed to obtain the heterogeneity of the composite catalyst. Four locations are chosen as representative catalyst characteristics as shown in FIG. 24A-24E. FIG. 24A shows that the $BaTiO_3$ particle has surface covering of Co/Si catalyst and is surrounded by the porous Co/Si catalyst. The morphology (as evaluated by SEM) of the four locations where the EDS spot analysis were performed are also shown. From the EDS analysis of the locations (FIGS. 24B-24E), the compositions are determined and summarized in Table 10.

Figure 24E:
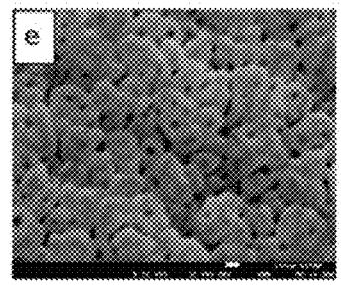
Figure 24D:
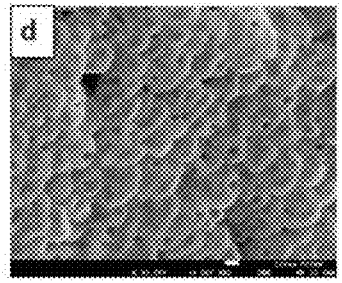

It can be seen from FIGS. 242-24D and Table 10 that the surface of the $BaTiO_3$ particle shown in FIG. 24A is covered with the Co/Si catalyst with varying levels of Co/Ba ratio. Referring to Table 10, at location B in FIG. 24B, Co/Ba ratio is very low and Co/Si catalyst is present as ca. 10 nm domains. In this region, the presence of nitrogen was detected. At higher levels of Co/Ba (Location C), Co/Si catalyst appears to fill the valleys between $BaTiO_3$ grains. Outside the $BaTiO_3$ particle, the surface of the Co/Si catalyst (Location D) is 94.4 mol % cobalt, with only 4.4 mol % oxygen most of which can be attributed to $SiO_2$ and a trace amount of $BaTiO_3$. Hence, an overwhelming proportion of cobalt is present as $Co^0$. At this location [Co]/[Ba]=472 and [Co]/[Si]=118. The surface of the Co/Si catalyst at location shown in FIG. 24E is also rich in Co with [Co]/[Ba]=309 and [Co]/[Si]=3.36. However, due to the very low levels of $BaTiO_3$ in this region, these results may not be accurate although they were done multiple times. Throughout the sample, [Ti]/[Ba]≈1 indicating that $BaTiO_3$ lattice does not undergo any chemical change except for oxygen depletion as shown previously. Note that [O] remains constant except in the regions where Co reduction takes place as seen in Table 10.

The SEM images of Location D show fused porous particle of size ca. 400 nm. The skin of the pores (Location E) also show particles which can be described as partially fused. The morphology of the Co/Si catalyst at Locations D and E are very similar to those shown in FIGS. 17A-17C. The locations in FIG. 24 also illustrate the mechanism of Co/Si catalyst on $BaTiO_3$ surface starting from wetting (FIG. 24B) followed by deposition in the valleys formed by the topological structures of $BaTiO_3$ shown in FIG. 24C.

TABLE 10

Composition and morphology of the composite {Co/Si = 2}/BT = 1/4 catalyst at various locations shown in FIGS. 24A-24E.
Location A refers to the whole area.
Nitrogen was not detected (ND) except in the spot analysis of the location B.

| | Mol Fraction of elements at each location Locations (A-E) → | | | | |
|---|---|---|---|---|---|
| Element↓ | A | B | C | D | E |
| Co | 0.283 | 0.039 | 0.192 | 0.944 | 0.309 |
| Si | 0.056 | 0.017 | 0.075 | 0.008 | 0.092 |
| Ba | 0.043 | 0.141 | 0.087 | 0.002 | 0.001 |
| Ti | 0.046 | 0.135 | 0.091 | 0.002 | 0.001 |
| O | 0.572 | 0.598 | 0.565 | 0.044 | 0.597 |
| N | -ND- | 0.071 | -ND- | -ND- | -ND- |
| [Co]/[Ba] | 6.58 | 0.277 | 2.26 | 472 | 309 |
| [Co]/[Si] | 5.05 | 2.29 | 2.63 | 118 | 3.36 |

Figure 25A:
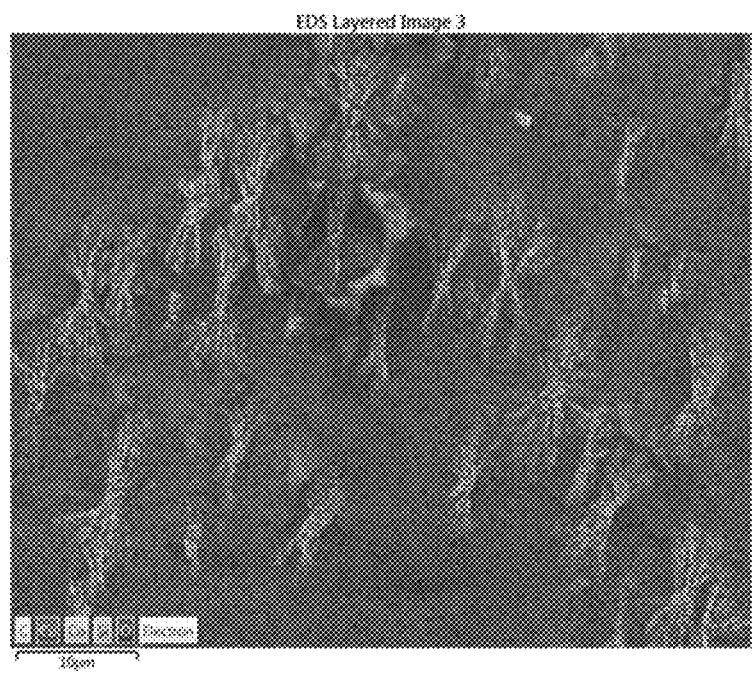
FIGS. 25A-25E show the EDS image and the elemental mapping of Co/Cu/Si=1/1/8 catalyst showing the copper rich regions on a Co/Si rich surface.
Figure 25B:
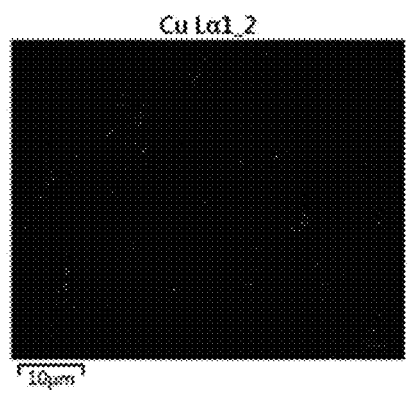
Figure 25C:
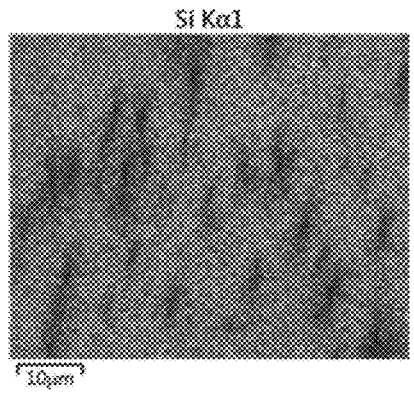

Example 9. Synthesis of Silica Supported Binary Catalysts without Plasma Generation As shown previously, Cu/Si=X catalysts had a very high critical power P* when the porous Cu ($NO_3$) $2/SiO_2$ mixture failed to undergo decomposition to obtain Cu/Si=X catalyst even when X=1/3 and P=1800 W. In this section we present results for a supported mixed oxide catalyst system represented as Co/Cu/Si=X/Y/Z in which, X, Y, Z are the molar concentration ratios of Co, Cu and Si The mixed oxide, Co/Cu/Si=1/1/8 was prepared at P=1800 W without the generation of plasma. This is because the molar ratio of total metal, Co+Cu, to silica is below the threshold for microwave generation; i.e., ([Co]+[Cu])/Si=1/4. These catalysts formed without the generation of plasma have a relatively homogeneous structure. FIGS. 25A-25E are the EDS images of a typical catalyst structure showing the presence of Cu rich decorations on a silica rich surface. FIG. 25A is the EDS image of a typical Co/Cu/Si=1/1/8 catalyst showing the presence of Cu-rich buddle-like decorations.

Figure 25D:
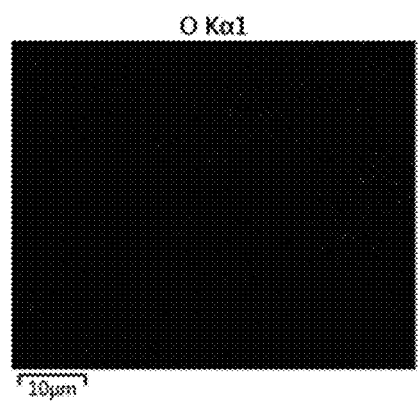
Figure 25E:
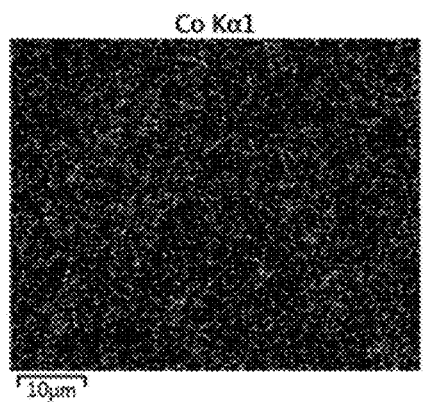

FIGS. 25B-25E show the elemental mapping of Cu, Si, O and Co. It can clearly be seen from FIGS. 25A-25C that the surface decorations are rich in Cu and depleted in Si. Cu-rich decorations have slightly lower oxygen concentration as seen in FIG. 25D due to the low valence of Cu. It also appears that Co is uniformly distributed compared with the other elements. These observations are quantitatively confirmed in Table 11 where the molar composition of individual regions is summarized.

TABLE 11

Molar atomic composition of the Co/Cu/Si = 1/1/8
catalyst at various regions when the catalyst was
synthesized at microwave power of 1800 W

| Location | Molar fraction | | | | [Cu]/[Co] | [Si]/([Cu] + [Co]) |
|---|---|---|---|---|---|---|
| | Co | Cu | Si | O | | |
| Overall composition | 0.051 | 0.064 | 0.305 | 0.580 | 1.255 | 2.652 |
| Copper rich decorations | 0.095 | 0.235 | 0.102 | 0.568 | 2.474 | 0.639 |
| Surface without decorations | 0.048 | 0.045 | 0.323 | 0.585 | 0.938 | 3.566 |

Table 11 indicates that on the background surface, [Si]/([Co]+[Cu]) ratio (ca.=3.6) approaches the theoretical value of 4, whereas in the Cu-rich decorations this ratio is only 0.64. [Cu]/[Co] ratio (=0.94) on the silica rich surface is nearly the same as the theoretical value of 1, whereas within the decorations, this ratio [Cu]/[Co]=2.47. These results indicate that during the formation of the Co/Cu/Si=1/1/8 catalyst, Cu phase separates, hence forming two distinct regions with potentially two different catalysts. Presently, no plasma was generated because ([Co]+[Cu])/[Si] is low at 0.25.

Figure 26A:
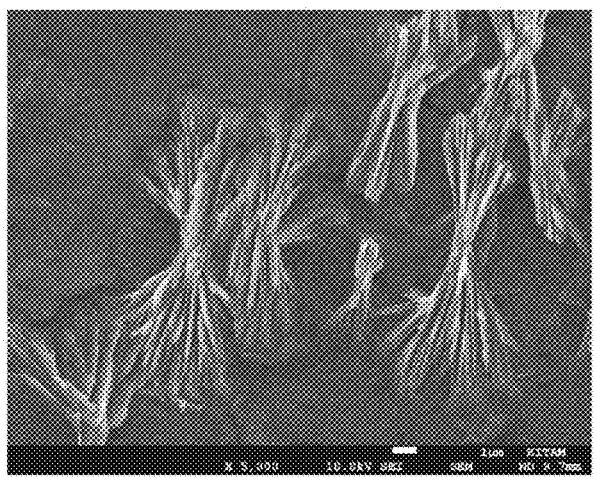
FIGS. 26A-26D show the SEM images of the Cu/Si based catalysts showing the Cu-rich structure formation due to phase separation.
Figure 26B:
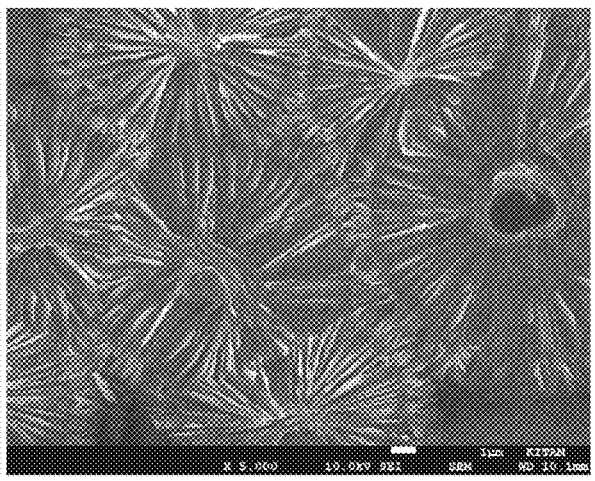
Figures 26C, 26D:
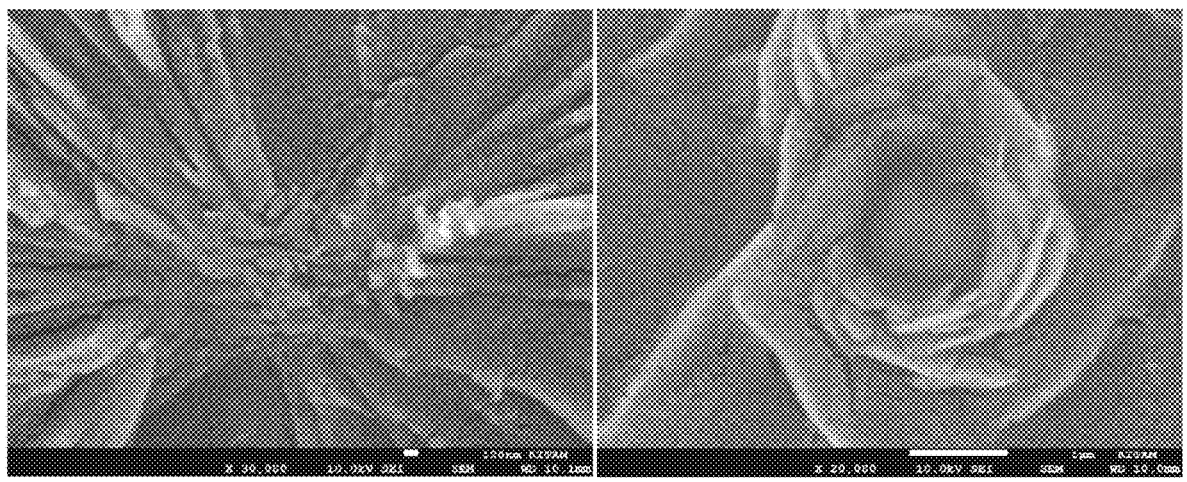

The important features of these localized discrete structures are illustrated in FIGS. 26A-26D. The phase separation associated with Cu/Si system is not due to the presence of Co in the catalyst Co/Cu/Si=1/1/8. FIG. 26A shows the presence of phase separation in Cu/Si=1/4 catalyst obtained at P=1800 W. If the concentration of Cu were to be increased slightly (as in Cu/Si=1/3), the decomposition of $Cu(NO_3)_2$ does not take place because the critical power P*>1800 W for Cu/Si=1/3. FIG. 26A shows the presence of Cu decorations on Si-rich smooth surface. In the presence of Co, a similar type of structure is produced as seen in FIGS. 26B and 26C and in FIGS. 25A-25D as EDS image. The difference between the images in FIG. 26A and FIGS. 26B-26D is that in the presence of Co, the phase separated structures are thicker and appear to branch out. These surface structures are made from ca. 50 nm thick planes which themselves are composed of closely packed-partially fused ca.50 nm particles (FIG. 26D).

Such structures provide not only a large surface area and accessibility to the catalytic sites but enhance catalytic activity through the creation of more accessible and exposed terrace- and step-sites for enhanced catalyst activity. In the absence of porosity, the accessibility of the step sites with a low energy barrier will be curtailed. Furthermore, oxide semiconductor nano-sheets are used to obtain multi-functional catalyst systems which can, for example, absorb energy, (such as UV-radiation) and cause charge separation and electron transfer encountered in artificial photosynthesis.

Example 10. Synthesis of Plasma Generating Silica Supported Binary Catalysts Mn/Cu/Si=1.5/0.5/1

The objective of this study is to show that supported binary catalysts can create catalytic structures which are defect-rich (and hence have more accessible active sites) as well as offering the possibility of sequential catalysis because distinct catalyst domains are present in very close proximity. Such desirable catalyst structures appear to be formed through processing under a high energy environment and catalyst concentration. Therefore, we also investigate changes in the physical/chemical catalyst structure when fresh catalysts were subjected to further microwave irradiation with plasma generation. The second purpose here is to assess the long term stability of these catalysts under service conditions.

Binary catalyst Mn/Cu/Si=1.5/0.5/1 is obtained by irradiation of catalyst precursor (Mn and Cu nitrate salts) in silica support precursor fluid at 1800 W for 60 s. Following the evaporation of water and the decomposition of nitrate salts within ca. 40 s, generation of plasma was observed. Irradiation was stopped after a total processing time of 60 s.

Figure 27A:
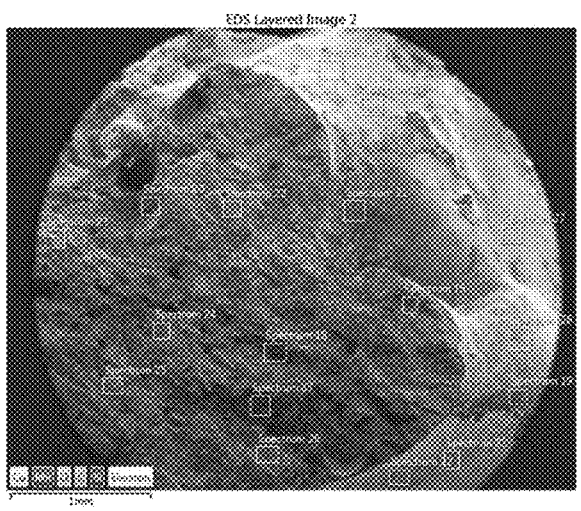
FIGS. 27A-27H show the structure of Mn/Cu/Si=1.5/0.5/1 catalyst as evaluated by EDS and SEM analysis.
Figure 27B:
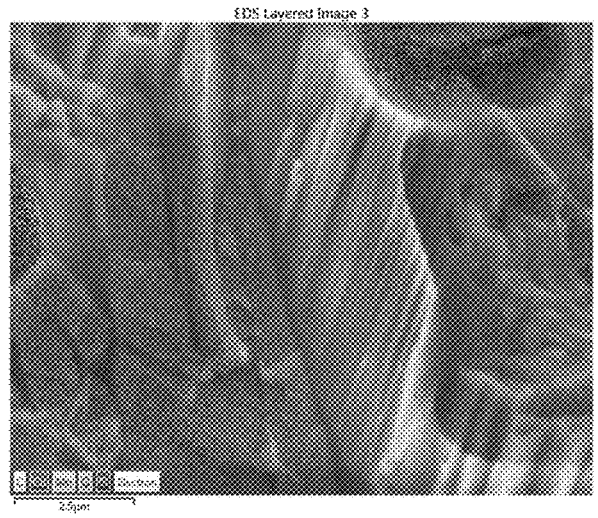
Figures 27C, 27D, 27E, 27F:
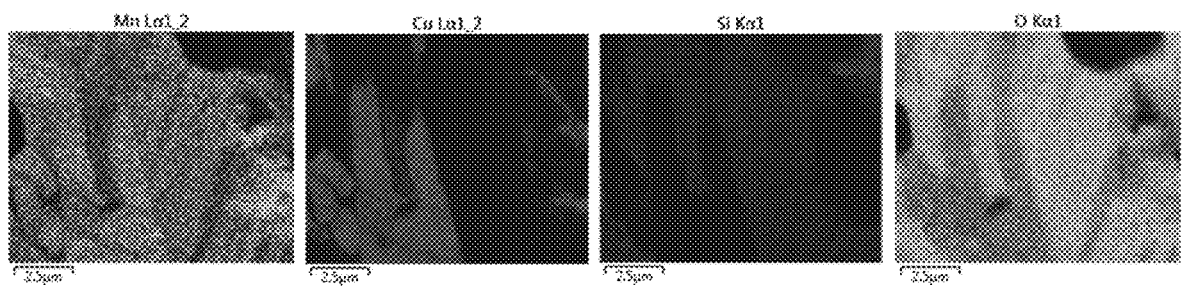

The EDS images of the fresh catalyst at two magnifications are shown in FIGS. 27A-27B at two magnifications and locations. Surface and the inner regions of the large catalyst particle show both chemical and morphological heterogeneity with Mn, Cu, Si and O-rich regions. It can be seen from the elemental analysis of the catalyst (FIGS. 27C-27F) that both Si and O concentrations are low when Mn and Cu concentrations are high. The evaluation of the EDX-spectra obtained from four catalyst particles (including that shown in FIG. 27A) at various locations is summarized in Table 12. Here the data are grouped into two; the regions with the highest Mn and with the highest Cu. The average composition of the total catalyst surface (such as shown in FIG. 27A) is also tabulated in Table 12. It can be seen that, compared with Mn/Si=2 catalyst (see Table 9) Mn concentration in the Mn-rich regions is significantly lowered by Cu in the binary catalyst. Nevertheless, due to the fact that Cu appears to phase separate out from $SiO_2$ support, the surface of the Mn/Cu/Si=1.5/0.5/1 catalyst is always Mn deficient and Mn/Cu molar ratio is smaller than the stoichiometric ratio of [Mn]/[Cu]-3. The opposite is true for the ([Mn]+[Cu])/[Si] ratio, indicating that the walls of the pores are significantly richer in $SiO_2$ compared with the expected stoichiometric ratio of 2/1. We also note that the mean oxygen concentration on the catalyst surface is lower compared with the Mn/Si=2 catalyst, reflecting the presence of Cu in the catalyst. As seen from FIGS. 27B-27F and Table 12, oxygen and Si concentrations are significantly low in Cu-rich regions.

When the freshly made Mn/Cu/Si=1.5/0.5/1 catalyst is further subjected to microwave radiation with the generation of plasma, the main effect is the enhancement of Mn concentration in the Mn-rich regions, reaching to the level of the corresponding Mn/Si=2 catalyst shown in Tables 9 and 12.

Figures 27G, 27H:
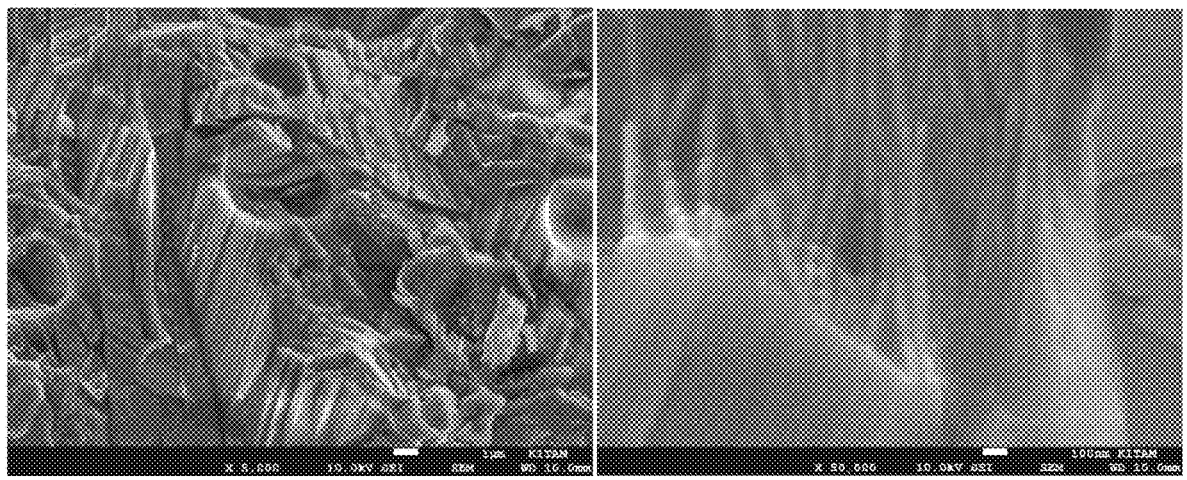
Figure 28A:
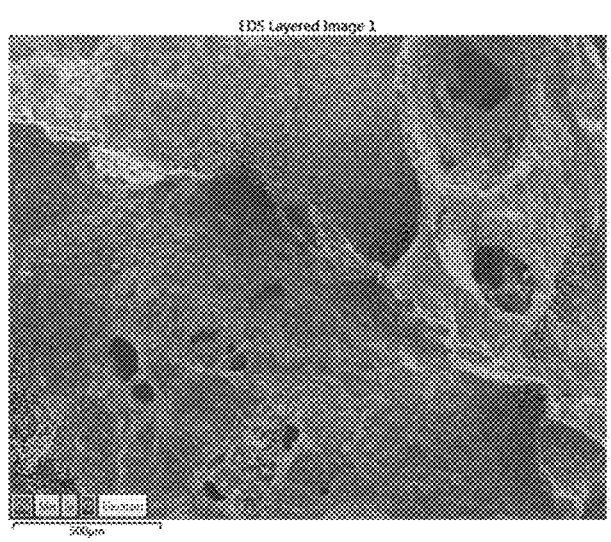
FIGS. 28A-28E show the EDS image and elemental mapping of Mn/Cu/Si=1/0.5/1 catalyst obtained after 60 seconds of extra microwave irradiation at 1800 W of the fresh catalyst described in FIG. 27A.
Figure 28B:
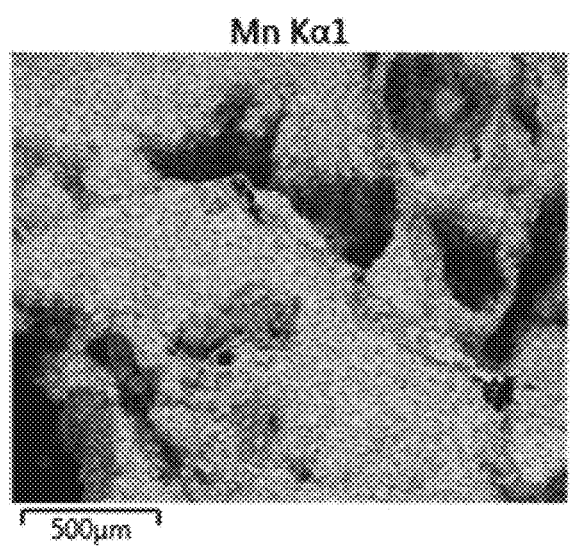
Figures 28C, 28D, 28E:
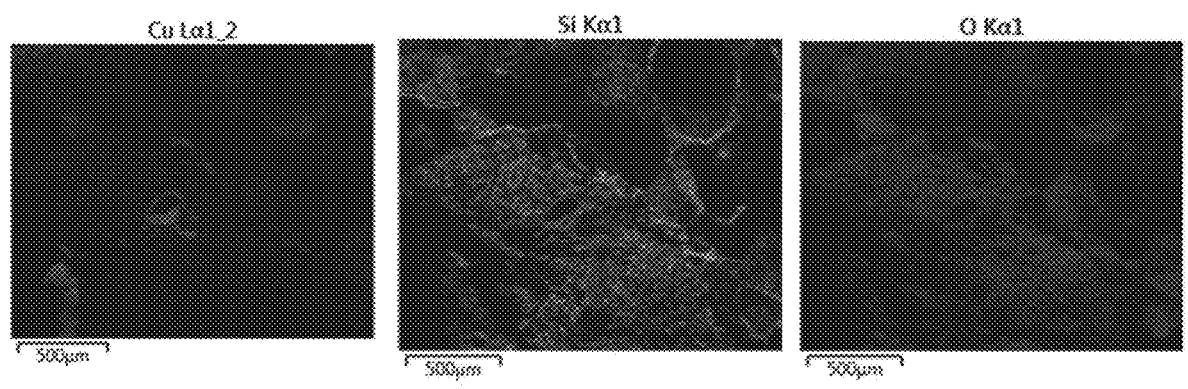

FIGS. 27B, 27G, 27H illustrate the typical fine structure of the Mn/Cu/Si=1.5/0.5/1 catalyst on the catalyst surface. Phase separated Mn-rich regions appear to form closely packed cuboidal capillaries as well as nano-plates of ca. 35 nm thickness as shown in FIG. 27H. These plates when closely packed form layered structures encountered in plasma treated $BaTiO_3$.

FIGS. 28A-28E illustrate the EDS layered image and elemental mapping of the Mn/Cu/Si=1.5/0.5/1 catalyst after an extra 60 sec microwave irradiation with the generation of plasma. It can be seen that a high concentration of Cu is localized but not dominant while Mn concentration is enhanced across the sample when compared with the corresponding mappings shown in FIGS. 27C-27F.

TABLE 12

Mn/Cu/Si = 1.5/0.5/1 catalyst composition at Mn-rich and Cu-rich regions showing the effect of co-catalyst and extra microwave irradiation.

| | Catalyst → | | | | | |
|---|---|---|---|---|---|---|
| | Fresh catalyst (mol fract.) | | | Further 60 s irradiation (mol fract.) | | |
| | Region → | | | | | |
| Variable ↓ | Total surface | Mn-rich | Cu-rich | Total surface | Mn-rich | Cu-rich |
| Mn | 0.267 | 0.379 | 0.186 | 0.279 | 0.771 | 0.193 |
| Cu | 0.192 | 0.172 | 0.388 | 0.140 | 0.053 | 0.330 |
| Si | 0.112 | 0.085 | 0.018 | 0.091 | 0.070 | 0.021 |
| O | 0.429 | 0.364 | 0.408 | 0.490 | 0.106 | 0.456 |
| [Mn]/[Cu] | 1.39 | 2.20 | 0.479 | 1.99 | 14.5 | 0.585 |

Table 12 shows that Mn concentration doubles in the Mn-rich region while there is a slight reduction in Cu concentration in the Cu-rich domains upon further irradiation. In all regions [Mn]/[Cu] molar ratio increases with further irradiation, especially in the Mn-rich domains.

Figure 29A:
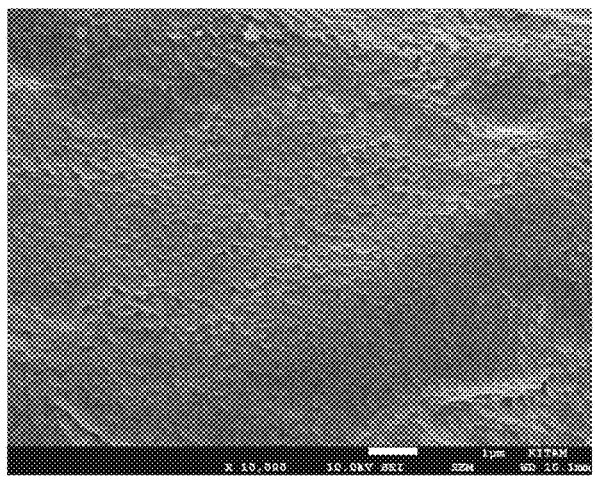
Figure 29B:
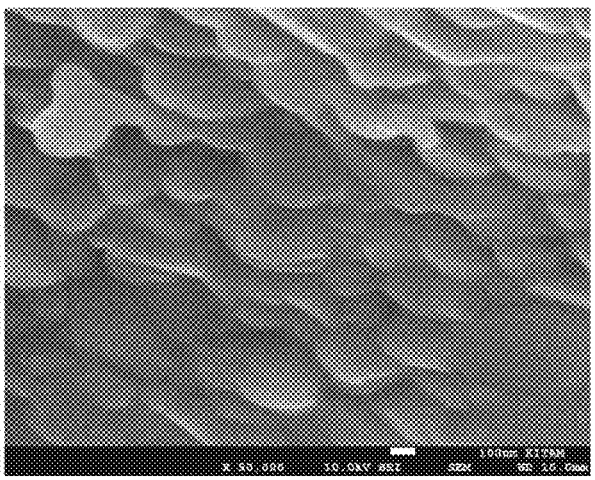
Figures 29E, 29F:
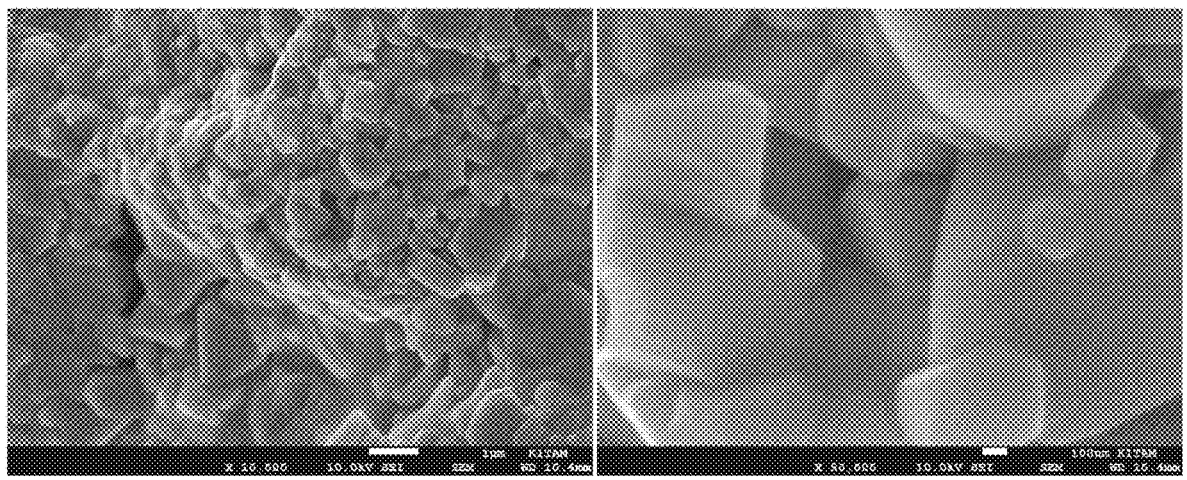

The physical structure of the fresh Mn/Cu/Si=1.5/0.5/1 catalyst after a further 60 s microwave irradiation at 1800 W is illustrated in FIGS. 29A-29F as a function of local composition. FIGS. 29A-29B show the structure of the catalyst surface consists of ca. 0.2 μm particles with ca. 0.1 μm holes providing connections to the pores beneath them, the surface structure of which is illustrated in FIGS. 29C-29D at two magnifications. In fact the dominant surface structure, shown in FIGS. 29A-29B is similar to that of Mn/Si=2 catalyst (FIGS. 21A-21F) but the surface decorations seen in FIGS. 21C-21D are not present. In general, the surface structures inside the catalyst pores are substantially different than the catalyst surface as shown in FIGS. 21E-21F and FIGS. 29E-29F for Mn/Si=2 and Mn/Cu/Si=1.5/0.5/1 respectively. Note that the layered structures of the crystals covering the pore surface after an extra 60 s microwave irradiation (FIG. 29F) are also present in FIGS. 22A-22F and FIGS. 27A-27H.

The foregoing studies indicate that the presence of a second catalyst is useful in obtaining defective catalyst morphologies which increases the concentration of accessible high-activity sites. It can be seen from Tables 9-12 that in the presence of Cu, catalyst oxygen concentration is some 20% lower due to the fact that Mn has higher oxidation states than Cu. Reduced lattice oxygen capacity is therefore a disadvantage when these catalysts are used for chemical looping reactions, for example, re-oxidation of the reduced catalyst using water as oxidant to generate hydrogen.

Example 11. Silica Supported Binary Cr/Co/Si*=1/1/8 Catalysts with Transparent Platelets All the single or binary catalysts described in the above examples had sufficient electrical conductivity so that SEM and EDS studies could be carried out without coating the samples with a conductive carbon or gold layer. Further, these samples were not optically transparent, they were highly porous with large surface area. In the catalysts described so far, no transparent platelets were observed as part of their microstructure.

We observed that when chromium (Cr) was used as a co-catalyst with another multi-valence catalyst such as cobalt (Co) in obtaining a silica supported binary catalyst represented as Cr/Co/Si=X/Y/Z, the resulting catalyst contained platelets which were transparent, and the particles were electrically non-conducting. But the surface of the pores was conductive due to high levels of reduced metal.

Figure 30:
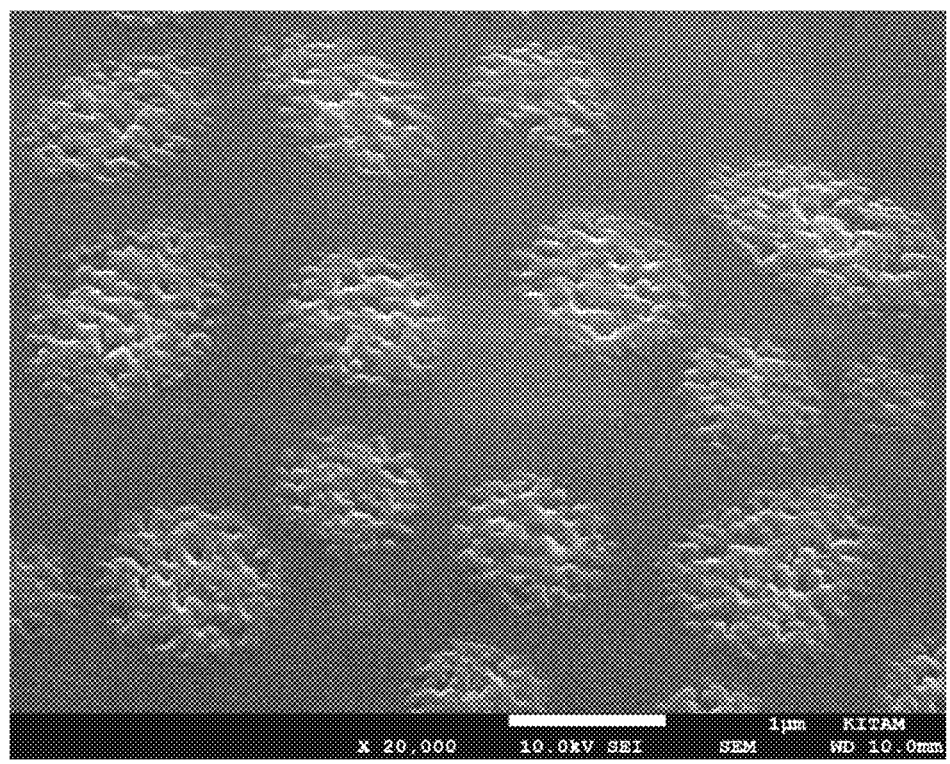
FIG. 30 shows the SEM of the silica rich outer surface of the Cr/Co/Si*=1/1/8 catalyst (([Cr]+[Co])/[Si*]=1/4) where the total catalyst/silica concentration ratio is 1/4. * indicates that SiO$_2$ size in the support precursor fluid is 5 nm.

In this example, we used silane coated silica dispersion in water with silica particles of 5 nm. It was supplied by Nouryon, Sweden under the trade name of Levasil CC151. Fresh nitrate salt solutions of Cr and Co were used to obtain a silica supported binary catalyst system of Cr/Co/Si*=1/1/8. Here Si* indicates that the size of the silica particles in the silica dispersion is 5 nm as opposed to 7 nm in all of the other examples. After the decomposition of the nitrate salts, plasma generation was not observed. The catalysts were contained optically transparent thin plates spread across the 3-dimensional structure. The SEM and EDS analysis were carried out as described previously. FIG. 30 shows the catalyst outer skin indicating the presence of circular decorations on the silica background. The EDS analysis of similar areas show that the outer skin of the Cr/Co/Si*=1/1/8 catalyst has the following composition: [O]=0.658; [Si]=0.265; [Cr]=0.043; [Co]=0.034 with [Cr]/[Co]=1.26 and [Si]/([Cr]+[Co])=3.54. These results indicates that the surface is slightly depleted with $SiO_2$ compared with the theoretical value of [Si]/([Cr]+[Co])=4. The binary catalyst regions are slightly richer in Cr.

EDS spot analyses of this catalyst for the compositions were carried out at three locations: (1) Outer skin, (2) Walls, (3) Pore surfaces. The results are shown in Table 13.

TABLE 13

Atomic composition of Cr/Co/Si = 1/1/8 catalyst at three different locations (walls external surface and pore surface) showing the wide heterogeneity in composition

| (Number) Location ↓ | Atom concentrations (—) | | | | [Si]/([Cr] + [Co]) | [Cr]/[Co] |
|---|---|---|---|---|---|---|
| ↓ | [O] | [Si] | [Cr] | [Co] | (—) | (—) |
| (1) Walls | 0.647 | 0.248 | 0.031 | 0.074 | 2.36 | 0.42 |
| (2) External surface | 0.655 | 0.269 | 0.043 | 0.033 | 3.54 | 1.30 |
| (3) Pore surface | 0.398 | 0.324 | 0.152 | 0.126 | 1.17 | 1.21 |

The theoretical values of the variables, support/total catalyst ratio, $R_{SC}$=[Si]/([Cr]+[Co]) and ratio of catalysts $R_{CC}$=[Cr]/[Co] are $R_{SC}$=4 and $R_{CC}$=1. It can be seen from Table 13, that the external surface (skin) of the catalyst is slightly depleted in Si ($R_{SC}$=3.54) but richer in Cr ($R_{CC}$=1.30) whereas on the pore surface, silica is depleted as $R_{SC}$=1.17, well below the theoretical value of 4. On the pore surface, Cr concentration is still higher than Co concentration with $R_{CC}$=1.2. These deviations from the theoretical values are reflected in the corresponding concentrations within the walls of the catalyst, with $R_{SC}$=2.36 and $R_{CC}$=0.42.

The theoretical oxygen concentration in various regions can be explained by the valance state of Cr and Co. It can also be seen from Table 13 that oxygen concentration is very high on the external surface [O]=0.655 which can be accounted for by considering that the oxides of Cr and Co are in the form of $CrO_3$ (i.e., hexavalent Cr) and $Co_2O_3$ (as shown previously) in this region. Hence the maximum theoretical oxygen concentration at location (2) is $[O]_{T2}=0.667$. Very low oxygen concentration ($[O]=0.398$) on the pore surfaces indicates that substantial part of the catalyst on the pore surface are reduced. With this assumption, the maximum oxygen concentration at the location (3) is $[O]=0.4$. This result indicates that, although the Catalyst/Silica is not at the threshold level of 1/2, there has been local plasma activity within the pores due to the fact that locally, this ratio can be well above 1/2 (at the pore surface total catalyst/silica ratio is 1/1.17, as seen from Table 13) within the pores and as a result, plasma is generated within the pores under microwave irradiation.

It was discovered that chromium, cobalt, iron and manganese based single silica supported catalysts Cr/Si=X, Co/Si=X, Fe/Si=X and Mn/Si=X all have these transparent platelet inclusions. The concentration of these transparent inclusions increases with increasing catalyst/silica molar ratio (X) and microwave intensity. Transparent platelet concentration is further enhanced in binary catalysts including Cr/Co/Si=X/Y/Z; Cr/Cu/Si=X/Y/Z.

The XRD pattern of the Cr/Co/Si=1/1/8 catalyst shows an amorphous morphology thus the catalyst crystallite size and the Cr, Co, Si interactions or their relative occurrence can't be evaluated. This evaluation of the chemical structure of this catalyst indicates that its external surface has the structure of so-called Phillips Chromox Catalyst which is essentially $SiO_2$ supported $CrO_3$ and it is used extensively for polyolefin polymerization. It is therefore expected that it can also be used for the catalytic plasma conversion of $CO_2$ to liquid fuels using either $CH_4$ or $H_2$.

Example 12. Electromagnetic Radiation Absorption of Selected Catalysts

The mechanism of chemical catalysis and electromagnetic (EM)-energy absorption by supported catalysts can be expected to be similar if not the same because several metal catalysts are also used in protection from EM-radiation. In particular, when the catalyst is exposed to EM-radiation, it absorbs energy and undergoes electronic changes such as polarization and energetically becomes active. This principal is common in all catalytic reactions associated with EM-radiation over a wide range of frequencies including microwave (ca. 1 GHz-1 THz) and UV-radiation (ca. 103-105 THz). In particular, microwave frequency range is used in domestic appliances, telecommunications and radar detection (2-20 GHz). Low tera-Hertz frequency range is used EM-imaging. The behavior of materials exposed to EM-radiation can be characterized by Terahertz time-domain spectroscopy (THz-TDS) in which the EM-radiation absorption coefficient of a material is evaluated as a function of frequency of radiation in the range ca. 0.1-3 THz.

In this example, we used 5 different catalysts produced by microwave irradiation as described in this disclosure. Unless stated otherwise, silica particle size was 7 nm. When the agglomerated silica particle size was 5 nm, it is represented as Si*. Samples were:

F) Silica supported iron catalyst; Fe/Si=1/4
G) Silica supported manganese catalyst, Mn/Si=2
H) Silica (particle size 5 nm) supported cobalt and cupper catalyst; Co/Cu/Si*=1/1/8
I) Silica supported cobalt with barium titanate (BT) catalyst, {Co/Si=2}/BT=1/4
J) Silica (particle size 5 nm) supported chromium and cobalt binary catalyst, Cr/Co/Si*=1/1/8

Figure 31:
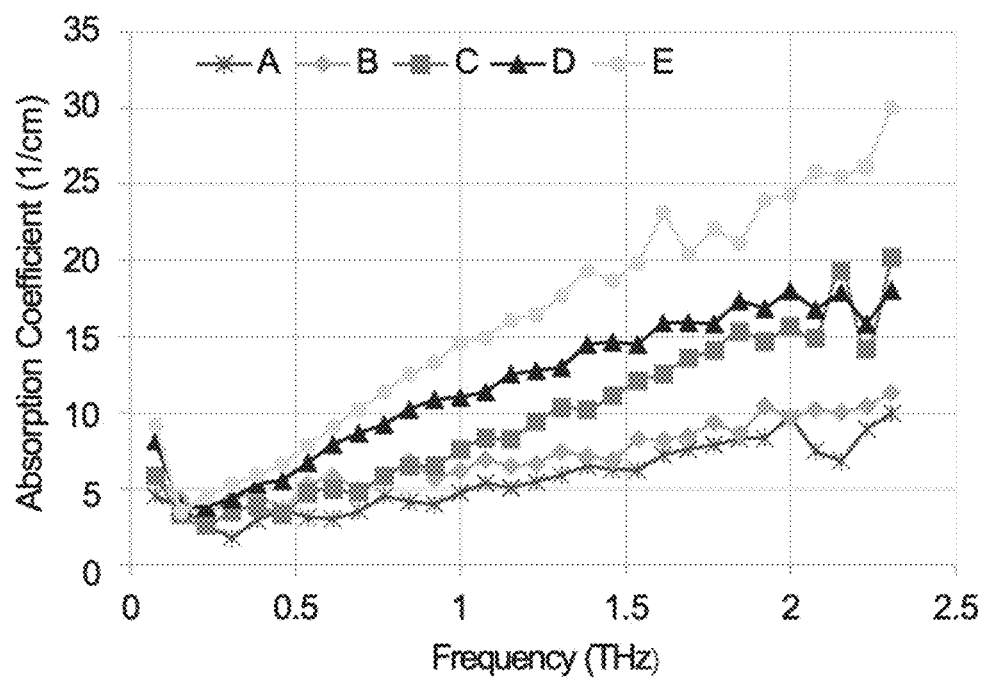
FIG. 31 shows the Terahertz time domain spectra of various catalysts. A) Fe/Si=1/4; B) Mn/Si=2; C) Co/Cu/Si*=1/1/8; D) {Co/Si=2}/BT=1/4; Cr/Co/Si*=1/1/8

The Terahertz-Time Domain spectra of these samples are shown in FIG. 31 which indicates that all the samples have very large absorption coefficients similar order of magnitude to water. Water strongly absorb EM-radiation in the GHz to THz frequencies as it converts EM-energy to thermal energy. The absorption coefficient of water increases from ca. $0.1\ cm^{-1}$ at 1 GHz to over $200\ cm^{-1}$ at 1 THz. FIG. 31 indicates that the absorption coefficient of binary Cr/Co/Si*=1/1/8 is the highest followed by another binary catalyst, Co/Cu/Si*=1/1/8. In both cases, Levasil CC151 silica source was used for which silica particle size was 5 nm and the weight ratio of silane coupling agent-to-silica was 0.4. The performance of the composite catalyst {Co/Si=2}/BT=1/4 was better than Mn/Si=2/1 or Fe/Si=1/4 catalysts. In these three catalysts, silica source was Levasil CC301 with 7 nm silica particles in which the silane coupling agent-to-silica weight ratio was 0.2. These results indicates that the heterogeneity of the catalyst structure based on discrete conductive and non-conductive domains formed as a result of phase separation result in more efficient electromagnetic energy absorption by silica supported binary catalysts. It further indicates that the concentration of the silane coupling agent promotes high EM-radiation absorption.

The absorption of electromagnetic energy in the GHz-THz range is more effective if the structural heterogeneity of the catalyst is high as a result of co-catalyst phase separation and the formation of discrete regions promoting plasma generation.

Applications of Catalytic Microwave Induced Plasma

In the current process, following the decomposition of the catalyst precursor nitrate salt and the generation of plasma in air, the newly formed catalyst undergoes reduction which is however, not uniform across the catalyst. Reduction takes place on the catalyst surface, rather than within the walls of the pores due to the fact that plasma catalysis is a surface phenomenon, although plasma penetration and enhancement occur within the pores through interconnecting holes. The implications of these observations include porous catalyst design for plasma and chemical looping at a large scale.

Catalyst reduction takes place despite the presence of oxygen and the mechanism of the process can be described as:

$$N_2 + 2x\{O\} \rightarrow 2NO_x + 2x\{\#\} \qquad (8)$$

$$2\{\#\} + O_2 \rightarrow 2\{O\} \qquad (9)$$

Equation (8) represents the oxidation of $N_2$ by lattice oxygen of the catalyst oxide while the Equation (9) represents the restoration of lattice oxygen by the re-oxidation of catalyst. Here $\{O\}$ represents the catalyst oxide lattice and $\{\#\}$ is the oxygen deficient lattice with oxygen vacancy #. The chemical process described by Equations (8) and (9) is known as chemical looping.

However, as these reactions take place in air and the products are NOx, oxygen is limited and hence the lattice oxygen restoration is not complete. Therefore, the concentration of reduced domains increases. The Equations (11) and (12) also represent a chemical looping reaction scheme involving $N_2$ and the oxidized $\{O\}$ or the reduced $\{\#\}$ catalyst. Here, the nitrogen and oxygen activations are through plasma which is promoted by the catalyst itself. The above chemical looping reaction scheme for nitrogen fixation takes place in microscopic scale and hence it can be scaled-up and applied to various important chemical processes as discussed below in which the oxidation of the reduced catalyst $\{\#\}$ can be carried out by $CO_2$ or $H_2O$ in order to generate CO or $H_2$ respectively.

Carbon Dioxide and Flue Gas Conversion to Ammonia and Fertilizers

This type of chemical looping reaction scheme can be applied to an important reaction involving a mixture of $CO_2$ and $N_2$ which is of course encountered in combustion gases. The following mechanism applies to the catalysts described in this study. Here the lattice oxygen in the catalyst is denoted by $\{O\}$.

$N_2+2\{O\} \rightarrow 2NO+2\{\#\}$ (10) $N_2$ oxidation and catalyst reduction.

$CO_2+\{\#\} \rightarrow CO+\{O\}$ (11) $CO_2$ reduction and catalyst re-oxidation.

$2NO+\{\#\} \rightarrow N_2O+\{O\}$ (12) Consumption of adsorbed NO for $N_2O$ production and catalyst re-oxidation.

$NO+\{O\} \rightarrow NO_2+\{\#\}$ (13) Consumption of adsorbed NO for $NO_2$ production and catalyst reduction.

It is unlikely that at these levels of conversions and energy costs, mixed $CO_2$ and $N_2$ could be exploited commercially. Nevertheless, the understanding of the reaction mechanism with catalysts, catalyst and process design, $CO_2+N_2$ conversion to CO, NO and $NO_2$ can lead to the manufacture of several chemicals including ammonia and urea through the reactions:

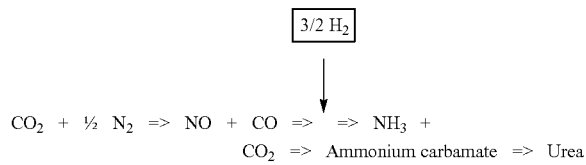

Production of Nitric Acid, Hydrogen, Ammonia and Ammonia Derivatives from Air and Water Another important potential nitrogen fixation is in nitric acid (for use in nitrate fertilizers) which is currently obtained from the oxidation of ammonia itself. Therefore, the current methods of ammonia and nitric acid productions are not sustainable. Here, we present an alternative route for nitrogen fixation for nitric acid and hydrogen production by chemical looping using the plasma generating catalyst systems described in the foregoing sections. In this method catalysts, based on spinel, perovskite or a mixture of both (such as composite catalysts $\{M/Si=X\}/BT=F$) or binary catalysts are used for nitrogen fixation from air to obtain NO and $NO_2$ followed by the re-oxidation of the catalyst with water to obtain hydrogen for use in ammonia production.

Figure 32:
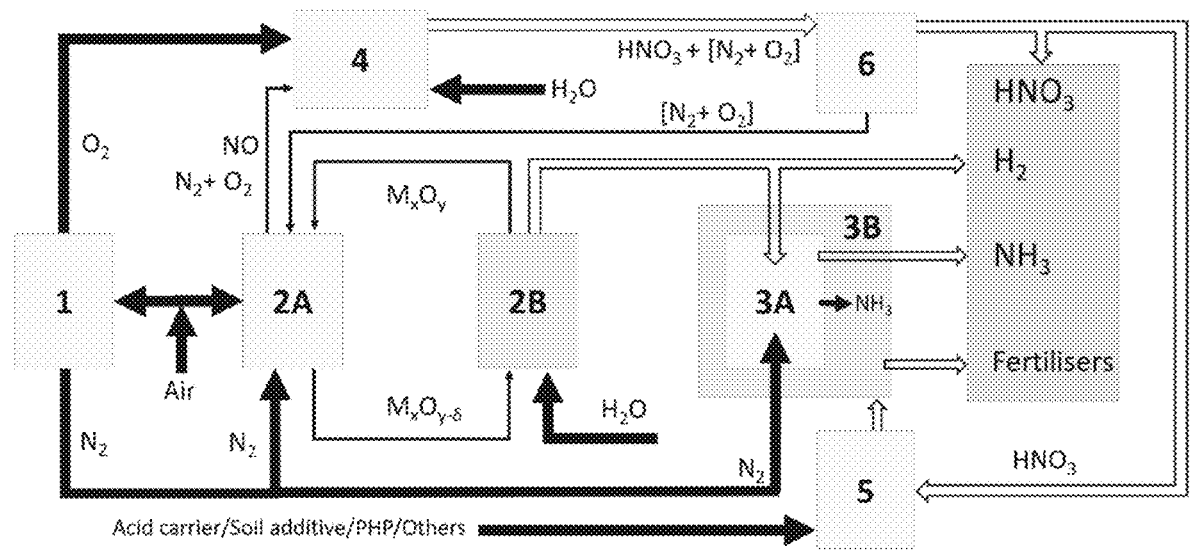
FIG. 32 is the diagrammatic illustration of nitric acid, hydrogen, ammonia and fertilizer production from air and water through catalytic plasma nitrogen oxidation and catalyst re-oxidation with water for hydrogen production for ammonia and fertilizer synthesis. Individual unit operations are represented by: (1) Air separation; (2) Chemical Looping Reactor with: (2A) NO$_x$ generation and catalyst reduction by plasma; (2B) Hydrogen generation and catalyst re-oxidation; (3) Multi-reaction zone plasma reactor with: (3A) Plasma reactor (Plasma zone) for NH$_3$ production, (3B) NH$_3$ neutralization reactor using acids absorbed on carriers; (4) Nitric oxide oxidation and nitric acid reactor; (5) Acid carrier/Soil additive/Hydrophilic porous polymers and Acid mixing stage; (6) Nitric acid-NO$_x$ separation.

FIG. 32 diagrammatically illustrates the proposed integrated process for chemical nitrogen fixation from air for nitric acid production and hydrogen generation from water using the current plasma generating chemical looping catalysts for ammonia production. In FIG. 32 air separation takes place in Reactor-1 to obtain oxygen and nitrogen enriched streams. Oxygen is used for NO oxidation in Reactor-4 to obtain nitric acid while a nitrogen enriched stream is fed into the plasma reactor, Reactor-2A for NO production. The oxygen content is controlled by the injection of air into Reactor-2A so as to prevent $N_2O$ formation. The oxide catalyst represented as $M_aO_b$ is also fed into Reactor-2A and reduced catalyst $M_aO_{b-c}$ is regenerated in the Reactor-2B using water. The resulting hydrogen and nitrogen from Reactor-1 are fed into the catalytic ammonia reactor (Reactor 3A) and the catalyst $M_aO_b$ is recycled back to Reactor-2A. The relevant simplified chemical reactions are:

$M_aO_b+c/2N_2=M_aO_{b-c}+cNO$ Reactor-2A (14)

$M_aO_{b-c}+cH_2O=M_aO_b+cH_2$ Reactor-2B (15)

Reactor-6 separates nitric acid and the unreacted gases $(N_2+O_2)$ which are recycled back to Reactor-2A. In order to enhance $NH_3$ conversion and lower the energy cost of $NH_3$ production, nitric acid (or indeed other acids such as sulfuric acid or phosphoric acid) is mixed with an acid carrier or soil additives such as hydrophilic micro-porous polymers known as PolyHIPE Polymers (PHP). Reactor-5 is used for the mixing of the soil additives/acid carrier with nitric acid (or other acids such as sulfuric or phosphoric acids). Acid absorbed by the carriers is neutralized by $NH_3$ (produced in Reactor-3A) in Reactor-3B thus forming a fertilizer as described previously. The Reactor-3 is a multi-reaction zone plasma reactor used in order to shift the reaction equilibrium towards $NH_3$ formation at the $NH_3$ reaction zone.

Mn, Co and Fe represent the best chemical looping oxide catalysts as the re-oxidation temperature for them is low and well below their melting temperatures. Here, the catalysts represented as M/Si=X (X>1/2) or $M_{(1)}/M_{(2)}/Si=X/Y/Z$ ($M_{(1)}$, $M_{(2)}$=Mn, Co, Fe and (X+Y)/Z>1/2) can be used for several purposes which include, plasma generation under microwave irradiation, as plasma catalysis with high catalyst loading and as the chemical looping agent for hydrogen generation.

Applications in Electromagnetic Radiation Protection and Catalytic Radar Absorption Materials Electromagnetic radiation absorbing materials are important due to the advances made in communication and detection technologies such as military aircraft, ships, vehicles, environmental protection and telecommunication equipment. In particular, microwave absorption materials are particularly relevant in radar detection avoidance and stealth. Within microwave radiation, the frequency range of 2-18 GHz is highly relevant for radar applications. Radiation absorption and energy dissipation in the form of heat by a material occur via dielectric and/or magnetic loss. Therefore, the so called "Radar Absorbing Materials" (RAMs) should have large permittivity and permeability for an efficient absorber.

The application of the current plasma generating single or mixed supported or composite catalysts should satisfy this criteria because high permittivity and permeability domains co-exist within the catalyst as a highly reactive state due to their high porosity, surface area and reactivity. These two desirable characteristics result in high radiation absorption coefficient for the catalysts. Furthermore, plasma itself is used as a reactive radar absorption medium although this method is not suitable in most applications. On the other hand, as in the present case, when plasma is generated upon microwave excitation of the supported catalysts, they can act as catalytic radar absorbing materials (C-RAMs) over a broad frequency range. The examples provided in this disclosure indicate that supported binary catalysts have higher absorption coefficient compared with supported single catalysts. High concentration of the silane coupling agent in the catalyst also enhances EM-radiation absorption. Supported composite catalysts using ferroelectric materials such as $BaTiO_3$ (or Pb $[Zr_xTi_{1-x}]O_3$ or $Ba_xSr_{1-x}TiO_3$)

together with a supported single or binary catalyst also have higher radiation absorption coefficient than single catalyst system.

In the examples provided in Example-12, the catalysts were not subjected to heat treatment to burn-off the silane coupling agents which is usually carried at ca. 600° C. in air or oxygen. Another alternative to burn-off is carbonization of the organic phase (silane coupling agent) by heat treatment in nitrogen atmosphere. The resulting catalyst system can be described as having a carbon skin and catalyst core structure. If the silane coating needs to be removed at low temperatures, non-thermal plasma under oxygen atmosphere can be used which ensures that the desirable nano-structures do not collapse during high temperature (>500° C.) heat treatment.

Microwave Plasma Reactors with Packed or Fluidized Bed Supported Catalysts

Microwave plasma reactors operating without any catalyst rely on the plasma catalysis in the plasma region of the reactor. In the presence of a catalyst, either as packed bed or fluidized bed mode, catalyst particles are placed after the plasma zone. Therefore, the catalytic reaction relies on the reactive species which do not decay or re-combine by the time they reach to the catalyst zone. Furthermore, plasma is not present on or within the catalyst pores. When the plasma itself is generated by the catalyst under microwave, plasma generated species react readily on the catalyst surface and within the pores before they have time to decay through recombination. Also, the plasma reaction within the catalyst increases the surface area available for reaction. Further, there is no limit to the length of the plasma/catalyst zone which are now identical.

What is claimed is:

1. A process for preparing a supported micro-porous multi-metal catalyst, comprising performing microwave radiation in self-generated plasma environment to a mixture comprising a multi-metal catalyst and a silane-coated silica support to obtain the supported micro-porous multi-metal catalyst, wherein the multi-metal catalyst is prepared by combining:
   (a) at least one transition metal catalyst having two stable valence states and at least one transition metal catalyst having three stable valance states;
   (b) at least one transition metal catalyst having two or three stable valence states and at least one transition metal catalyst having a single valence state; or
   (c) at least one of the transition metal catalyst having two or three stable valence states and at least one non-transition metal catalyst having two stable valance states.

2. The process according to claim 1, wherein the at least one transition metal catalyst having two stable valence states in (a) is selected from the group consisting of Fe, Co, Cu, Mo, Ru, Pd, Ir, and W.

3. The process according to claim 1, wherein the at least one transition metal catalyst having three stable valence states in (a) is selected from the group consisting of V, Cr, Mn, and Re.

4. The process according to claim 1, wherein a molar ratio of the multi-metal catalyst to the silane-coated silica support in (a) is higher than 0.5 and equal to or lower than 1.

5. The process according to claim 1, wherein a molar ratio of the at least one transition metal having two or three stable valence states in (b) to the silane-coated silica support is higher than 0.5.

6. The process according to claim 1, wherein in (b), the transition metal catalyst having two or three stable valence states is selected from the group consisting of Fe, Co, Cu, Mo, Ru, Pd, Ir, W, V, Cr, Mn and Re; and the transition metal catalyst having the single valence state is selected from the group consisting of Sc, Ni, Y, Zr, Nb, Tc, Rh, Ag, Hf, Ta, Os and Au.

7. The process according to claim 1, wherein in (b), a molar ratio of the transition metal having two or three stable valence states to the silane-coated silica support is greater than 0.5 and equal to or lower than 4; and a molar ratio of the transition metal having the single valence state to the transition metal having more than two stable valance states is equal to or less than 1.

8. The process according to claim 1, wherein in (c), the transition metal catalyst having two or three stable valence states is selected from the group consisting of Fe, Co, Cu, Mo, Ru, Pd, Ir, Pt, W, V, Cr, Mn, and Re; and the non-transition metal catalyst promoters having one or two valence states is selected from the group consisting of Li, B, Na, K, Mg, Ca, Sr, Ba, Zn, Sn, Bi, La, and Ce.

9. The process according to claim 1, wherein in (c), a molar ratio of the multi-metal catalyst to the silane-coated silica support is higher than 0.5 and equal to or lower than 4; and a molar ratio of the transition metal having two and three stable valence states to the non-transition metal catalyst promoter is equal to or greater than 0.1 and equal to or less than 1.

10. The process according to claim 1, wherein the multi-metal catalyst is a combination of cobalt and chromium, and the supported micro-porous multi-metal catalyst obtained has transparent silica supported binary catalyst inclusions in a form of platelets.

* * * * *